United States Patent
Cao

(10) Patent No.: US 12,551,434 B2
(45) Date of Patent: Feb. 17, 2026

(54) ZWITTERIONIC POLYMER PARTICLE COMPOSITIONS AND RELATED METHODS

(71) Applicant: WAYNE STATE UNIVERSITY, Detroit, MI (US)

(72) Inventor: Zhiqiang Cao, Troy, MI (US)

(73) Assignee: Wayne State University, Detroit, MI (US)

( * ) Notice: Subject to any disclaimer, the term of this patent is extended or adjusted under 35 U.S.C. 154(b) by 596 days.

(21) Appl. No.: 17/925,234

(22) PCT Filed: May 20, 2021

(86) PCT No.: PCT/US2021/033393
§ 371 (c)(1),
(2) Date: Nov. 14, 2022

(87) PCT Pub. No.: WO2021/236922
PCT Pub. Date: Nov. 25, 2021

(65) Prior Publication Data
US 2023/0225969 A1     Jul. 20, 2023

Related U.S. Application Data

(60) Provisional application No. 63/027,632, filed on May 20, 2020.

(51) Int. Cl.
| | | |
|---|---|---|
| *A61K 9/107* | (2006.01) | |
| *A23L 33/155* | (2016.01) | |
| *A61K 38/26* | (2006.01) | |
| *A61K 38/28* | (2006.01) | |
| *A61K 45/06* | (2006.01) | |
| *A61K 9/00* | (2006.01) | |

(52) U.S. Cl.
CPC .......... *A61K 9/1075* (2013.01); *A23L 33/155* (2016.08); *A61K 38/26* (2013.01); *A61K 38/28* (2013.01); *A61K 45/06* (2013.01); *A61K 9/0053* (2013.01)

(58) Field of Classification Search
CPC ..... A23L 33/155; A61K 9/1075; A61K 38/26; A61K 38/28; A61K 45/06; A61K 9/0053
See application file for complete search history.

(56) References Cited

U.S. PATENT DOCUMENTS

2015/0197644 A1* 7/2015 Chang ............... A61L 27/34
                                                    427/2.24
2020/0129628 A1* 4/2020 Cao .................. A61K 47/58

FOREIGN PATENT DOCUMENTS

WO    WO-2011057225 A2 *  5/2011  ........... A61K 9/5153
WO    WO-2018136505 A1 *  7/2018  ........... A61K 9/0024
WO    WO-2018226841 A1 * 12/2018  ........... C07C 229/22

OTHER PUBLICATIONS

Wei Wang, et al, Ultrastable Core-Shell Structured Nanoparticles Directly Made from Zwitterionic Polymers, Roy. Soc. Chem. (Year: 2012).*
International Search Report and Written Opinion for PCT Application No. PCT/US 2021/033393, mailed Aug. 26, 2021, 9 pages.

* cited by examiner

*Primary Examiner* — Sean M Basquill
(74) *Attorney, Agent, or Firm* — Julie K. Staple; Fishman Stewart PLLC

(57) ABSTRACT

Compositions and methods for oral and/or mucosal administration of a biologically active agent are provided according to aspects of the present disclosure which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the biologically active agent is or includes a protein, peptide, or dietary supplement. According to particular aspects, compositions and methods for oral and/or mucosal administration of an anti diabetes biological agent, such as insulin and/or an insulin analog.

20 Claims, 33 Drawing Sheets a

Monomer:

PCB

PEG

PSPMA

PMTTA

Fluorescent crosslinker:

DSPE-PCB

Polysorbate 80

| Micelle Samples | DSPE-PCB | Polysorbate 80 |
|---|---|---|
| Size (nm) | 25±4 | 14.5±2.9 |
| Zeta potential (mV) | -41±4.6 | -12.4±1.3 |

ZWITTERIONIC POLYMER PARTICLE COMPOSITIONS AND RELATED METHODS

REFERENCE TO RELATED APPLICATIONS

This application claims priority to PCT Application Serial No. PCT/US2021/033393 filed May 20, 2021 which claims priority to U.S. Provisional Patent Application Ser. No. 63/027,632, filed May 20, 2020, the entire content of both of which is incorporated herein by reference.

GRANT REFERENCE

This invention was made with government support under Grant No. 1410852, awarded by the National Science Foundation. The Government has certain rights in the invention.

FIELD OF THE INVENTION

There is a continuing need for compositions for oral and/or mucosal administration for delivery of a biologically active agent to a subject.

BACKGROUND OF THE INVENTION

The present disclosure relates generally to compositions for delivery of a biologically active agent, wherein the biologically active agent is a protein, peptide, or dietary supplement, the compositions including a plurality of particles, wherein each particle has an exterior surface, the exterior surface defining a particle interior, the exterior surface having at least one type of zwitterionic polymer disposed thereon and/or extending therefrom; and a biologically active agent disposed on the exterior surface and/or in the particle interior, methods of synthesis and use thereof. Improved oral absorption (oral bioavailability) and/or transmucosal delivery of the biologically active agent, wherein the biologically active agent is a protein, peptide, or dietary supplement, in a subject is provided by compositions of the present disclosure.

SUMMARY OF THE INVENTION

Compositions for oral and/or mucosal administration of a biologically active agent are provided according to aspects of the present disclosure which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the biologically active agent is or includes a protein, peptide, or dietary supplement.

According to aspects of the present disclosure, the particles are micelles, liposomes, or hydrogel particles.

According to aspects of the present disclosure, a zwitterionic polymer included in particles in compositions for oral and/or mucosal administration of a biologically active agent is present in a copolymer with a lipid-derived polymer.

According to aspects of the present disclosure, a zwitterionic polymer included in particles in compositions for oral and/or mucosal administration of a biologically active agent includes a plurality of repeating zwitterionic units, where the structural formula of each repeating unit is (III):

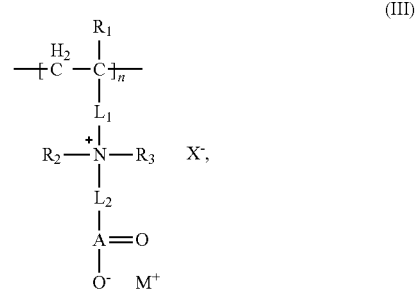

where R1, R2, and R3 are each independently selected from hydrogen, alkyl, and aryl groups; L1 is a linker that covalently couples a cationic center to a polymer backbone; L2 is a linker that covalently couples the cationic center to an anionic group; A(=O)O— is the anionic group; A is C, S, SO, P, or PO; X– is a counter ion associated with the cationic center; M+ is a counter ion associated with the (A=O)O— anionic center; and n is an integer in the range of 2 to about 100,000.

According to aspects of the present disclosure, a zwitterionic polymer included in particles in compositions for oral and/or mucosal administration of a biologically active agent includes a plurality of repeating units, where the structural formula of each repeating unit is (III)

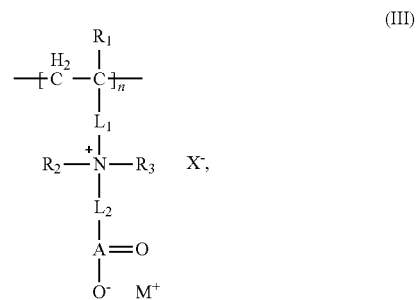

where R1 is selected from the group consisting of hydrogen, fluorine, trifluoromethyl, C1-C6 alkyl, and C6-C12 aryl groups; R2 and R3 are independently selected from the group consisting of alkyl and aryl, or taken together with a nitrogen to which they are attached form a cationic center; L1 is a linker that covalently couples the cationic center [N+(R2)(R3)] to a monomer double bond or its polymer backbone [—(CH2-CR1)n-]; L2 is a linker that covalently couples an anionic center [A(=O)—O-] to the cationic center; A is C, S, SO, P, or PO; M+ is a metal ion, an ammonium ion, or an organic ion; X– is a counter ion associated with the cationic center; and n is an integer in the range of 2 to about 100,000.

According to aspects of the present disclosure, a zwitterionic polymer included in particles in compositions for oral and/or mucosal administration of a biologically active agent includes a plurality of repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, and a phosphobetaine vinyl compound.

According to aspects of the present disclosure, a zwitterionic polymer including any two or more repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, and a phosphobetaine vinyl compound are included in particles in compositions for oral and/or mucosal administration of a biologically active agent.

According to aspects of the present disclosure, a zwitterionic polymer included in particles in compositions for oral and/or mucosal administration of a biologically active agent is selected from the group consisting of: a sulfobetaine acrylate polymer, a sulfobetaine methacrylate polymer, a sulfobetaine acrylamide polymer, a sulfobetaine methacrylamide polymer, a sulfobetaine vinyl polymer, a carboxybetaine acrylate polymer, a carboxybetaine methacrylate polymer, a carboxybetaine acrylamide polymer, a carboxybetaine methacrylamide polymer, a carboxybetaine vinyl polymer, a phosphobetaine acrylate polymer, a phosphobetaine methacrylate polymer, a phosphobetaine acrylamide polymer, a phosphobetaine methacrylamide polymer, a phosphobetaine vinyl polymer; and a polymer including two or more zwitterionic repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, and a phosphobetaine vinyl compound.

According to aspects of the present disclosure, particles in compositions for oral and/or mucosal administration of a biologically active agent include any two or more zwitterionic polymers selected from the group consisting of: a sulfobetaine acrylate polymer, a sulfobetaine methacrylate polymer, a sulfobetaine acrylamide polymer, a sulfobetaine methacrylamide polymer, a sulfobetaine vinyl polymer, a carboxybetaine acrylate polymer, a carboxybetaine methacrylate polymer, a carboxybetaine acrylamide polymer, a carboxybetaine methacrylamide polymer, a carboxybetaine vinyl polymer, a phosphobetaine acrylate polymer, a phosphobetaine methacrylate polymer, a phosphobetaine acrylamide polymer, a phosphobetaine methacrylamide polymer, and a phosphobetaine vinyl polymer.

According to aspects of the present disclosure, particles in compositions for oral and/or mucosal administration of a biologically active agent include a polymer including two or more zwitterionic repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, and a phosphobetaine vinyl compound.

According to aspects of the present disclosure, particles in compositions for oral and/or mucosal administration of a biologically active agent include a zwitterionic polymer having a plurality of repeating units, where the structural formula of each repeating unit has structural formula (IV):

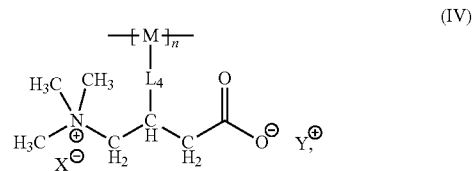

where M is a monomeric repeating unit, L4 is a linker, n is an integer from 1 to about 10000, X− is a counter ion associated with the cationic center, and Y+ is a counter ion associated with the anionic center. According to aspects of the present invention, M is a repeating unit of a polymer selected from the group consisting of: polyester, polyamide, poly(amino acid), polyimide, polycarbonate, polysiloxane, polyurethane, polyphosphazene, acrylic polymer, amino resin, epoxy resin, phenolic resin, and alkyd resin.

According to aspects of the present disclosure, particles in compositions for oral and/or mucosal administration of a biologically active agent include a zwitterionic polymer having a plurality of repeating units, where the structural formula of each repeating unit has structural formula (VI):

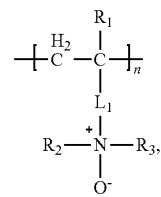

where R1, R2, and R3 are each independently selected from hydrogen, alkyl, and aryl groups; L1 is a linker that covalently couples a cationic center to a polymer backbone; and n is an integer in the range of 2 to about 100,000.

According to aspects of the present disclosure, a zwitterionic polymer included in particles in compositions for oral and/or mucosal administration of a biologically active agent is present in a copolymer with a lipid-derived polymer, wherein the copolymer includes a plurality of repeating hydrophobic units, where the structural formula of each repeating hydrophobic unit is: [polymerizable moiety]-lipid. According to aspects of the present disclosure, the lipid is or includes a fatty acid, a fatty alcohol, or both a fatty acid and a fatty alcohol. According to aspects of the present disclosure, the lipid is or includes a C4 to C28 fatty acid, a C4 to C28 fatty alcohol, or both a C4 to C28 fatty acid, and a C4 to C28 fatty alcohol. According to aspects of the present disclosure, the lipid is or includes a C4, C5, C6, C7, C8, C9, C10, C11, C12, C13, C14, C15, C16, C17, C18, C19, C20, C21, C22, C23, C24, C25, C26, C27, or C28 fatty acid and/or fatty alcohol. According to aspects of the present disclosure, the lipid is or includes a fatty acid and/or fatty alcohol selected from the group consisting of: caprylic, capric, lignoceric, cerotic, pelargonic, lauric, myristic, palmitic, stearic, isostearic, hydroxystearic, myristoleic, palmitoleic, sapienic, oleic, elaidic, vaccenic, linoleic, linoelaidic, ricinoleic, arachidic, arachidonic, eicosapentaenoic, behenic, erucic, and docosahexaenoic acids and/or alcohols. According to aspects of the present disclosure, the lipid is or includes a fatty acid and/or fatty alcohol which is saturated, monounsaturated, polyunsaturated. According to aspects of the present disclosure, the lipid includes two or more fatty acids and/or fatty alcohols wherein each is independently selected from saturated, monounsaturated, and polyunsaturated fatty acids and/or fatty alcohols.

According to aspects of the present disclosure, a zwitterionic polymer included in particles in compositions for oral and/or mucosal administration of a biologically active agent is present in a copolymer with a lipid-derived polymer, wherein the copolymer includes a plurality of repeating hydrophobic units, where the structural formula of each repeating hydrophobic unit is: (R4)(C═)C—C(═O)O-Lipid1, (R4)(C═)C—C(═O)O—R5-O—(C═O)-Lipid2, (R4)(C═)C—C(═O)O—R5-PO4-Lipid2 or (R4)(C═)C—C(═O)—NH-Lipid3, where R4 is hydrogen or a C1-C4 alkyl group, R5 is a C1-C6 alkyl group, where (R4)(C═)C—C(═O)O-Lipid1 is a reaction product of OH-Lipid1 and (R4)(C═)C—C(═O)O—H, where OH-Lipid1 represents an OH group-containing lipid, wherein (R4)(C═)C—C(═O)O—R5-O—(C═O)-Lipid2 and (R4)(C═)C—C(═O)O—R5-PO4-Lipid2 are reaction products of OH—(C═O)-Lipid2 or PO42-Lipid2, respectively, with a suitable polymerizable moiety, and wherein (R4)(C═)C—C(═O)—NH-Lipid3 is a reaction product of NH2-Lipid3 with a suitable polymerizable moiety. According to aspects of the present disclosure, the lipid is or includes a fatty acid, a fatty alcohol, or both a fatty acid and a fatty alcohol. According to aspects of the present disclosure, the lipid is or includes a C4 to C28 fatty acid, a C4 to C28 fatty alcohol, or both a C4 to C28 fatty acid, and a C4 to C28 fatty alcohol. According to aspects of the present disclosure, the lipid is or includes a C4, C5, C6, C7, C8, C9, C10, C11, C12, C13, C14, C15, C16, C17, C18, C19, C20, C21, C22, C23, C24, C25, C26, C27, or C28 fatty acid and/or fatty alcohol. According to aspects of the present disclosure, the lipid is or includes a fatty acid and/or fatty alcohol selected from the group consisting of: caprylic, capric, lignoceric, cerotic, pelargonic, lauric, myristic, palmitic, stearic, isostearic, hydroxystearic, myristoleic, palmitoleic, sapienic, oleic, elaidic, vaccenic, linoleic, linoelaidic, ricinoleic, arachidic, arachidonic, eicosapentaenoic, behenic, erucic, and docosahexaenoic acids and/or alcohols. According to aspects of the present disclosure, the lipid is or includes a fatty acid and/or fatty alcohol which is saturated, monounsaturated, polyunsaturated. According to aspects of the present disclosure, the lipid includes two or more fatty acids and/or fatty alcohols wherein each is independently selected from saturated, monounsaturated, and polyunsaturated fatty acids and/or fatty alcohols.

According to aspects of the present disclosure, a zwitterionic polymer included in particles in compositions for oral and/or mucosal administration of a biologically active agent is present in a copolymer with a lipid-derived polymer, wherein the copolymer includes a plurality of repeating hydrophobic units, where the structural formula of each repeating hydrophobic unit is: [polymerizable moiety]-lipid, wherein the polymerizable moiety is selected from: an acrylate, a hydroxyalkyl ester, a polyvalent ester, and a vinyl ester.

According to aspects of the present disclosure, a zwitterionic polymer included in particles in compositions for oral and/or mucosal administration of a biologically active agent is present in a copolymer with a lipid-derived polymer, wherein the copolymer includes a plurality of repeating hydrophobic units, where the structural formula of each repeating hydrophobic unit is: [polymerizable moiety]-lipid, wherein the polymerizable moiety is selected from: a carbonate; an acrylate selected from the group consisting of: methacrylate, methyl (meth)acrylate, ethyl (meth)acrylate, butyl (meth)-acrylate, 2-ethylhexyl (meth)acrylate, phenyl (meth)acrylate and benzyl (meth)acrylate; a hydroxyalkyl ester selected from the group consisting of: 2-hydroxyethyl (meth)acrylate and 2-hydroxypropyl (meth)acrylate; a polyvalent ester selected from the group consisting of: ethylene glycol diacrylate, polyethylene glycol di(meth)acrylate, neopentyl glycol di(meth)acrylate, trimethylolpropane tri(meth)acrylate and pentaerythritol tetraacrylate; (meth)acrylonitrile, (meth)acrylamide, N-substituted (meth)acrylamide; a vinyl ester selected from the group consisting of: vinyl acrylate, vinyl acetate, vinyl propionate and vinyl succinate; a vinyl compound selected from the group consisting of: a vinyl ether, styrene, halogenated styrene, divinylbenzene, vinylnaphthalene, N-vinylpyrrolidone, diallyl phthalate, diallyl malate, and triallyl isocyanate triallyl phosphate.

According to aspects of the present disclosure, a zwitterionic polymer included in particles in compositions for oral and/or mucosal administration of a biologically active agent is present in a copolymer with a lipid-derived polymer, wherein the copolymer includes a plurality of repeating hydrophobic units, where the structural formula of each repeating hydrophobic unit is: [polymerizable moiety]-lipid, wherein the polymerizable moiety is a methacrylate moiety.

According to aspects of the present disclosure, a zwitterionic polymer and/or copolymer included in particles in compositions for oral and/or mucosal administration of a biologically active agent includes a polymer selected from the group consisting of: poly(3-[[2-(methacryloyloxy)ethyl]dimethylammonio]propionate) (PCBMA); poly(N-(carboxymethyl)-2-hydroxy-N,N-dimethyl-3-[(2-methyl-1-oxo-2-propen-1-yl)oxy]-1-propanaminium) (PCBOH); poly[2-(methacryloyloxy)ethyl]dimethyl-(3-sulfopropyl) ammonium hydroxide (PSBMA); poly(((2R)-3-carboxy-N,N,N-trimethyl-2-[(1-oxo-2-propen-1-yl)oxy]-1-propanaminium) (PCAR); and poly(methacryloyloxyethyl phosphorylcholine) (PMPC).

According to aspects of the present disclosure, a zwitterionic polymer and/or copolymer included in particles in compositions for oral and/or mucosal administration of a biologically active agent includes two or more polymers selected from the group consisting of: poly(3-[[2-(methacryloyloxy)ethyl]dimethylammonio]propionate) (PCBMA); poly(N-(carboxymethyl)-2-hydroxy-N,N-dimethyl-3-[(2-methyl-1-oxo-2-propen-1-yl)oxy]-1-propanaminium) (PCBOH); poly[2-(methacryloyloxy)ethyl]dimethyl-(3-sulfopropyl)ammonium hydroxide (PSBMA); poly(((2R)-3-carboxy-N,N,N-trimethyl-2-[(1-oxo-2-propen-1-yl)oxy]-1-propanaminium) (PCAR); and poly(methacryloyloxyethyl phosphorylcholine) (PMPC).

According to aspects of the present disclosure, a zwitterionic polymer included in particles in compositions for oral and/or mucosal administration of a biologically active agent is present in a copolymer with a lipid-derived polymer, wherein the copolymer includes a plurality of repeating hydrophobic units, where the structural formula of each repeating hydrophobic unit is: [polymerizable moiety]-lipid, wherein the [polymerizable moiety]-lipid is octadecyl acrylate (ODA) and wherein the polymerized [polymerizable moiety]-lipid is poly(octadecyl acrylate) (PODA).

According to aspects of the present disclosure, a zwitterionic polymer included in particles in compositions for oral and/or mucosal administration of a biologically active agent is present in a copolymer with a lipid-derived polymer, wherein the copolymer is selected from the group consisting of: PCBMA-PODA, PCBOH-PODA, PSBMA-PODA, PCAR-PODA, PMPC-PODA, and a combination of any two or more thereof.

Compositions for oral and/or mucosal administration of a biologically active agent are provided according to aspects of the present disclosure which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the biologically active agent is or includes a protein, peptide, or dietary supplement, wherein the particles include hydrogel particles, the hydrogel particles including one or more zwitterionic polymers, and wherein the one or more zwitterionic polymers are crosslinked. According to aspects of the present disclosure, the one or more zwitterionic polymers are crosslinked via a non-zwitterionic crosslinker in hydrogel particles. According to aspects of the present disclosure, the one or more zwitterionic polymers are crosslinked via a non-zwitterionic crosslinker selected from the group consisting of: allyl methacrylate, diallyl itaconate, monoallyl itaconate, dially maleate, diallyl fumarate, diallyl succinate, diallyl phthalate, triallyl cyanurate, triallyl isocyanurate, diethylene glycol bis-allyl carbonate, divinyl ether of diethylene glycol, triallyl phosphate, triallyl trimellitate, allyl ether, diallylimidazolidone, pentaerythritol triallyl ether (PETE), N,N-diallylmelamine, triallyl-1,3,5-triazine-2,4,6-(1H,3H,5H)trione (TATT), 2,4,6-Triallyloxy-1,3,5-triazine; vinyl compounds, e.g. divinyl benzene, N,N'-methylene bis acrylamide (MBAA), methylenebis (methacrylamide), ethylene glycol dimethacrylate, ethylene glycol diacrylate, neopentylglycol dimethacrylate, tetraethylene glycol dimethacrylate, polyethylene glycol dimethacrylate, polyethylene glycol diacrylate, hexamethylene bis maleimide, divinyl urea, bisphenol A bis methacrylate, divinyl adipate, glycerin trimethacrylate, trimethylolpropane triacrylate, trivinyl trimellitate, 1,5-pentadiene, 1,7-octadiene, 1,9-decadiene, 1,3-bis(4-methacryloxybutyl) tetramethyl disiloxane, divinyl ether, divinyl sulfone, N-vinyl-3 (E)-ethylidene pyrrolidone (EVP), ethylidene bis(N-vinyl pyrrolidone) (EBVP), and two or more thereof.

According to aspects of the present disclosure, the one or more zwitterionic polymers are crosslinked via non-zwitterionic crosslinker MBAA.

According to aspects of the present disclosure, the one or more zwitterionic polymers are crosslinked via a non-zwitterionic crosslinker which is degradable under physiological conditions, such as, an acrylate, methacrylate, acrylamide, or methacrylamide non-zwitterionic crosslinker. According to aspects of the present disclosure, the one or more zwitterionic polymers are crosslinked via a non-zwitterionic crosslinker which is degradable under physiological conditions is or includes N,N'-bis(acryloyl)cystamine.

Compositions for oral and/or mucosal administration of a biologically active agent are provided according to aspects of the present disclosure, wherein the biologically active agent is or includes an antibody.

Compositions for oral and/or mucosal administration of a biologically active agent are provided according to aspects of the present disclosure, wherein the biologically active agent is or includes a nutritional supplement.

Compositions for oral and/or mucosal administration of a biologically active agent are provided according to aspects of the present disclosure, wherein the biologically active agent is or includes a nutritional supplement selected from the group consisting of: Coenzyme Q10, fish oil, krill oil, omega-3, 6, 9, a fat-soluble vitamin, or any two or more thereof.

Compositions for oral and/or mucosal administration of a biologically active agent are provided according to aspects of the present disclosure, wherein the biologically active agent is or includes a fat-soluble vitamin selected from the group consisting of: vitamins A, D, E, K, or any two or more thereof.

Compositions for oral and/or mucosal administration of a biologically active agent are provided according to aspects of the present disclosure, wherein the biologically active agent is or includes an antidiabetic agent which is a protein or peptide.

Compositions for oral and/or mucosal administration of a biologically active agent are provided according to aspects of the present disclosure, wherein the biologically active agent is or includes an antidiabetic agent selected from the group consisting of: insulin, human insulin, a protein or peptide human insulin analogue or derivative, a glucagon-like peptide (GLP-1), a protein or peptide GLP-1 analogue, a protein or peptide GLP-1 receptor agonist, dulaglutide, exenatide, semaglutide, liraglutide, and lixisenatide, a biologically acceptable salt or solvate of any thereof, and an analogue or derivative of any thereof.

Compositions for oral and/or mucosal administration of a biologically active agent are provided according to aspects of the present disclosure, wherein the biologically active agent includes two or more antidiabetic agents selected from the group consisting of: insulin, human insulin, a protein or peptide human insulin analogue or derivative, a glucagon-like peptide (GLP-1), a protein or peptide GLP-1 analogue, a protein or peptide GLP-1 receptor agonist, dulaglutide, exenatide, semaglutide, liraglutide, and lixisenatide, a biologically acceptable salt or solvate of any thereof, and an analogue or derivative of any thereof.

Compositions for oral and/or mucosal administration of a biologically active agent are provided according to aspects of the present disclosure, wherein the biologically active agent is or includes insulin.

Compositions for oral and/or mucosal administration of a biologically active agent are provided according to aspects of the present disclosure which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the biologically active agent is or includes a protein, peptide, or dietary supplement, and which include an additive effective to aggregate and/or condense, and/or insolubilize the biologically active agent.

According to aspects of the present disclosure, the additive interacts with the biologically active agent through electrostatic interaction, is condensed and/or precipitated with the biologically active agent, and/or physically interacts with the biologically active agent.

According to aspects of the present disclosure, the additive is selected from protamine, a metal ion, polylactic acid (PLA), and poly(lactic-co-glycolic acid) (PLGA). According to aspects of the present disclosure, the additive includes two or more of protamine, a metal ion, polylactic acid (PLA), and poly(lactic-co-glycolic acid) (PLGA). According to aspects of the present disclosure, the metal ion is Zn2+ and/or Ca2+.

According to aspects of the present disclosure, the plurality of particles has an average particle size in the range of 5 nanometers to 10 microns.

Compositions for oral and/or mucosal administration of a biologically active agent are provided according to aspects of the present disclosure which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the composition is lyophilized.

Compositions for oral and/or mucosal administration of a biologically active agent are provided according to aspects of the present disclosure which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the composition is an oral formulation comprising an enteric coating.

Compositions for oral and/or mucosal administration of a biologically active agent are provided according to aspects of the present disclosure which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the composition is an oral formulation in the form of a tablet or capsule.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is conjugated to a lipid; and a biologically active agent disposed on the exterior surface and/or in the particle interior, wherein the biologically active agent is or includes a protein, peptide, or dietary supplement.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is poly(N-methacryloyloxyethyl-N,N-dimethylammonium-α-N-methylcarboxybetaine (PCB), and wherein the PCB is conjugated to distearoylphosphatidylethanolamine (DSPE); and a biologically active agent disposed on the exterior surface and/or in the particle interior, wherein the biologically active agent is or includes a protein, peptide, or dietary supplement.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is or includes an antibody.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is or includes a nutritional supplement.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is or includes a nutritional supplement selected from the group consisting of: Coenzyme Q10, fish oil, krill oil, omega-3, 6, 9, a fat-soluble vitamin, or any two or more thereof.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is or includes a fat-soluble vitamin selected from the group consisting of: vitamins A, D, E, K, or any two or more thereof.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is or includes an antidiabetic agent which is a protein or peptide.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is or includes an antidiabetic agent selected from the group consisting of: insulin, human insulin, a protein or peptide human insulin analogue or derivative, a glucagon-like peptide (GLP-1), a protein or peptide GLP-1 analogue, a protein or peptide GLP-1 receptor agonist, dulaglutide, exenatide, semaglutide, liraglutide, and lixisenatide, a biologically acceptable salt or solvate of any thereof, and an analogue or derivative of any thereof.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent includes two or more antidiabetic agents selected from the group consisting of: insulin, human insulin, a protein or peptide human insulin analogue or derivative, a glucagon-like peptide (GLP-1), a protein or peptide GLP-1 analogue, a protein or peptide GLP-1 receptor agonist, dulaglutide, exenatide, semaglutide, liraglutide, and lixisenatide, a biologically acceptable salt or solvate of any thereof, and an analogue or derivative of any thereof.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is or includes insulin.

Compositions for oral and/or mucosal administration of a biologically active agent of claim is provided according to aspects of the present disclosure, which includes: a plurality of particles, wherein each particle has an exterior surface, the exterior surface defining a particle interior, the exterior surface having at least one type of zwitterionic polymer disposed thereon and/or extending therefrom, wherein the zwitterionic polymer is PCB, and wherein the PCB is conjugated to DSPE; and a biologically active agent disposed on the exterior surface and/or in the particle interior, wherein the biologically active agent is a protein, peptide, or dietary supplement, and which include an additive effective to aggregate and/or condense, and/or insolubilize the biologically active agent. According to aspects of the present disclosure, the additive interacts with the biologically active agent through electrostatic interaction, is condensed and/or precipitated with the biologically active agent, and/or physically interacts with the biologically active agent.

According to aspects of the present disclosure, the additive is selected from protamine, a metal ion, polylactic acid (PLA), and poly(lactic-co-glycolic acid) (PLGA). According to aspects of the present disclosure, the additive includes two or more of protamine, a metal ion, polylactic acid (PLA), and poly(lactic-co-glycolic acid) (PLGA). According to aspects of the present disclosure, the metal ion is Zn2+ and/or Ca2+.

Methods of treating a subject in need thereof, are provided according to aspects of the present disclosure which include administering a composition for oral and/or mucosal administration of a biologically active agent which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the biologically active agent is or includes a protein, peptide, or dietary supplement. According to aspects of the present disclosure, the composition is administered orally and/or to a mucous membrane of the subject.

Methods of treating a subject in need thereof, are provided according to aspects of the present disclosure which include administering a composition for oral and/or mucosal administration of a biologically active agent which include: a plurality of particles, wherein each particle has an exterior surface, the exterior surface defining a particle interior, the exterior surface having at least one type of zwitterionic polymer and/or zwitterionic copolymer disposed thereon and/or extending therefrom; and a biologically active agent disposed on the exterior surface and/or in the particle interior, wherein the subject has diabetes and the biologically active agent is or includes an antidiabetic agent. According to aspects of the present disclosure, the composition is administered orally and/or to a mucous membrane of the subject.

data represent three independent experiments with 50 particles tracked for each experiment (N=3 independent samples, means connected);

FIGS. 3A, 3B, 3C, and 3D generally show zwitterionic micelle/insulin formulation: characterization, high intestinal absorption efficacy, and transporter mediated absorptive mechanism.

Figure 3A:
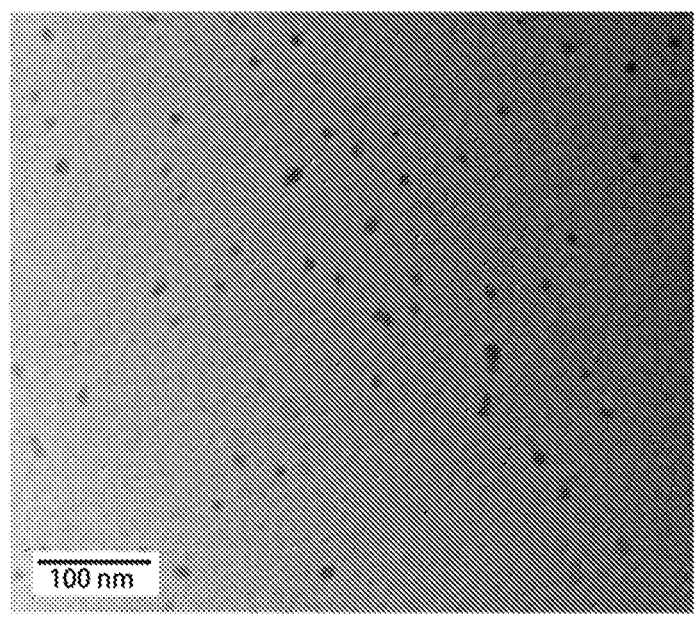
Figure 3D:
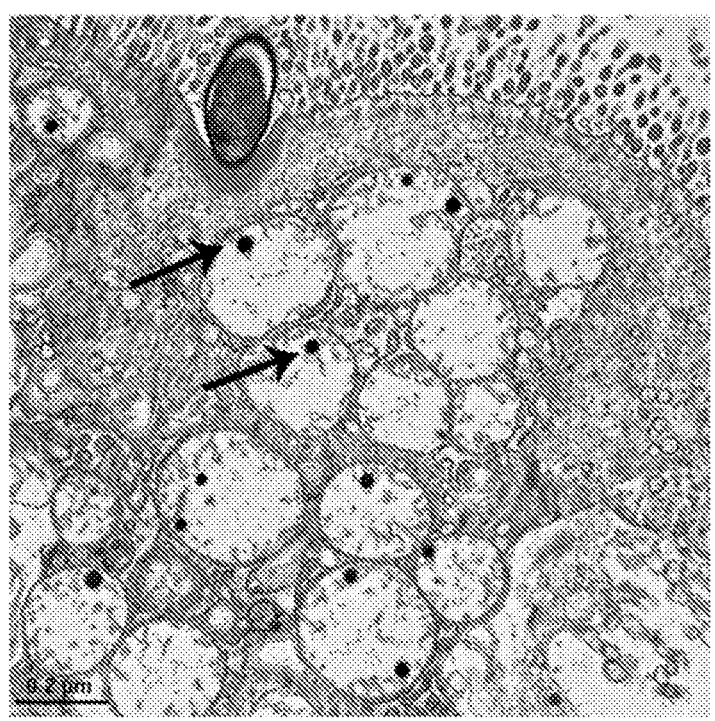
Figure 3B:
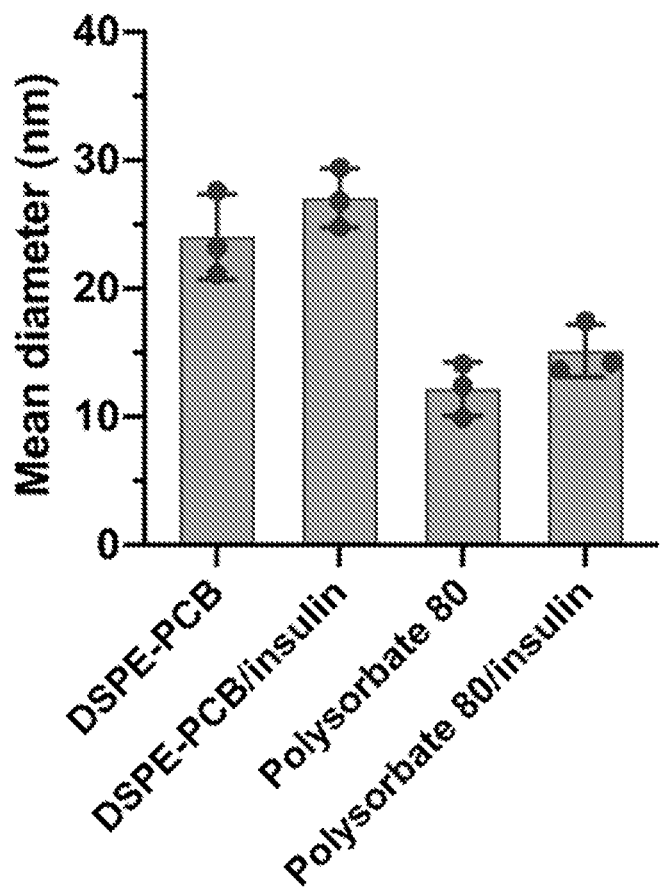
Figure 3C:
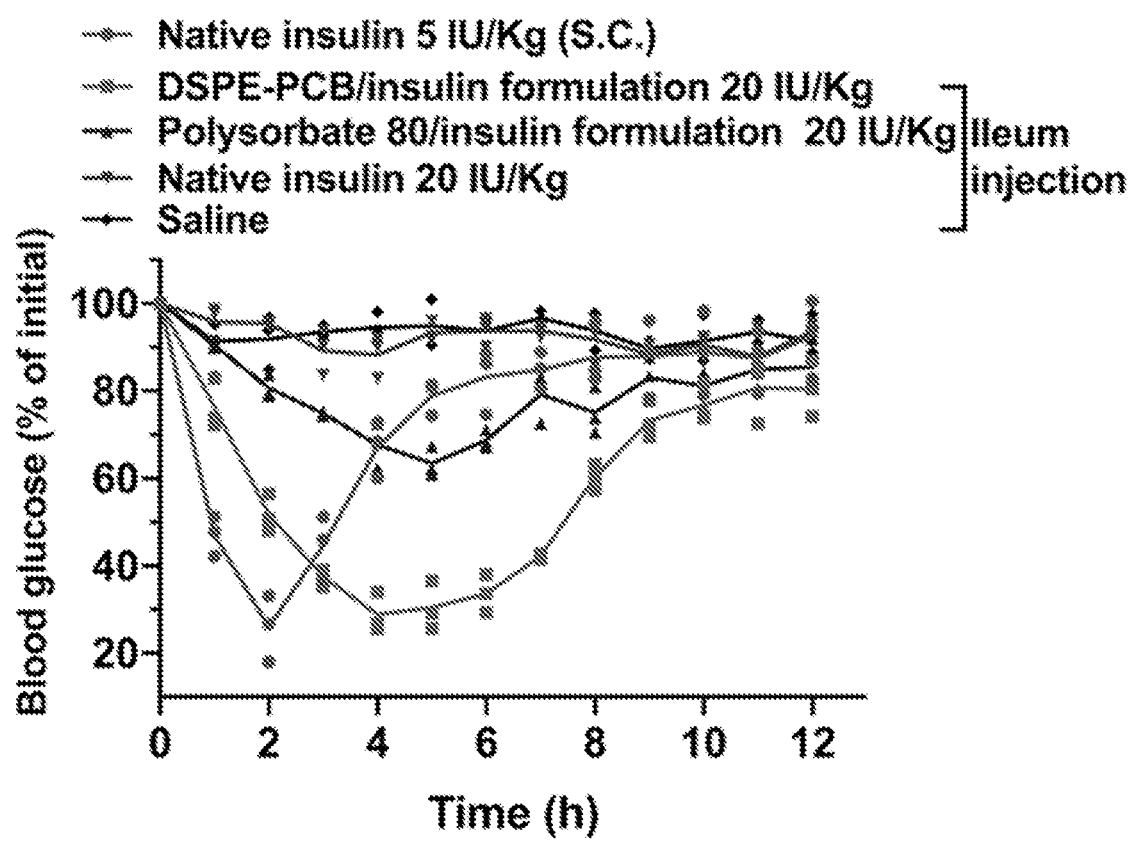
Figure 4A:
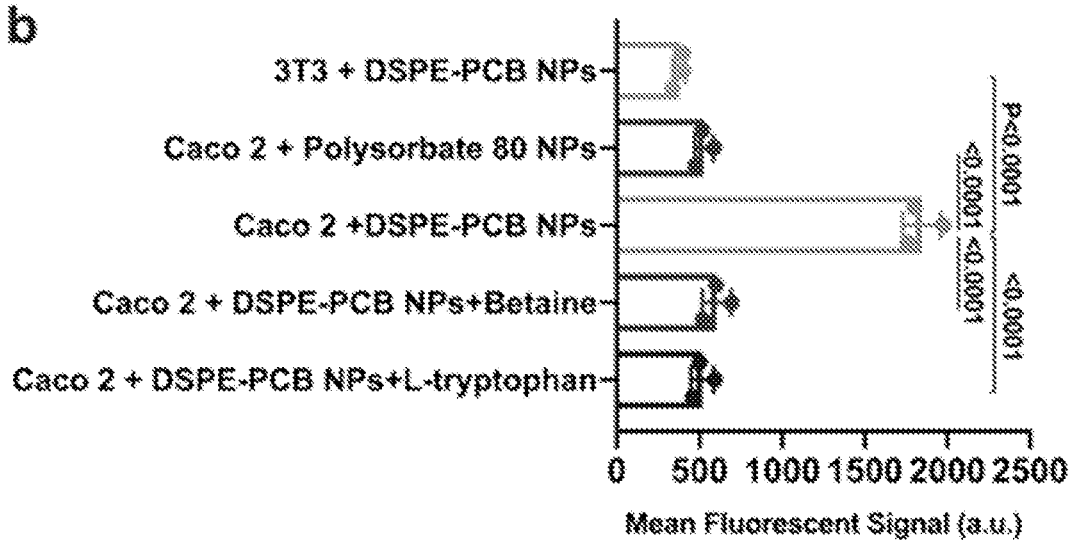
Figure 4B:
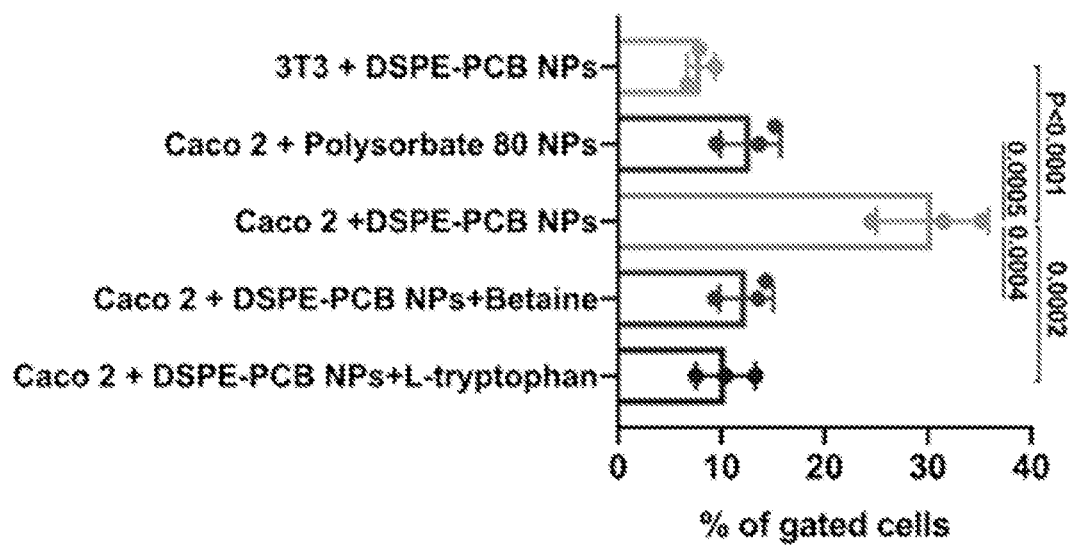
Figure 5A:
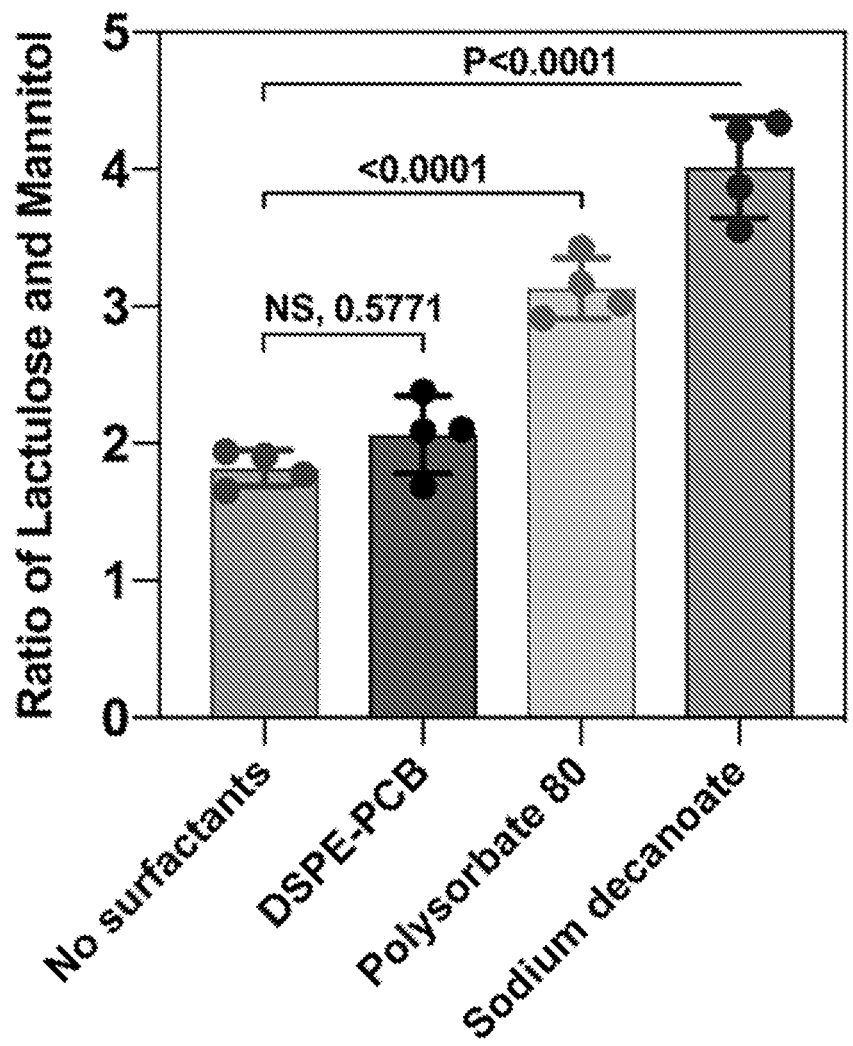
Figure 5B:
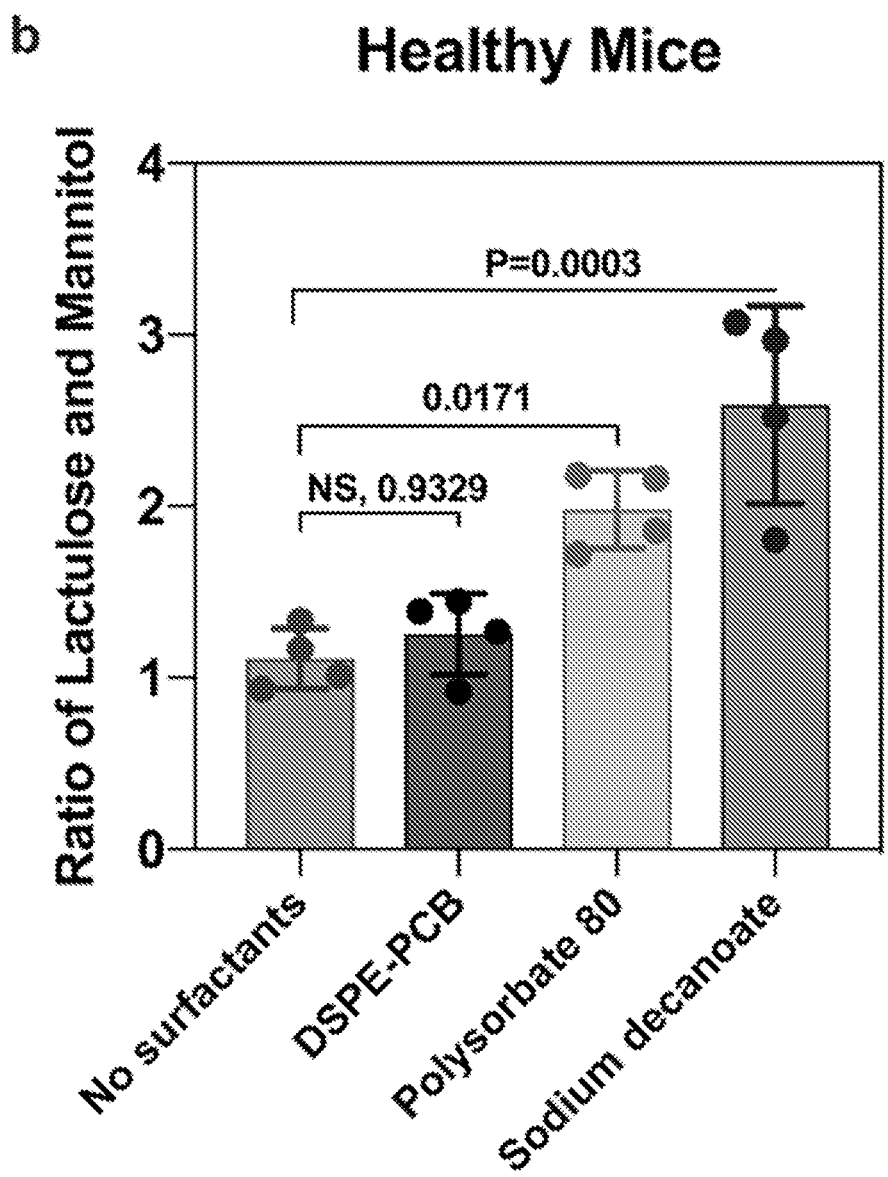
Figure 5C:
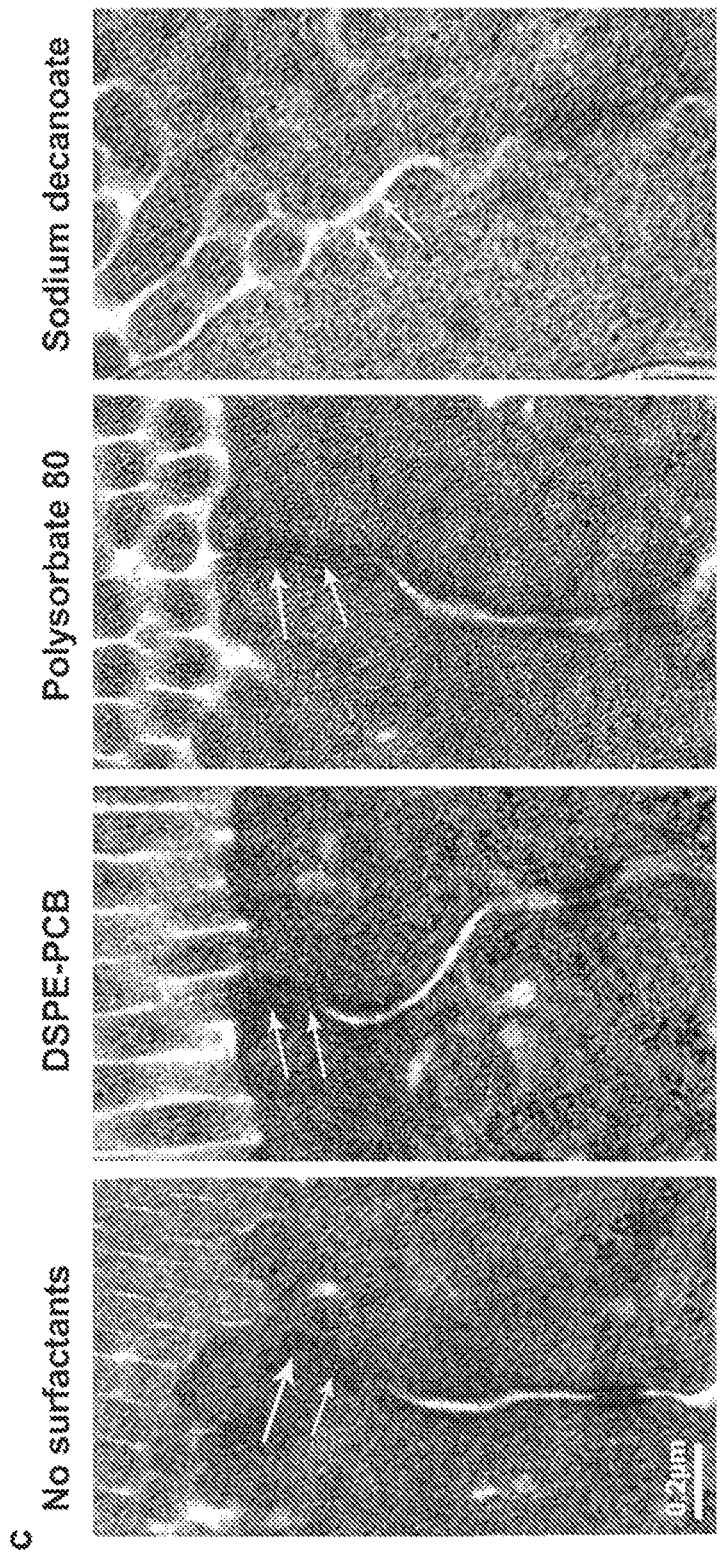

FIG. 3A is a representative TEM image of DSPE-PCB/insulin formulation;

FIG. 3B is a graph showing hydrodynamic size of different micelle, and micelle/insulin formulations (N=3 independent experiments, mean±SD) measured by DLS;

FIG. 3C is a graph showing blood glucose lowering (pharmacological) performance for DSPE-PCB/insulin formulation on diabetic mice through ileum injection, compared with polysorbate 80/insulin formulation and non-formulated native insulin at the same dose of 20 IU/Kg (N=3 biologically independent animals, means connected); insulin/ZnCl2 feeding ratio is 2.5/1 by weight; subcutaneously injected native insulin at 5 IU/Kg was used as a control (1 IU/ml);

FIG. 3D is a representative TEM image of epithelial tissues collected 1 hour after the ileum injection of DSPE-PCB/gold nanoparticles; scale bar shown is 0.2 μm; this experiment was repeated independently three times with similar results;

FIG. 4A and FIG. 4B generally demonstrate that in vitro cellular uptake of zwitterionic micelle particles showed a transporter-mediated mechanism;

FIG. 4A is a graph showing quantitated results of confocal data of zwitterionic DSPE-PCB and polysorbate 80 fluorescently labeled polystyrene nanoparticles incubated with 3T3 cells, Caco-2 cells, or Caco-2 cells treated with betaine or L-tryptophan (PAT1 substrates) (N=3 biologically independent samples, mean±SD); a one-way analysis of variance with Tukey multi-comparison was used for statistical analysis;

FIG. 4B is a graph showing quantitated results of flow cytometry data of zwitterionic DSPE-PCB and polysorbate 80 fluorescently labeled polystyrene nanoparticles incubated with 3T3 cells, Caco-2 cells, or Caco-2 cells treated with betaine or L-tryptophan (PAT1 substrates) (N=3 biologically independent samples, mean±SD); a one-way analysis of variance with Tukey multi-comparison was used for statistical analysis;

FIGS. 5A, 5B, and 5C demonstrated that zwitterionic micelle/insulin treatment did not open intestinal tight junctions.

Figure 6A:
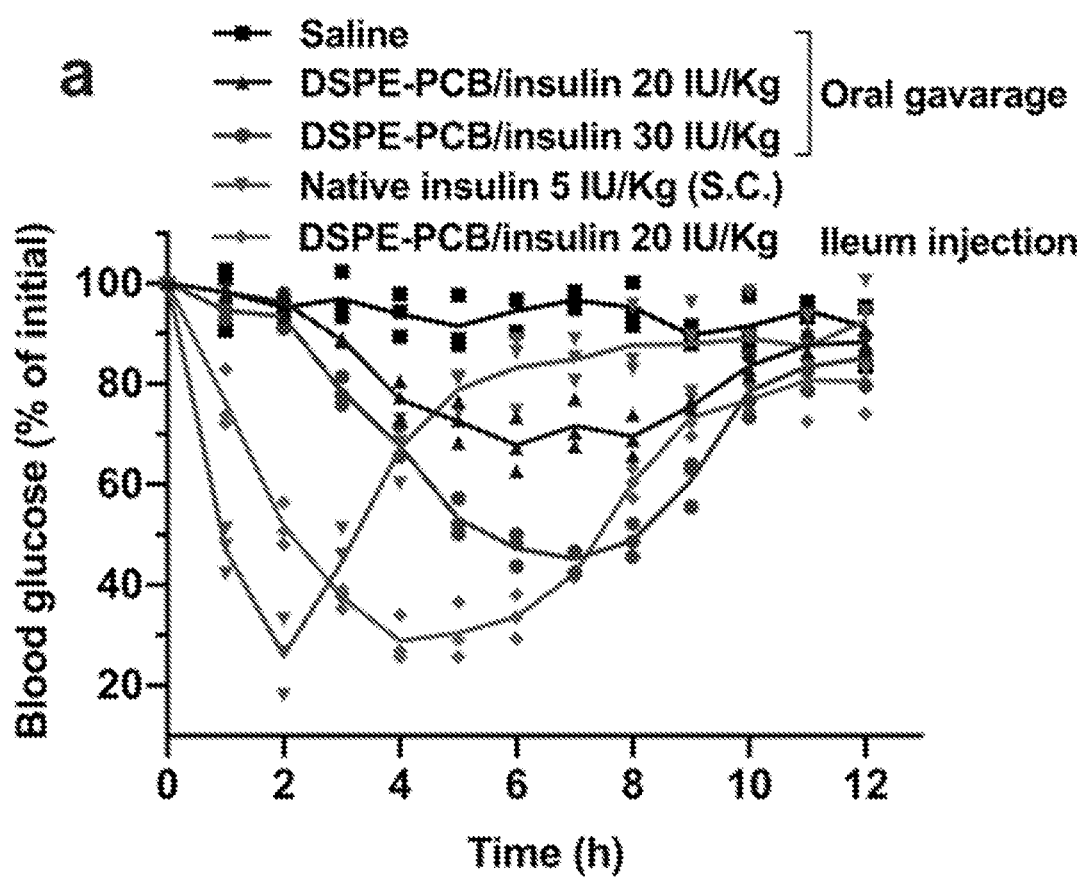
Figure 6B:
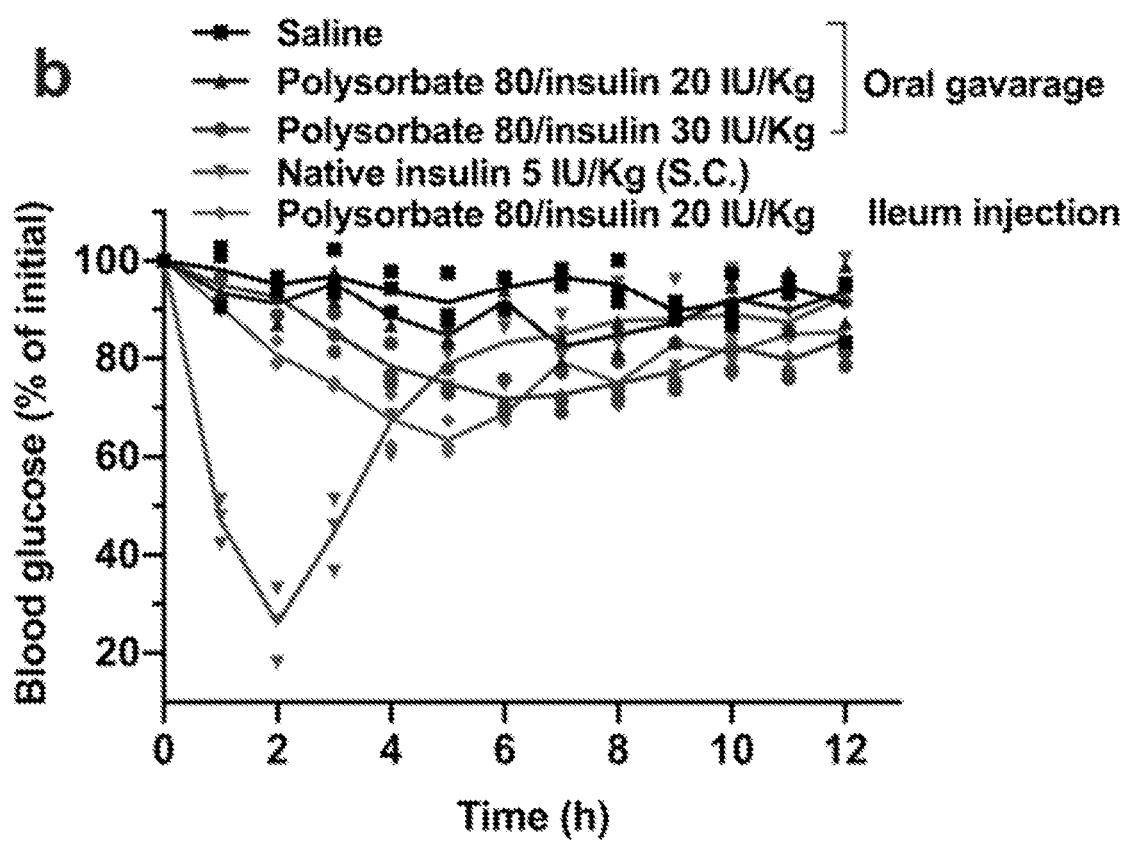
Figure 6C:
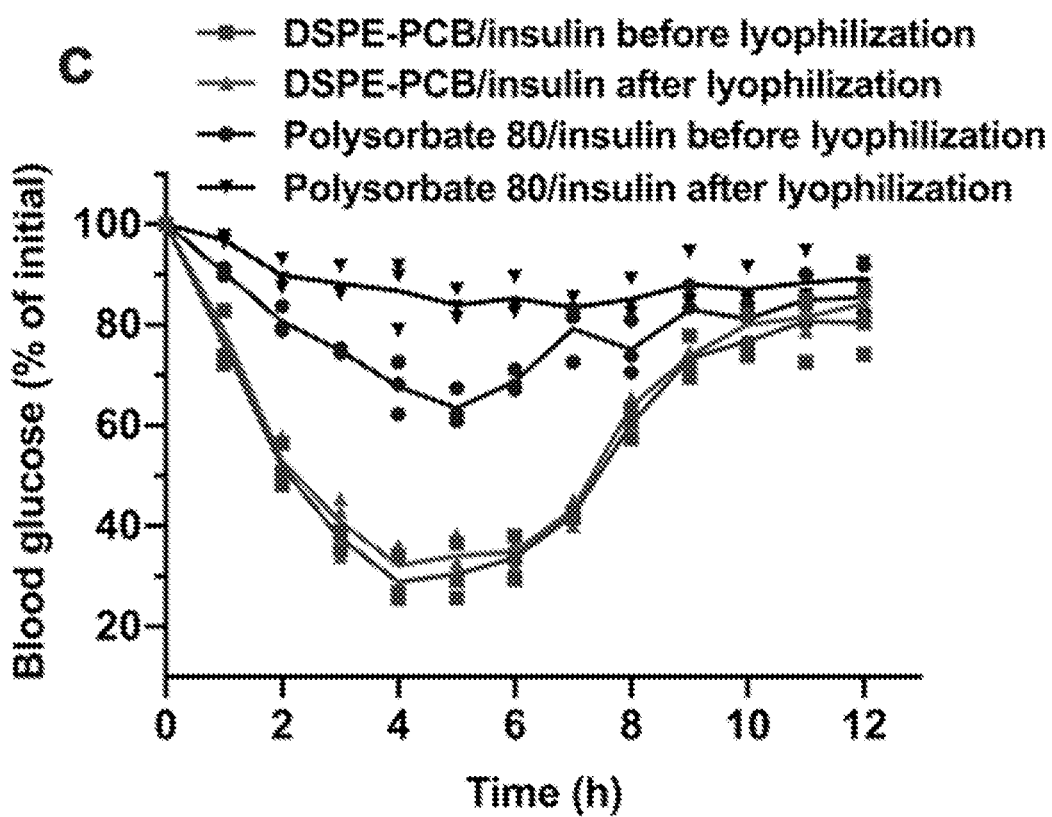

FIG. 5A is a graph showing results of intestinal permeability tests on diabetic mice; one hour after co-administering lactulose, mannitol, and different types of surfactants through ileum injection, urine was collected to measure the ratio of lactulose and mannitol contents (N=4 biologically independent animals, mean±SD); a one-way analysis of variance with Tukey multi-comparison was used for statistical analysis (NS: not significant);

FIG. 5B is a graph showing results of intestinal permeability tests on healthy mice; one hour after co-administering lactulose, mannitol, and different types of surfactants through ileum injection, urine was collected to measure the ratio of lactulose and mannitol contents (N=4 biologically independent animals, mean±SD); a one-way analysis of variance with Tukey multi-comparison was used for statistical analysis (NS: not significant);

FIG. 5C shows representative TEM images of epithelial tissues at one hour post-ileum injection of different types of surfactants; tight junctions are indicated by arrows; scale bar shown is 0.2 μm;

FIG. 6A is a graph showing blood glucose lowering (pharmacological) performance for a DSPE-PCB/insulin aqueous formulation on diabetic mice through oral gavage at 20 and 30 IU/Kg compared with ileum injection at 20 IU/kg (N=3 biologically independent animals, means connected); insulin/ZnCl2 feeding ratio is 2.5/1 by weight; subcutaneously injected native insulin at 5 IU/Kg was used as a control (1 IU/ml);

FIG. 6B is a graph showing blood glucose lowering (pharmacological) performance for a polysorbate 80/insulin aqueous formulation on diabetic mice through oral gavage at 20 and 30 IU/Kg compared with ileum injection at 20 IU/kg (N=3 biologically independent animals, means connected); insulin/ZnCl2 feeding ratio is 2.5/1 by weight; subcutaneously injected native insulin at 5 IU/Kg was used as a control (1 IU/ml);

FIG. 6C is a graph showing blood glucose lowering (pharmacological) performance for DSPE-PCB/insulin and polysorbate 80/insulin aqueous formulation on diabetic mice through ileum injection at 20 IU/Kg before and after a lyophilization procedure (N=3 biologically independent animals, means connected);

FIGS. 7A, 7B, 7C, 7D, and 7E demonstrate pharmacological activity and bioavailability of an oral insulin capsule containing zwitterionic micelle/insulin, and the capability in adjusting the drug acting profile.

Figure 7A:
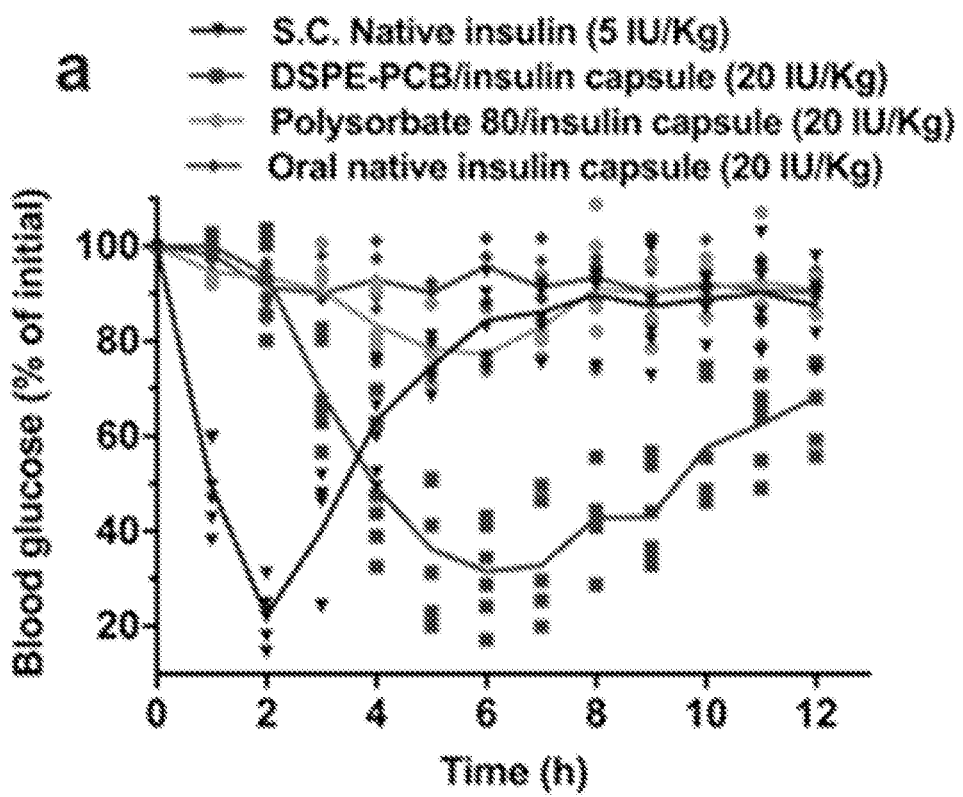
Figure 7B:
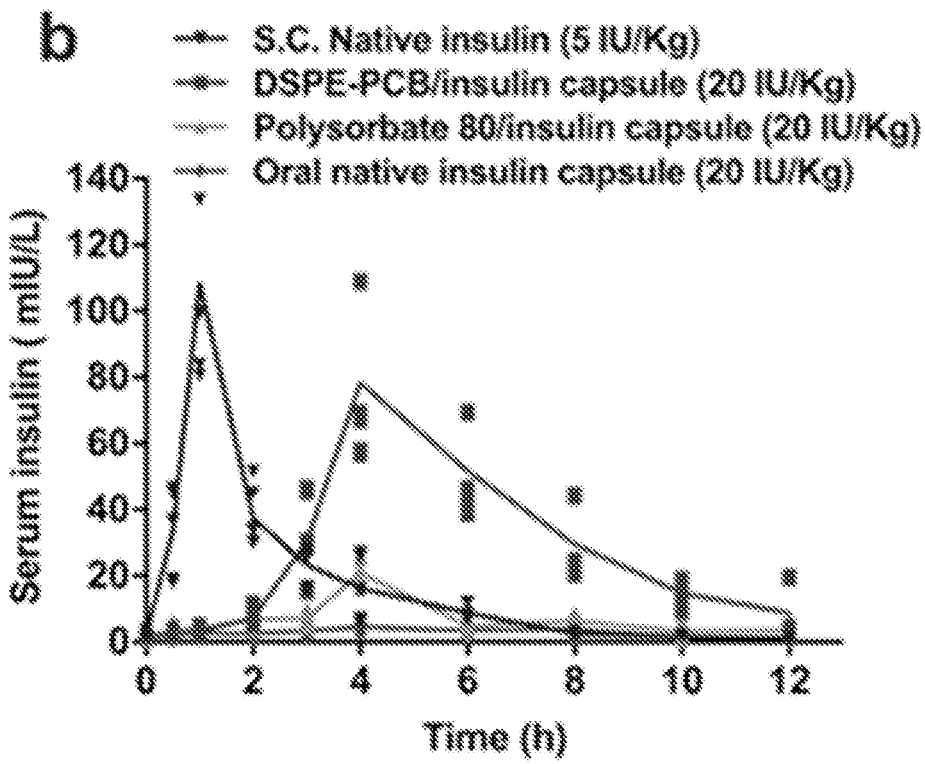

FIG. 7A is a graph showing blood glucose lowering (pharmacological) performance for DSPE-PCB/insulin capsule on diabetic rats through oral gavage, compared with polysorbate 80/insulin capsule at the same dose of 20 IU/Kg (N=6 biologically independent animals, means connected); insulin/ZnCl2 feeding ratio is 2.5/1 by weight; subcutaneously injected native insulin at 5 IU/Kg was used as a control (10 IU/ml);

FIG. 7B is a graph showing serum insulin concentration (bioavailability) for DSPE-PCB/insulin capsule on diabetic rats through oral gavage, compared with polysorbate 80/insulin capsule and native insulin capsule at the same dose of 20 IU/Kg (N=6 biologically independent animals, means connected); subcutaneously injected native insulin at 5 IU/Kg was used as a control.

Figure 7C:
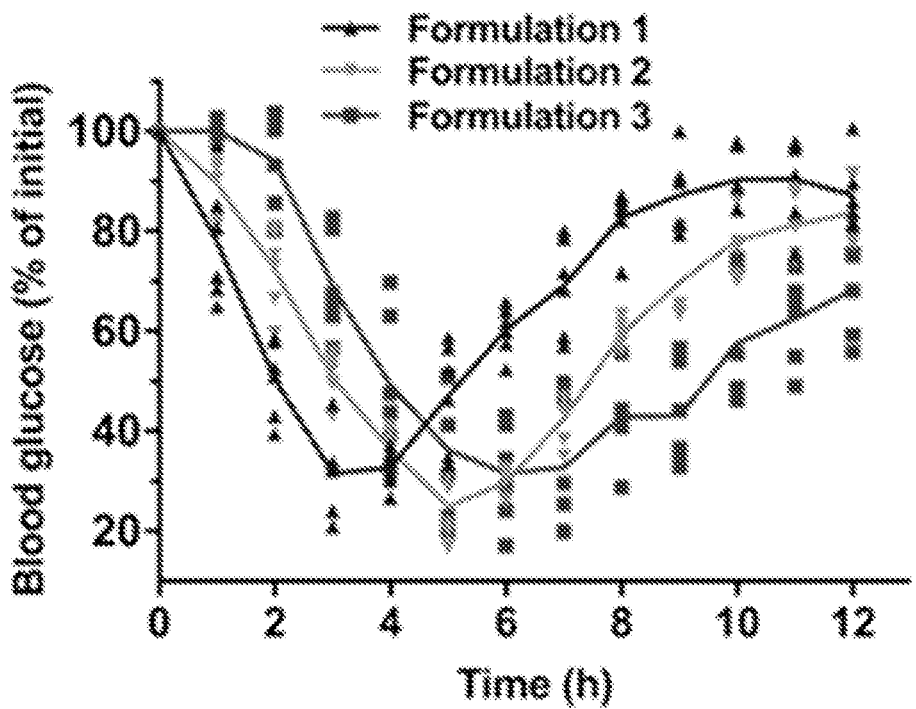
Figure 7D:
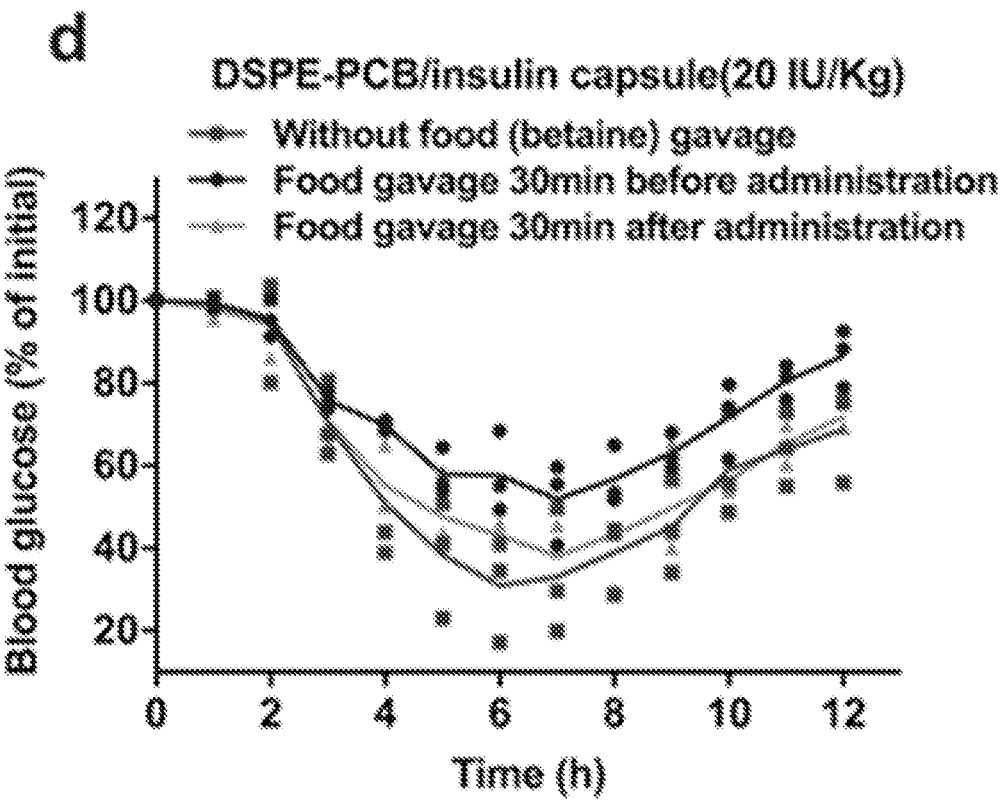
Figure 7E:
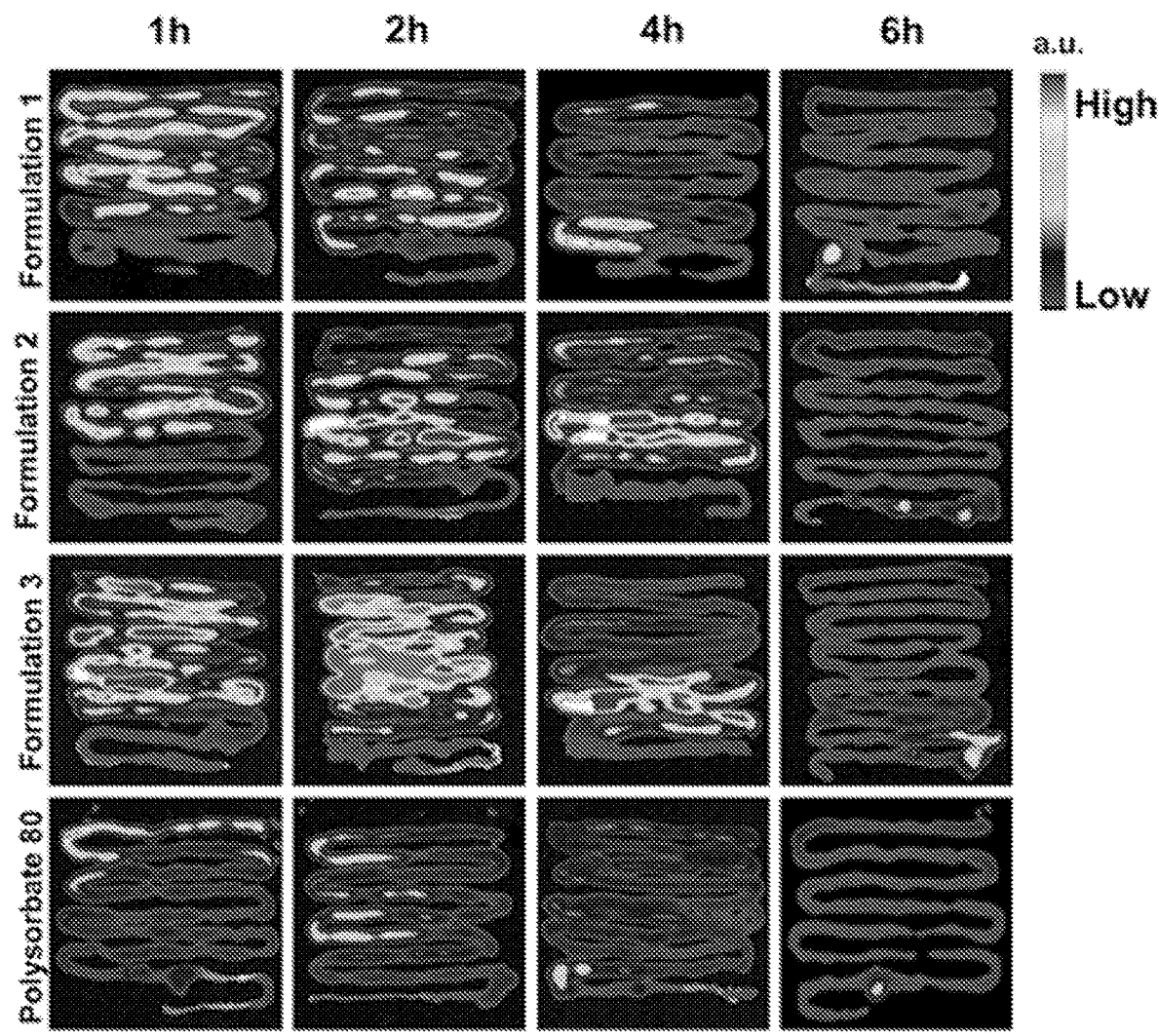

FIG. 7C is a graph showing blood glucose lowering (pharmacological) performance for various formulations of DSPE-PCB/insulin capsules on diabetic rats through oral gavage (N=6 biologically independent animals, means connected); formulations 1, 2, and 3 had an insulin/ZnCl2 feeding ratio of 50/1, 20/1, and 2.5/1 by weight during the encapsulation process, respectively; their drug loading is 6.24%, 6.23% and 6.10%, while the corresponding particle hydrodynamic sizes are 28.52, 26.36 and 25.96 nm, respectively;

FIG. 7D is a graph showing food effect on the glucose-lowing efficacy of DSPE-PCB/insulin capsule; diabetic rats received oral gavage of 80 mg/kg betaine water (model food) 30 minutes before or after the oral gavage of DSPE-PCB/insulin capsule, followed by blood glucose measurement at predetermined intervals (N=3 biologically independent animals, means connected);

FIG. 7E is a set of images showing absorption sites and kinetics of orally delivered insulin; healthy rats were administered with DSPE-PCB/Cy7-insulin enteric capsules (Formulations 1-3) or Polysorbate 80/Cy7-insulin enteric capsule (20 IU/kg) by oral gavage after fasting for 12 hours; at different post-administration time points, the entire intestine was collected and visualized with the Bruker In-Vivo Xtreme imaging system; a.u., arbitrary units; experiments were repeated independently twice with similar results;

FIGS. 8A, 8B, 8C, 8D, 8E, 8F, 8G, 8H, 8I, 8J, 8K, and 8L, demonstrate that DSPE-PCB micelles show no significant cytotoxicity or leaky gut-related endotoxin leakage and inflammation of repeated consecutive dosing.

Figure 8A:
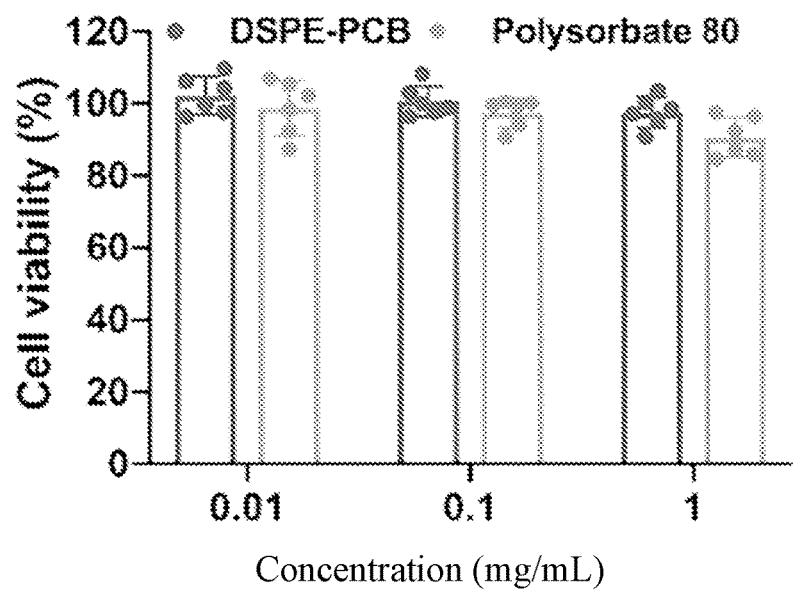
Figure 8B:
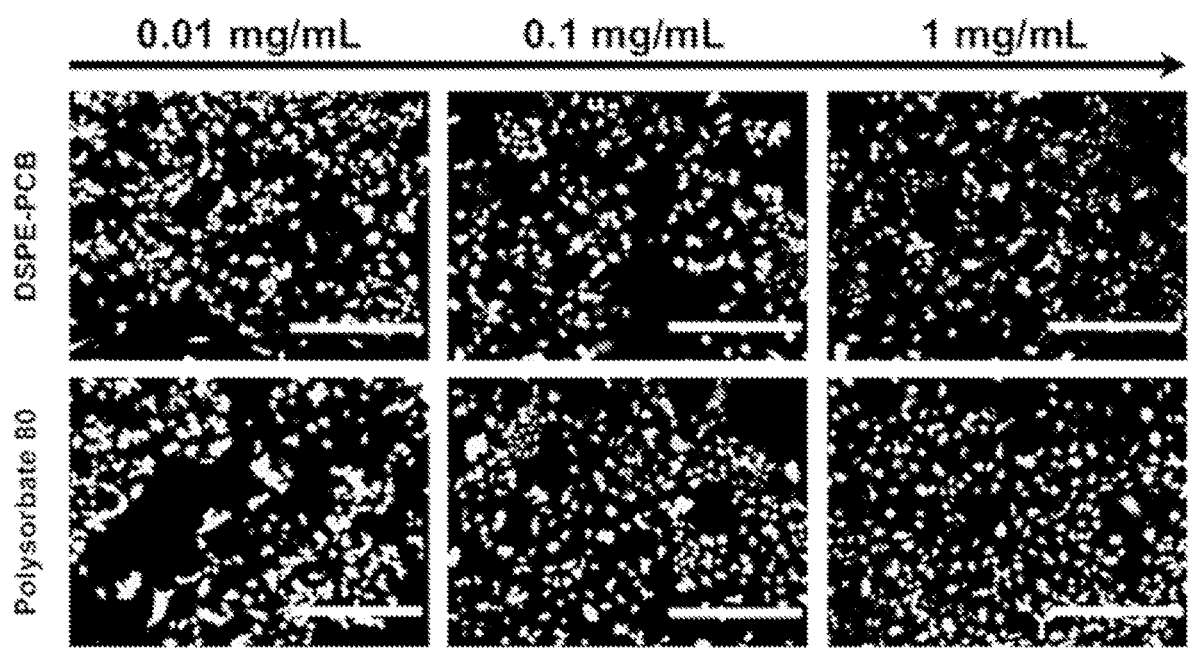
Figure 8C:
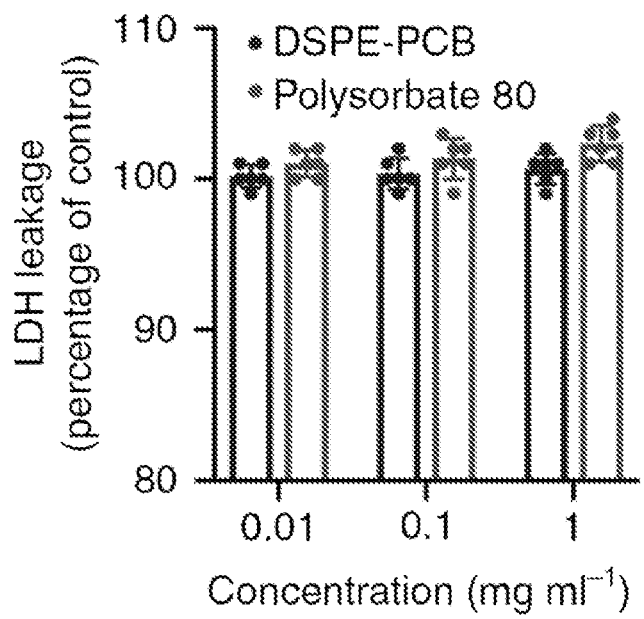
Figure 8D:
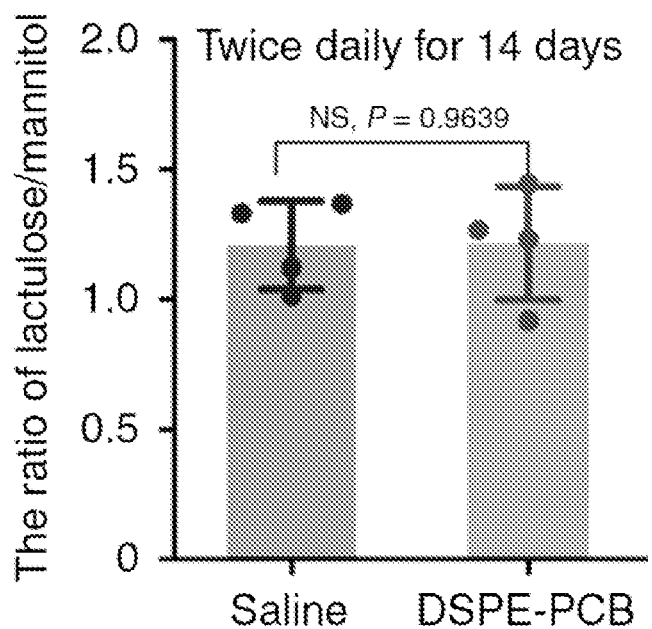
Figure 8E:
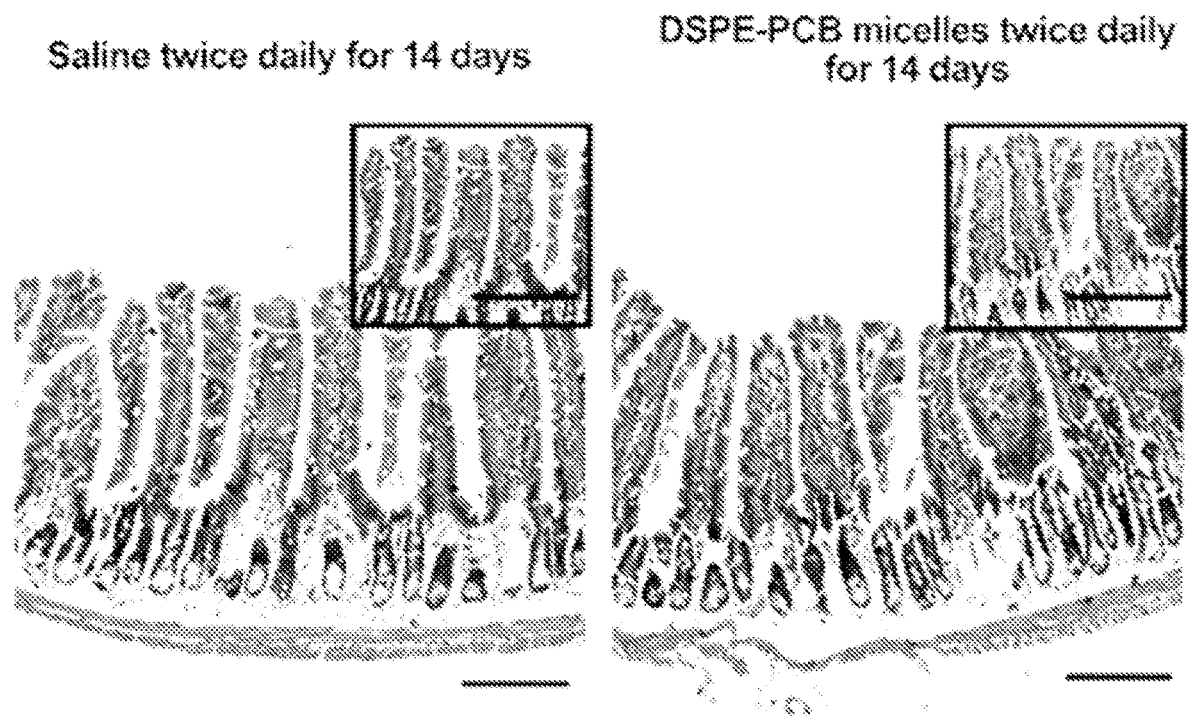
Figure 8F:
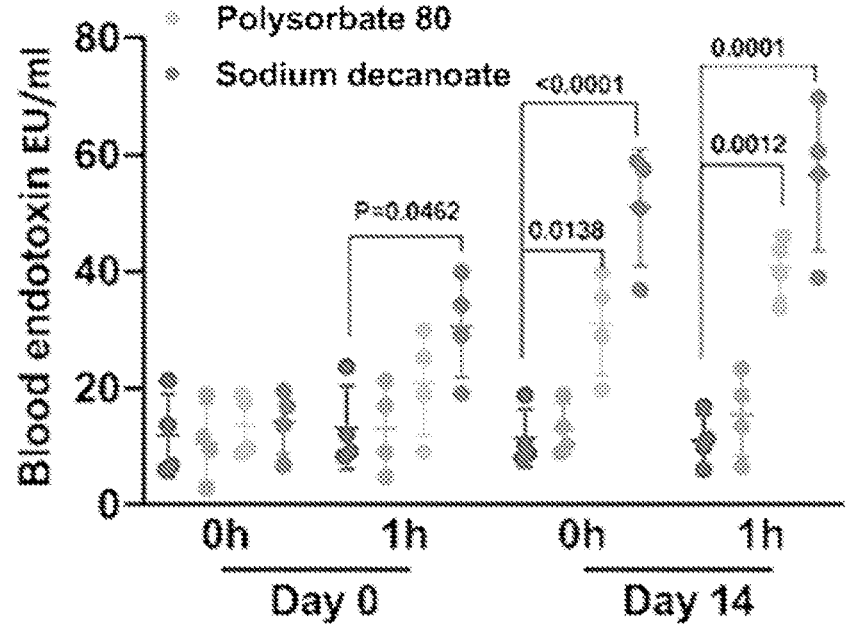
Figure 8G:
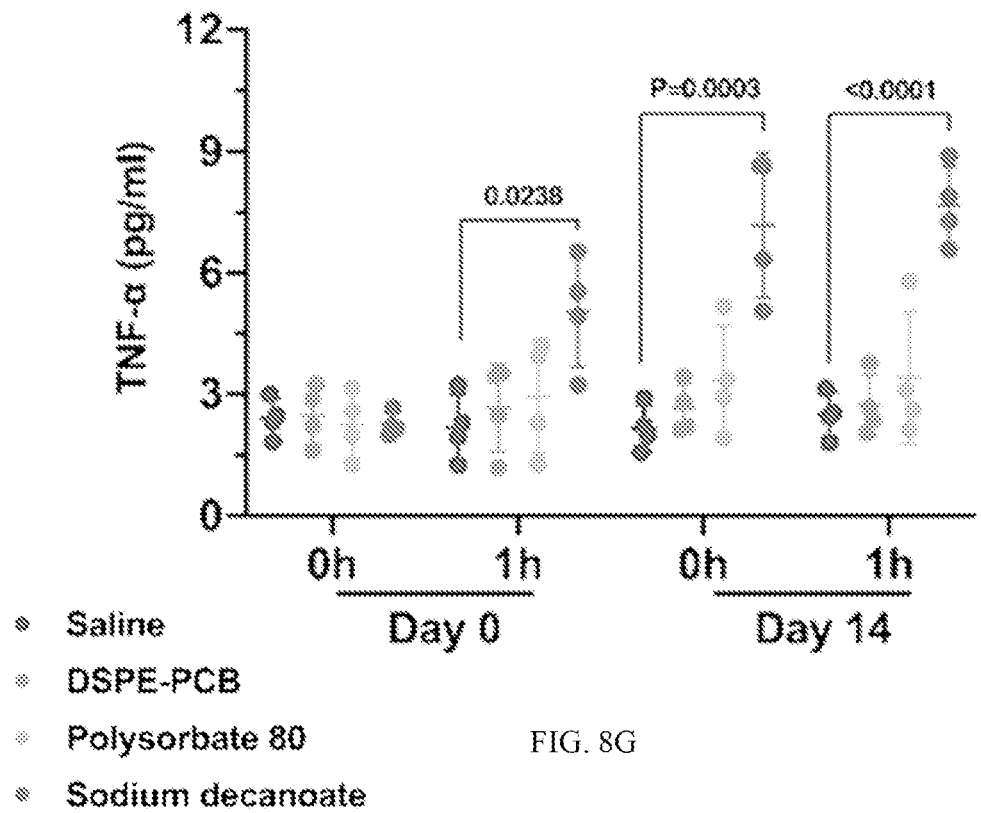
Figure 8H:
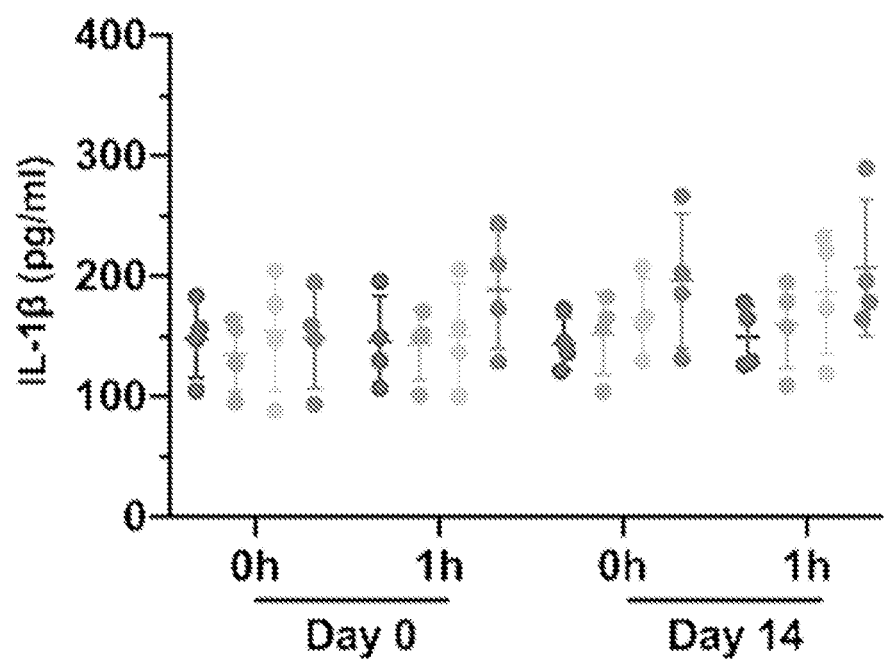
Figure 8I:
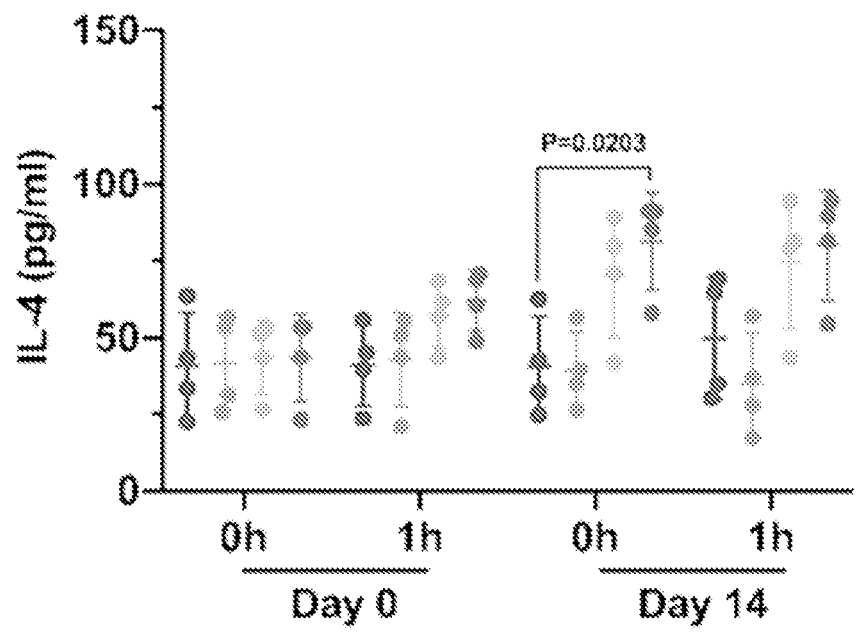
Figure 8J:
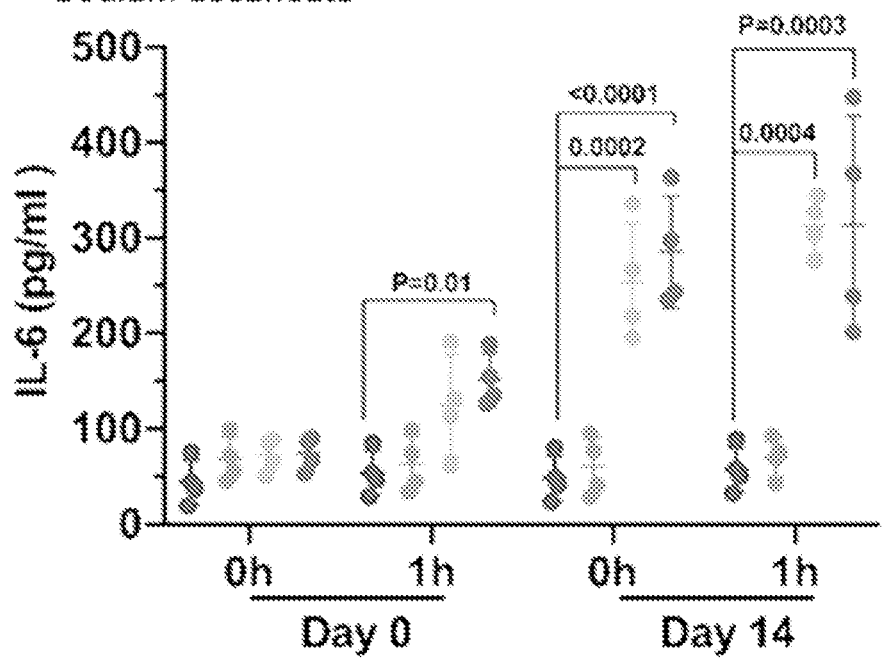
Figure 8K:
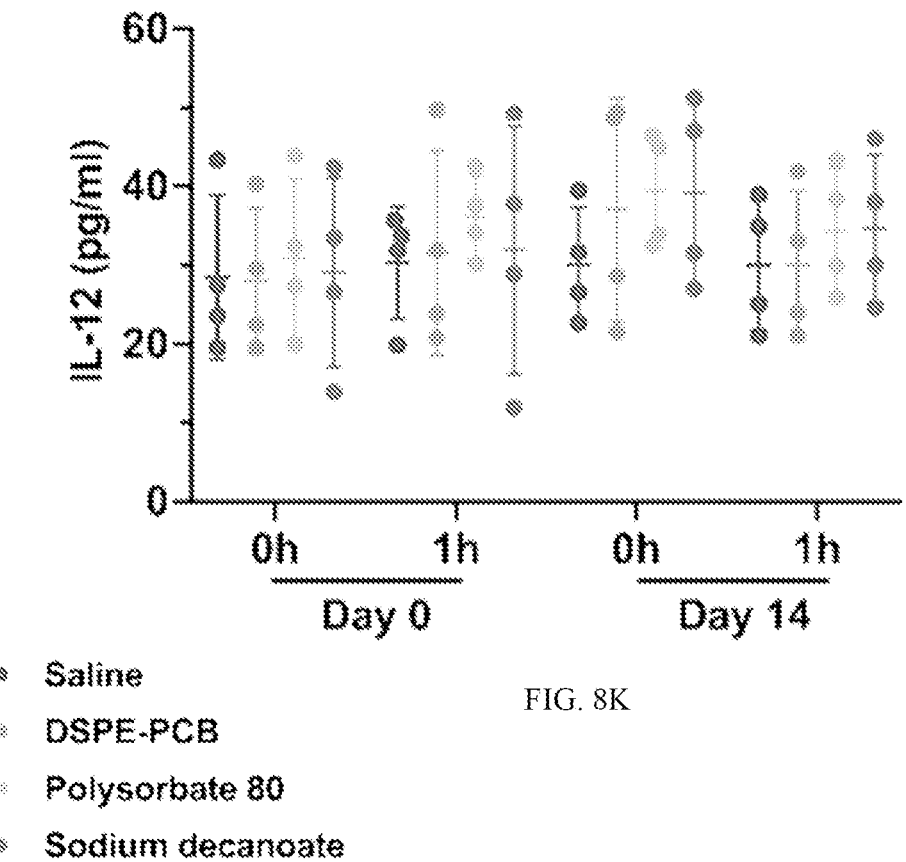
Figure 8L:
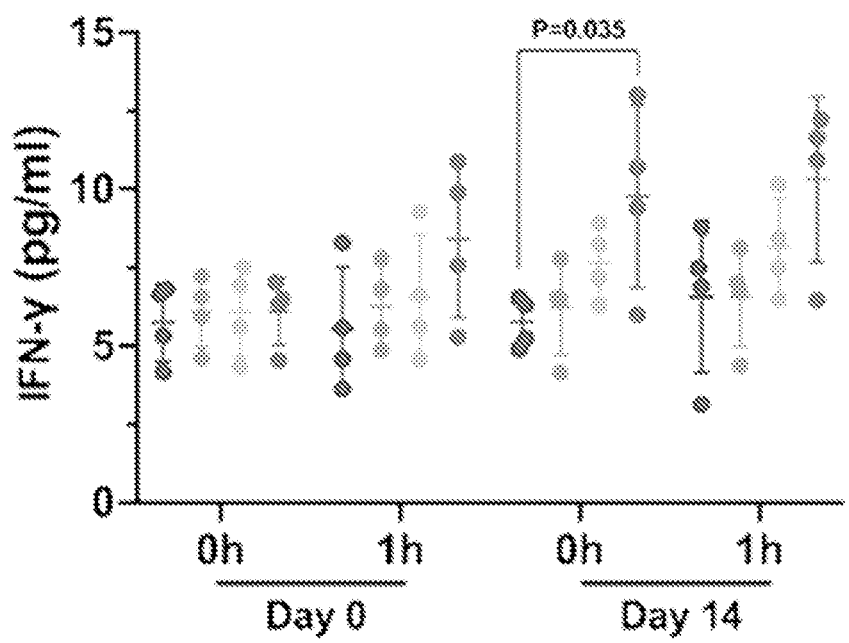

FIG. 8A is a graph showing results after Caco-2 cells were incubated with DSPE-PCB and Polysorbate 80 micelles with concentration range of 0.01-1 mg/mL for 24 hours; cell viability was measured in an MTT assay (Mean±SD, N=6 biologically independent samples);

FIG. 8B is a set of images of the treated Caco-2 cells visualized using live/dead staining (Calcein AM and EthD-1, respectively); scale bar: 400 μm; experiments were repeated three times independently with similar results;

FIG. 8C is a graph showing results of a test of cell membrane integrity performed by measuring lactate dehydrogenase (LDH) leakage; Caco-2 cells were co-cultured with DSEP-PCB, Polysorbate 80 for 24 hours, and the LDH levels were measured using LDH assay kit (Sigma) and plotted as % of untreated cell negative control (N=6 biologically independent samples, mean±SD); as a positive control, 1% Triton X-100 and sonication were used to completely lyse the caco-2 cells and its LDH leakage level was found to be 240%;

FIG. 8D is a graph showing results after healthy mice were administered with DSPE-PCB micelle or saline through oral gavage twice daily for 14 consecutive days, followed by the intestinal permeability test; one hour after co-administering lactulose, mannitol, and DSPE-PCB micelles through ileum injection, urine was collected to measure the ratio of lactulose and mannitol contents (N=4 biologically independent samples, mean±SD); a two-tailed t-test analysis was used for statistical analysis (NS: not significant);

FIG. 8E is a set of images showing small intestine tissue sections stained with Hematoxylin and Eosin, scale bar: 200 μm; insets show sections at higher magnification, scale bar: 50 μm; experiments were repeated four times independently with similar results;

FIGS. 8F, 8G, 8H, 8I, 8J, 8K, and 8L are graphs showing results after healthy mice were administered with DSPE-PCB micelle, saline, Polysorbate 80, or sodium decanoate through oral gavage twice daily for 14 consecutive days; on day 0 and 14, before and 1 hour after the oral administration, blood serum was collected and the indicated endotoxin and pro-inflammatory cytokines were measured with the mouse magnetic Luminex® assays (N=4 biologically independent samples, mean±SD); a one-way analysis of variance with Tukey multi-comparison was used for statistical analysis; compare with saline within the same group.

Figure 9:
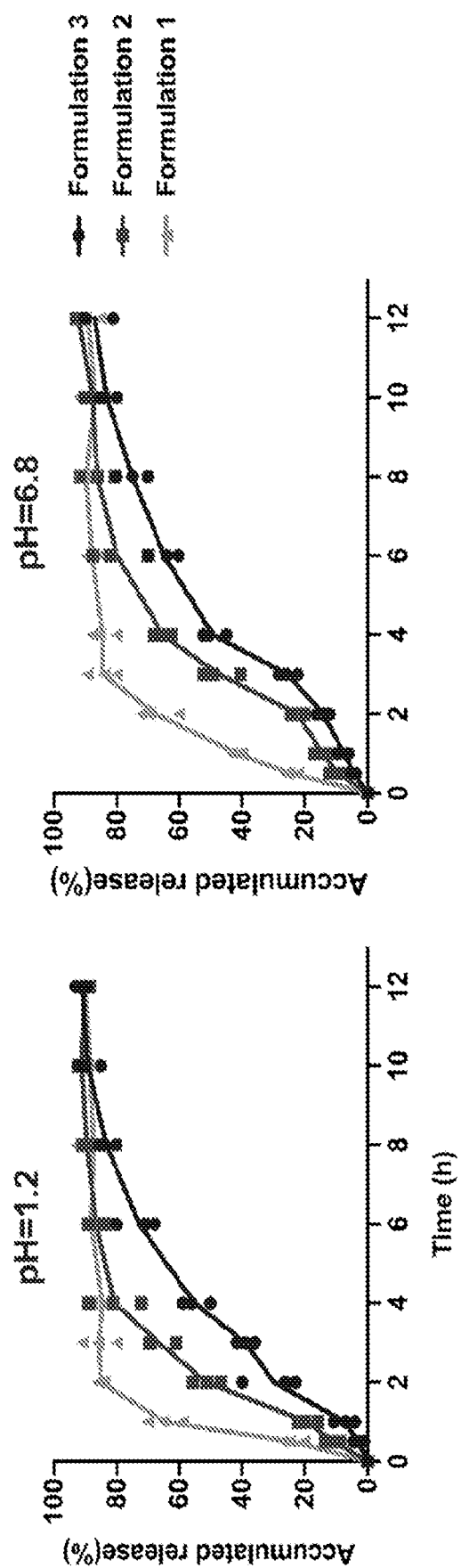
Figure 10:
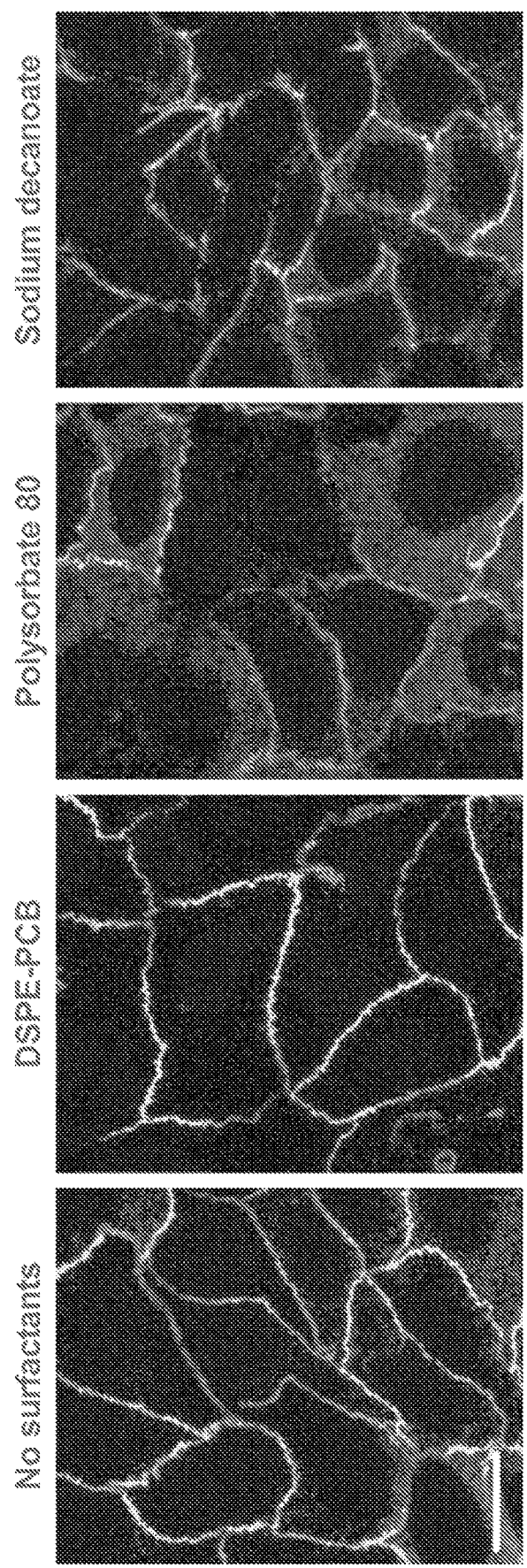
Figure 11:
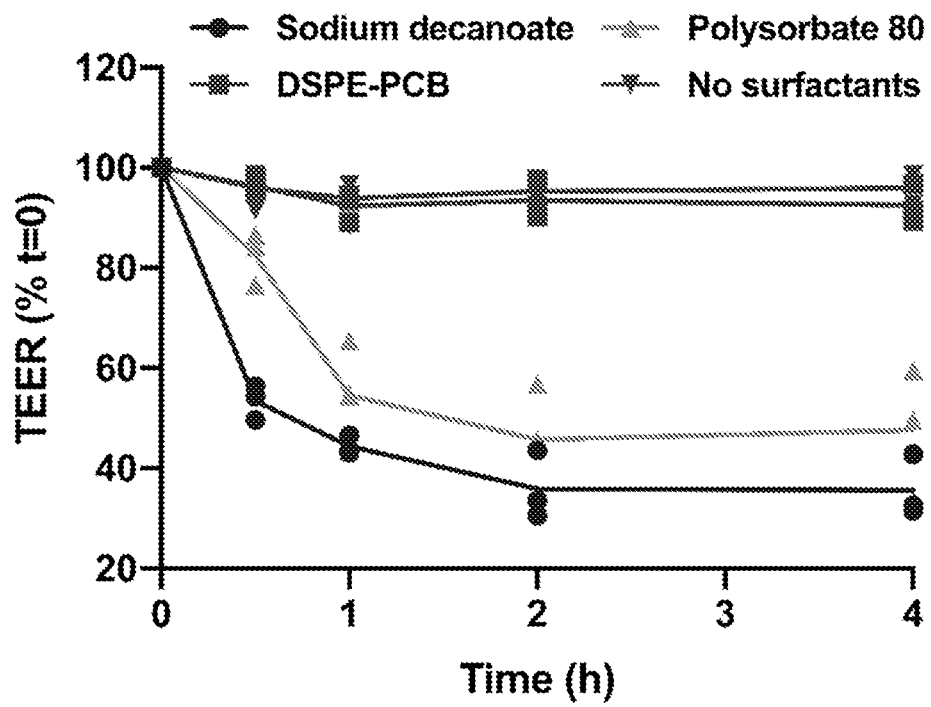
Figure 12:
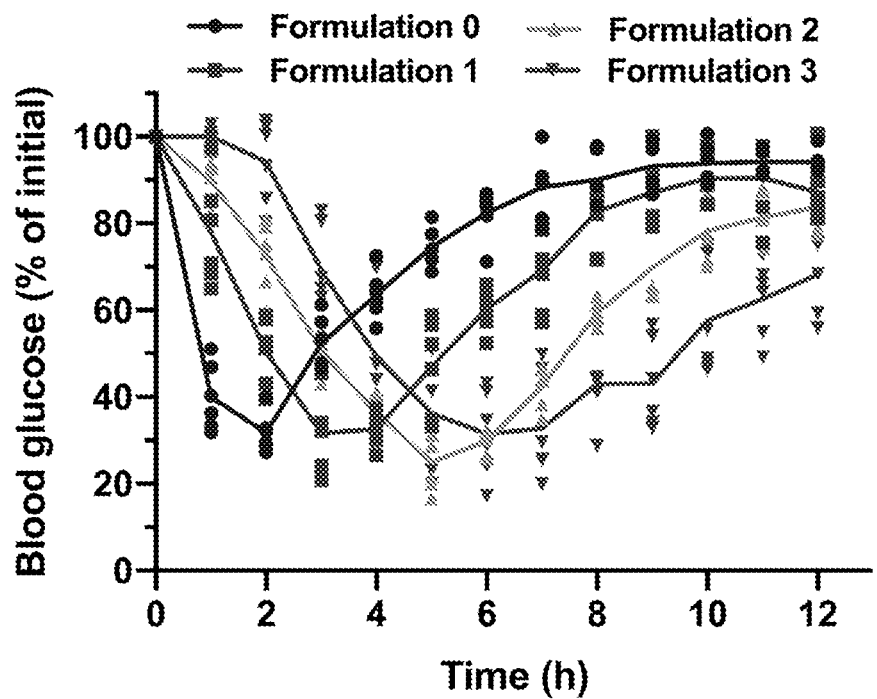
Figure 13:
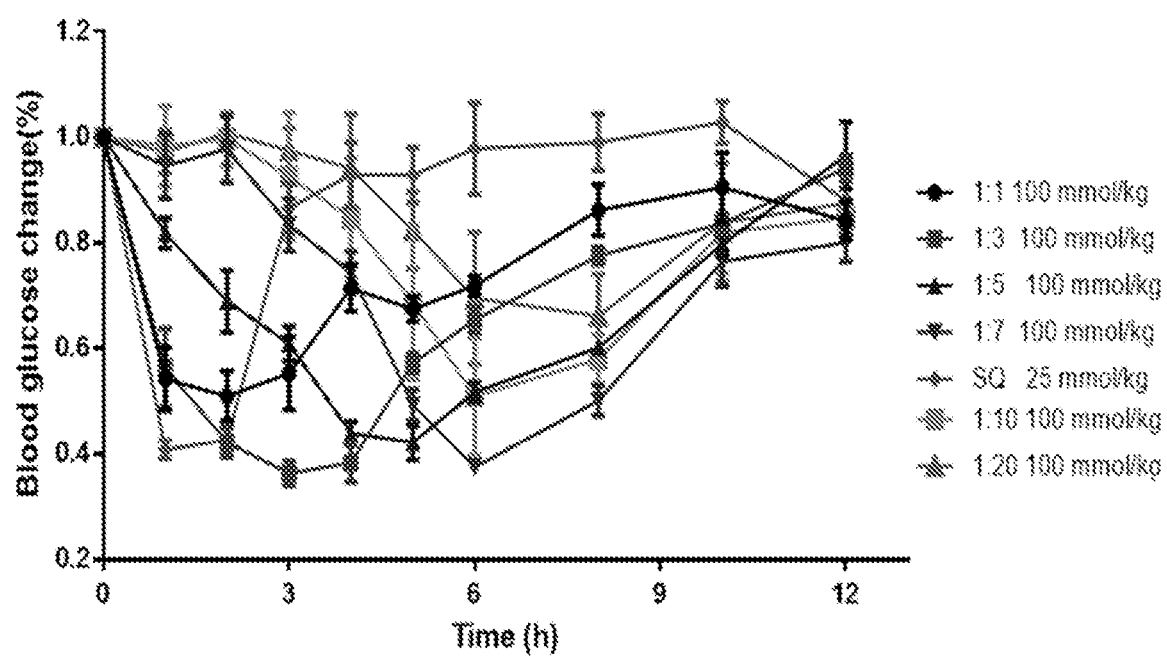

FIG. 9 is a set of graphs demonstrating that DSPE-PCB/insulin formulations with increasing zinc content showed increased retention of insulin release; DSPE-PCB/insulin formulations were dialyzed (10 kDa MWCO) against pH 1.2 and 6.8 buffer with 5 mM bile salt at 37° C.; Formulations 1, 2, and 3 had an insulin/ZnCl2 feeding ratio of 50/1, 20/1, and 2.5/1 by weight during the encapsulation process, respectively; their drug loading is 6.24%, 6.23% and 6.10%, while the corresponding particle sizes are 28.52, 26.36 and 25.96 nm respectively; the cumulative released insulin was measured using the BCA assay (N=3 independent experiments, means connected);

FIG. 10 is a set of representative images of the tight junction protein ZO-1 of monolayer of Caco-2 cells after treatment with different micelles; the tight junction protein ZO-1 was stained with ZO-1 Monoclonal Antibody Alexa Fluor 488 while the nucleus was stained with Hochest 33342; scale bar=20 μm; experiments were repeated three times independently with similar results;

FIG. 11 is a graph showing that DSPE-PCB micelles did not increase intestinal monolayer permeability in vitro; sodium decanoate caused greater reductions in the TEER of Caco-2 monolayers than polysorbate 80, (N=3 biologically independent samples, means connected); Caco-2 cells were cultured for 96 hours to form monolayers and then treated with different micelles for 4 hours; the electrical resistance was measured at different time points;

FIG. 12 is a graph showing blood glucose profiles for various formulations of DSPE-PCB/insulin capsules on diabetic rats through oral gavage (N=6 biologically independent animals, means connected); formulations 0, 1, 2 and 3 had an insulin/ZnCl2 feeding ratio of 75/1, 50/1, 20/1, and 2.5/1 by weight during the encapsulation process, respectively; their drug loading is 6.25%, 6.24%, 6.23% and 6.10%, while the corresponding particle hydrodynamic sizes are 28.56, 28.52, 26.36 and 25.96 nm respectively;

FIG. 13 is a graph showing blood glucose lowering (pharmacological) performance for a series of DSPE-PCB/exenatide formulations on STZ induced diabetic mice through ileum injection at the same dose of 100 mmol/Kg (N=3; mean±SD); 1:1, 1:3, 1:5, 1:7, 1:10, and 1:20 represent the weight ratio of exenatide:protamine during the formulation; subcutaneously injected native exenatide at 25 mmol/Kg was used as a control.

Figure 14:
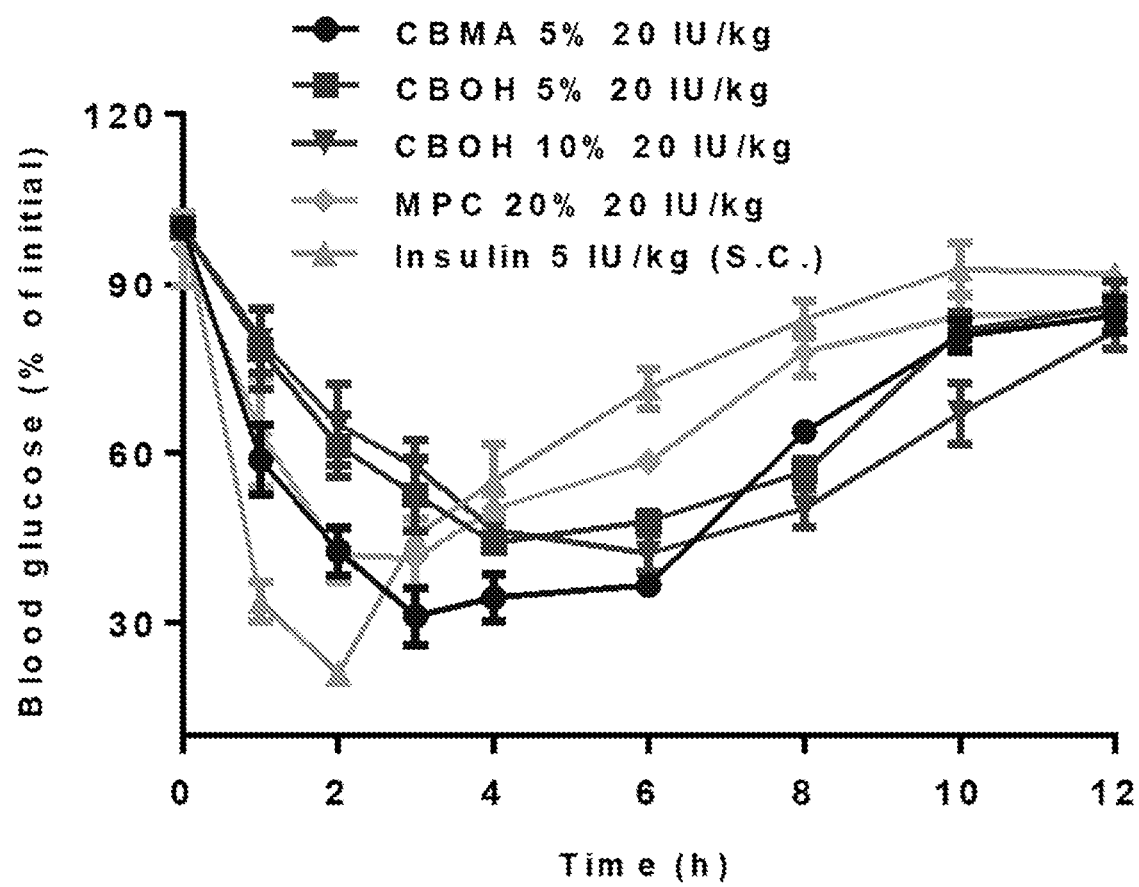
Figure 15:
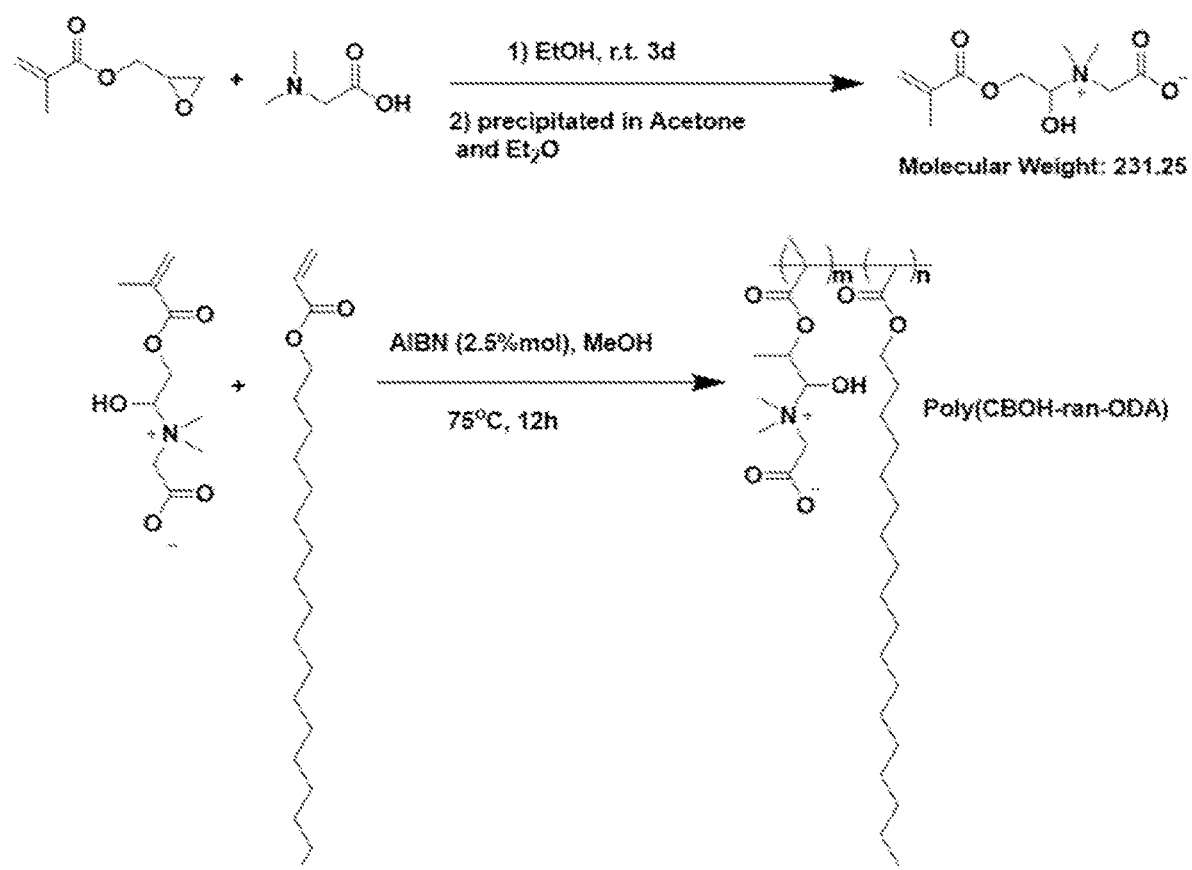
Figure 16:
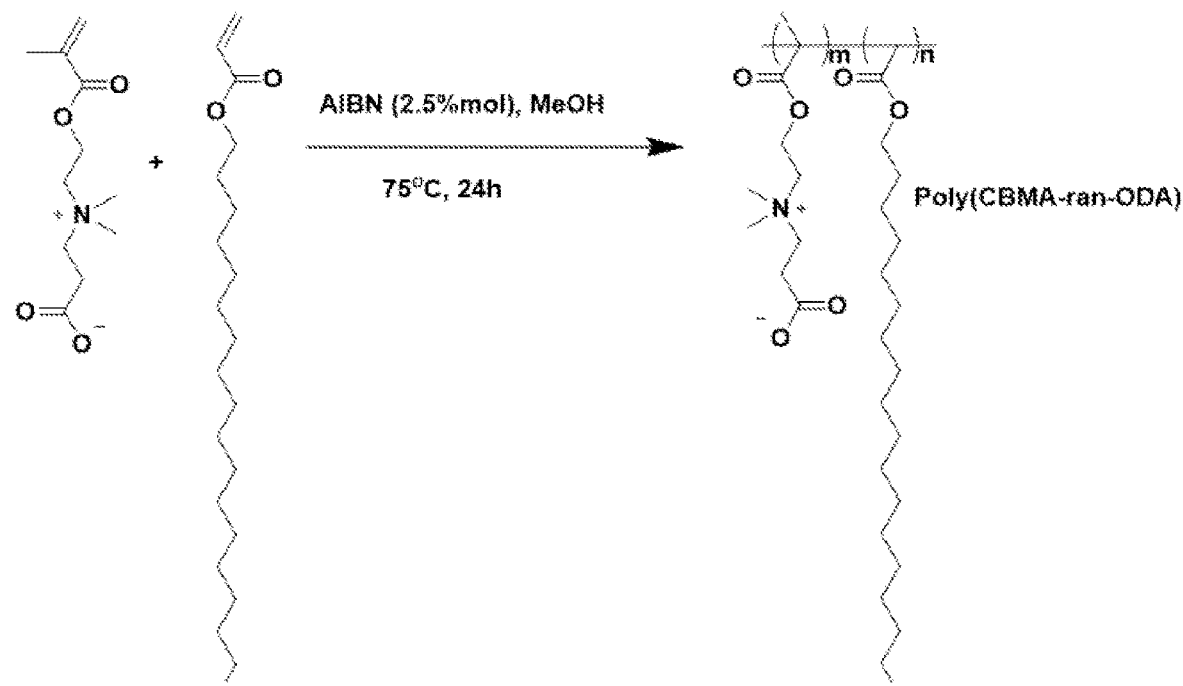
Figure 17:
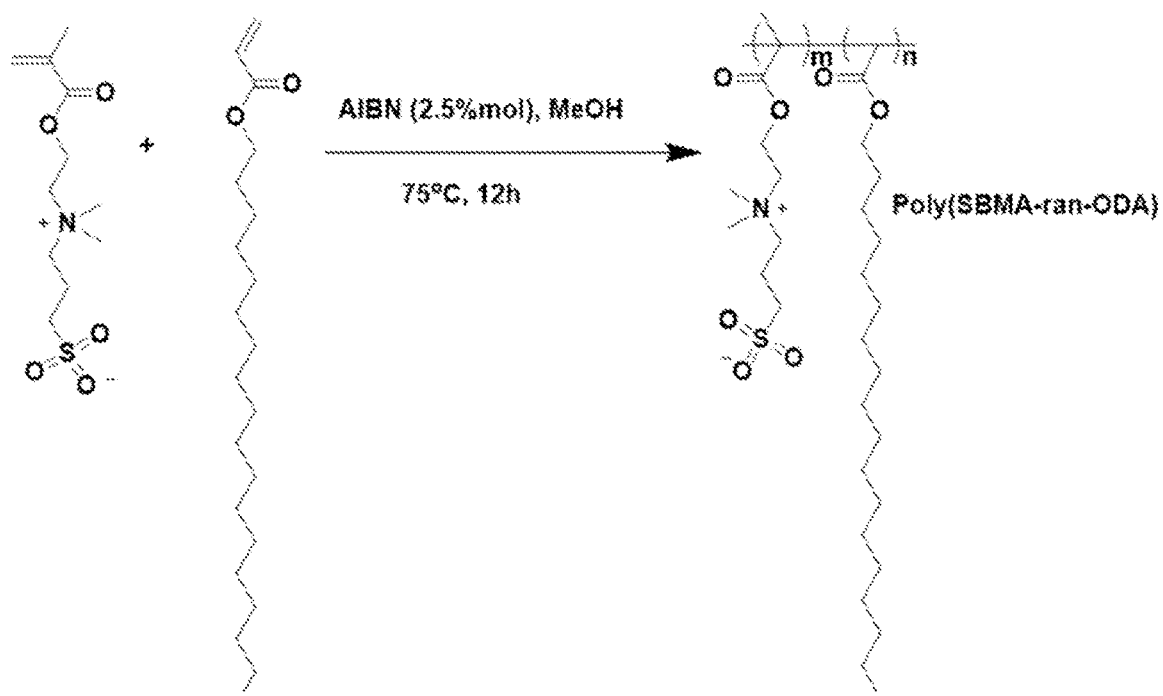
Figure 18:
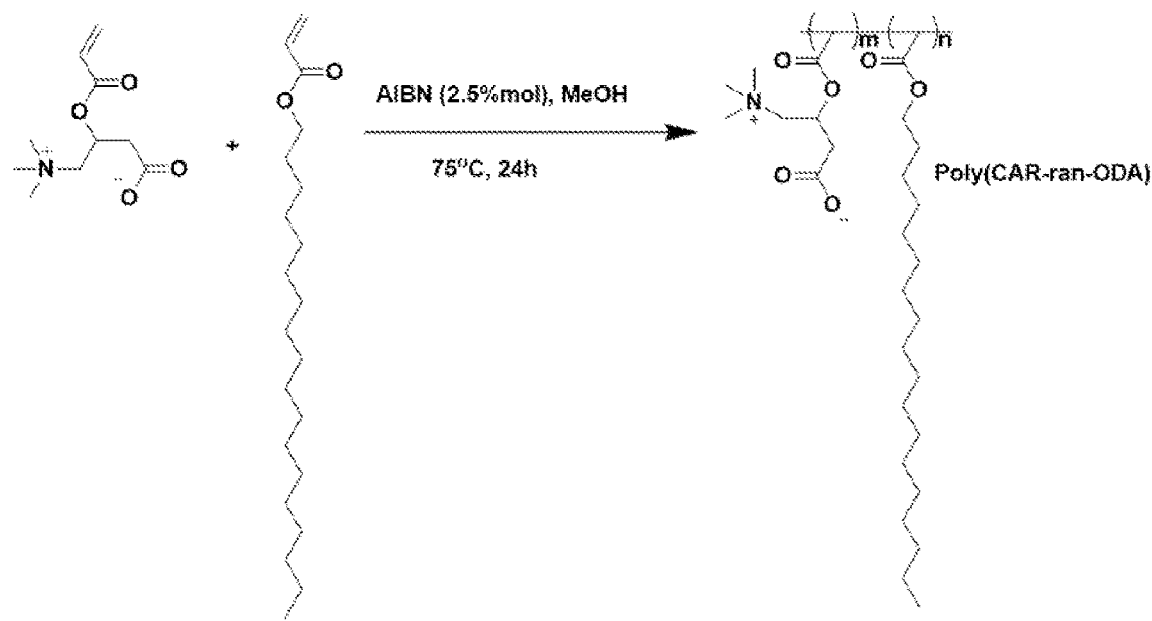
Figure 19:
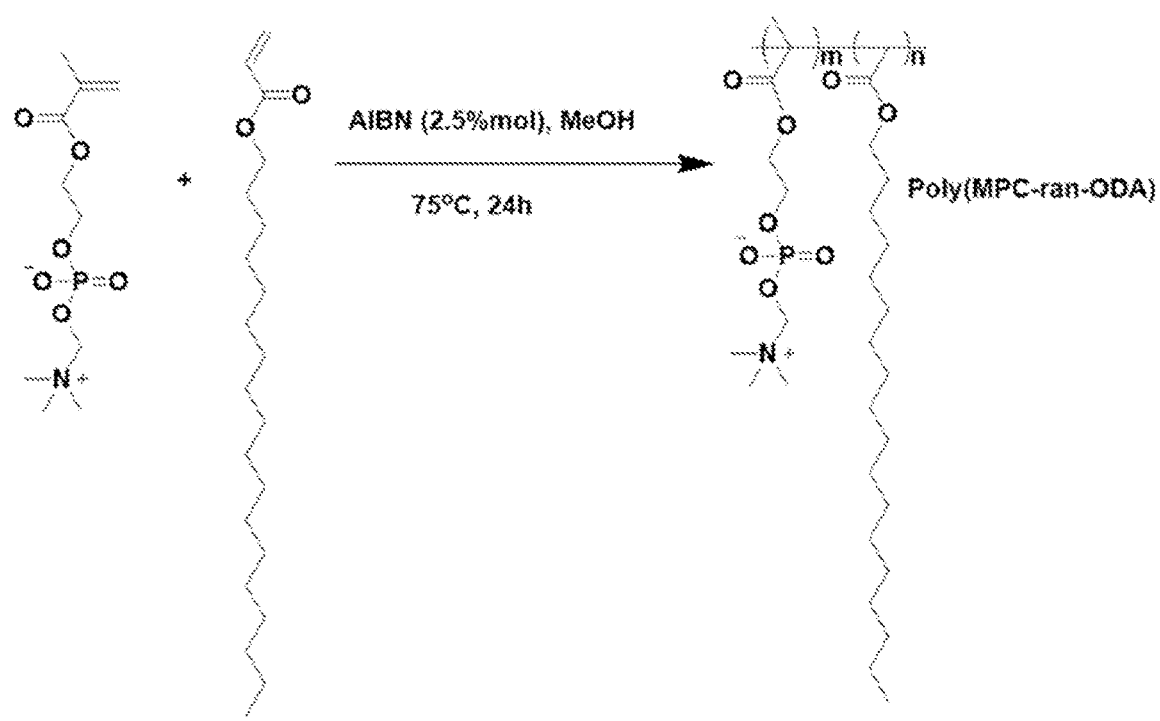

FIG. 14 is a graph showing blood glucose lowering (pharmacological) performance for CBMA-ODA/insulin (CBMA 5%), CBOH-ODA/insulin (CBOH 5% and 10%), MPC-ODA/insulin (MPC 20%) formulations on diabetic mice through ileum injection at the same dose of 20 IU/Kg (N=3 biologically independent animals, mean±SD); insulin/ZnCl2 feeding ratio is 20/1 by weight; subcutaneously injected native insulin at 5 IU/Kg was used as a control (1 IU/ml);

FIG. 15 shows an exemplary scheme for polymerization of CBOH-ODA random copolymer for incorporation in CBOH-ODA micelles;

FIG. 16 shows an exemplary scheme for polymerization of CBMA-ODA random copolymer for incorporation in CBMA-ODA micelles;

FIG. 17 shows an exemplary scheme for polymerization of SBMA-ODA random copolymer for incorporation in SBMA-ODA micelles;

FIG. 18 shows an exemplary scheme for polymerization of carnitine-ODA random copolymer for incorporation in carnitine-ODA micelles; and FIG. 19 shows an exemplary scheme for polymerization of MPC-ODA random copolymer for incorporation in MPC-ODA micelles.

DETAILED DESCRIPTION OF THE INVENTION

Scientific and technical terms used herein are intended to have the meanings commonly understood by those of ordinary skill in the art. Such terms are found defined and used in context in various standard references illustratively including J. Sambrook and D. W. Russell, Molecular Cloning: A Laboratory Manual, Cold Spring Harbor Laboratory Press; 3rd Ed., 2001; F. M. Ausubel, Ed., Short Protocols in Molecular Biology, Current Protocols; 5th Ed., 2002; B. Alberts et al., Molecular Biology of the Cell, 4th Ed., Garland, 2002; D. L. Nelson and M. M. Cox, Lehninger Principles of Biochemistry, 4th Ed., W.H. Freeman & Company, 2004; Engelke, D. R., RNA Interference (RNAi): Nuts and Bolts of RNAi Technology, DNA Press LLC, Eagleville, P A, 2003; Herdewijn, P. (Ed.), Oligonucleotide Synthesis: Methods and Applications, Methods in Molecular Biology, Humana Press, 2004; A. Nagy, M. Gertsenstein, K. Vintersten, R. Behringer, Manipulating the Mouse Embryo: A Laboratory Manual, 3rd edition, Cold Spring Harbor Laboratory Press; Dec. 15, 2002, ISBN-10: 0879695919; Kursad Turksen (Ed.), Embryonic stem cells: methods and protocols in Methods Mol Biol. 2002; 185, Humana Press; Current Protocols in Stem Cell Biology, ISBN: 9780470151808; Chu, E. and Devita, V. T., Eds., Physicians' Cancer Chemotherapy Drug Manual, Jones & Bartlett Publishers, 2005; J. M. Kirkwood et al., Eds., Current Cancer Therapeutics, 4th Ed., Current Medicine Group, 2001; Remington: The Science and Practice of Pharmacy, Lippincott Williams & Wilkins, 21st Ed., 2005; L. V. Allen, Jr. et al., Ansel's Pharmaceutical Dosage Forms and Drug Delivery Systems, 8th Ed., Philadelphia, PA: Lippincott, Williams & Wilkins, 2004; and L. Brunton et al., Goodman & Gilman's The Pharmacological Basis of Therapeutics, McGraw-Hill Professional, 12th Ed., 2011.

The singular terms "a," "an," and "the" are not intended to be limiting and include plural referents unless explicitly stated otherwise or the context clearly indicates otherwise.

The abbreviation "CBMA" refers to 3-[[2-(methacryloyloxy)ethyl]dimethylammonio]propionate.

The abbreviation "PCBMA" refers to poly(3-[[2-(methacryloyloxy)ethyl]dimethylammonio]propionate).

The abbreviation "SBMA" refers to [2-(methacryloyloxy)ethyl]dimethyl-(3-sulfopropyl)ammonium hydroxide.

The abbreviation "PSBMA" refers to poly[2-(methacryloyloxy)ethyl]dimethyl-(3-sulfopropyl)ammonium hydroxide.

The abbreviation "MPC" refers to methacryloyloxyethyl phosphorylcholine.

The abbreviation "PMPC" refers to poly(methacryloyloxyethyl phosphorylcholine).

The abbreviation "CBOH" refers to (N-(carboxymethyl)-2-hydroxy-N,N-dimethyl-3-[(2-methyl-1-oxo-2-propen-1-yl)oxy]-1-propanaminium.

The abbreviation "PCBOH" refers to poly(N-(carboxymethyl)-2-hydroxy-N,N-dimethyl-3-[(2-methyl-1-oxo-2-propen-1-yl)oxy]-1-propanaminium).

The abbreviation "CAR" refers to carnitine: ((2R)-3-carboxy-N,N,N-trimethyl-2-[(1-oxo-2-propen-1-yl)oxy]-1-propanaminium.

The abbreviation "PCAR" refers to: poly(((2R)-3-carboxy-N,N,N-trimethyl-2-[(1-oxo-2-propen-1-yl)oxy]-1-propanaminium).

The abbreviation "ODA" refers to octadecyl acrylate.

The abbreviation "CBAA" refers to 3-((3-acrylamidopropyl)dimethylammonio)propanoate.

The abbreviation "PCBAA" refers to poly(3-((3-acrylamidopropyl)dimethylammonio)propanoate).

The abbreviation CBAA-1 refers to 2-((3-acrylamidopropyl)dimethylammonio)acetate.

The abbreviation PCBAA-1 refers to poly(2-((3-acrylamidopropyl)dimethylammonio)acetate).

Figure 1A:
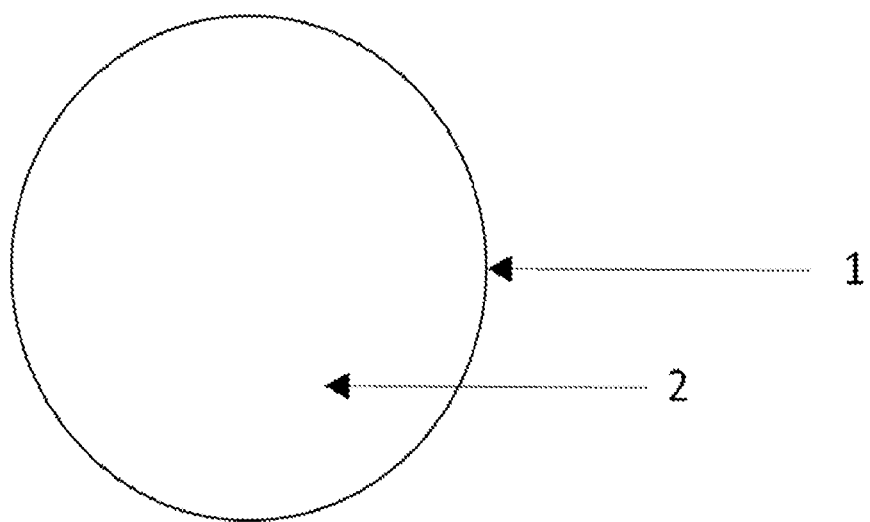
FIG. 1A is a schematic diagram showing a particle having an exterior surface 1, the exterior surface defining a particle interior 2.

According to aspects of the present disclosure, compositions for delivery of a biologically active agent, wherein the biologically active agent is a protein, peptide, or dietary supplement, the compositions including a plurality of particles, wherein each particle has an exterior surface, the exterior surface defining a particle interior, the exterior surface having at least one type of zwitterionic polymer disposed thereon and/or extending therefrom; and a biologically active agent disposed on the exterior surface and/or in the particle interior, are provided. FIG. 1A is a schematic diagram showing a particle having an exterior surface 1, the exterior surface defining a particle interior 2.

According to aspects of the present disclosure, the zwitterionic polymer is included in a copolymer which is a reaction product of a zwitterionic monomer and a lipid-derived monomer.

Zwitterionic Monomers

According to aspects described herein, the zwitterionic monomer has the structural formula (I):

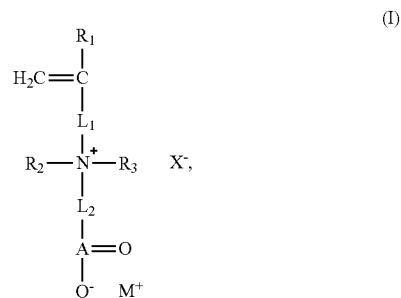

where $R_1$, $R_2$, and $R_3$ are each independently selected from hydrogen, alkyl, and aryl groups; $L_1$ is a linker that covalently couples a cationic center to a monomer double bond; $L_2$ is a linker that covalently couples the cationic center to an anionic group; $A(=O)O^-$ is the anionic group; $X^-$ is a counter ion associated with the cationic center; and $M^+$ is a metal cation, an ammonium cation, or an organic cation.

For each $R_1$, $R_2$, and $R_3$ in structural formulas shown herein representative alkyl groups include $C_1$-$C_{30}$ straight chain and branched alkyl groups. According to aspects of the present disclosure, the alkyl group is further substituted with one of more substituents including, for example, an aryl group (e.g., $-CH_2C_6H_5$, benzyl).

For each $R_1$, $R_2$, and $R_3$ in structural formulas shown herein representative aryl groups include $C_6$-$C_{12}$ aryl groups including, for example, phenyl including substituted phenyl groups (e.g., benzoic acid).

For each $R_1$, $R_2$, and $R_3$ in structural formulas shown herein representative alkyl groups include $C_1$-$C_{10}$ straight chain and branched alkyl groups.

According to aspects of the present disclosure, the alkyl group is further substituted with one of more substituents including, for example, an aryl group (e.g., $-CH_2C_5H_6$, benzyl).

According to aspects of the present disclosure, $R_2$ and $R_3$ in structural formulas shown herein are methyl.

According to aspects of the present disclosure, $R_1$, $R_2$, and $R_3$ in structural formulas shown herein are methyl According to aspects of the present disclosure, $R_2$ and $R_3$ are taken together with N form the cationic center in structural formulas shown herein.

According to aspects of the present disclosure, $L_1$ includes a functional group (e.g., ester or amide) that couples the remainder of $L_1$ to the C=C double bond for the monomers. In addition to the functional group, $L_1$ can include a $C_1$-$C_{20}$ alkylene chain. Representative 1 groups include $-C(=O)O-(CH_2)_n-$ and $-C(=O)NH-(CH_2)n-$, where n is 1-20 (e.g., n=2).

$L_2$ can be a $C_1$-$C_{20}$ alkylene chain according to aspects of the present disclosure. Representative $L_2$ groups include —$(CH_2)_n$—, where n is 1-20 (e.g., 1, 2, or 3).

A(=O)O⁻ is an anionic group in structural formulas shown herein. The group is a carboxylic acid (where A is C), a sulfinic acid (where A is S), a sulfonic acid (where A is SO), a phosphinic acid (where A is P), or a phosphonic acid (where A is PO).

As noted, X⁻ in structural formula shown herein is the counter ion associated with the cationic center. The counter ion can be the counter ion that results from the synthesis of the monomers (e.g., Cl⁻, Br⁻, I⁻). The counter ion that is initially produced from the synthesis of the cationic center can also be exchanged with other suitable counter ions to provide materials having controllable hydrolysis properties and other biological properties. According to aspects of the present disclosure, representative hydrophobic counterions include carboxylates, such as benzoic acid and fatty acid anions (e.g., $CH_3(CH_2)_nCO_2^-$ where n can be from 1 to 19); alkyl sulfonates (e.g., $CH_3(CH_2)_nSO_3^-$ where n can be from 1 to 19); salicylate; lactate; bis(trifluorornethylsulfonyl) amide anion (N⁻(SO₂CF₃)2); and derivatives thereof. Other counter ions also can be chosen from chloride, bromide, iodide, sulfate; nitrate; perchlorate (ClO₄); tetrafluoroborate (BF₄); hexafluorophosphate (PF₆); trifluoromethylsulfonate (SO₃CF₃); and derivatives thereof. Other suitable counter ions include salicylic acid (2-hydroxybenzoic acid), benzoate, and lactate.

M+ in structural formulas shown herein is a metal ion, an ammonium ion, or an organic ion.

In structural formulas shown herein N+ is the cationic center. In certain embodiments, the cationic center is a quaternary ammonium (N bonded to $L_1$, $R_2$, $R_3$, and $L_2$). In addition to ammonium, other useful cationic centers ($R_2$ and $R_3$ taken together with N) include imidazolium, triazaolium, pyridinium, morpholinium, oxazolidinium, pyrazinium, pyridazinium, pyrimidinium, piperazinium, and pyrrolidinium.

According to aspects of the present disclosure, $R_1$, $R_2$, and $R_3$ in structural formulas shown herein are independently selected from the group consisting of $C_1$-$C_3$ alkyl. In one embodiment, $R_1$, $R_2$, and $R_3$ in structural formulas shown herein are methyl.

According to aspects of the present disclosure, $L_1$ in structural formulas shown herein is selected from the group consisting of —C(=O)O—$(CH_2)$n- and —C(=O)NH—$(CH_2)$n-, wherein n is 1-20. In one embodiment, $L_1$ in structural formulas shown herein is —C(=O)O—$(CH_2)_2$—.

According to aspects of the present disclosure, $L_2$ in structural formulas shown herein is —$(CH_2)$n-, where n is an integer from 1-20. In one embodiment, $L_2$ in structural formulas shown herein is —$(CH_2)$—.

According to aspects of the present disclosure, $R_1$, $R_2$, and $R_3$ in structural formulas shown herein are methyl, $L_1$ in structural formulas shown herein is —C(=O)O—$(CH_2)_2$—, $L_2$ in structural formulas shown herein is —$(CH_2)$—, A is C.

According to aspects of the present disclosure, the zwitterionic monomer has the structural formula (V):

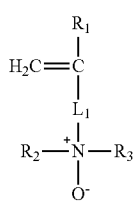

where $R_1$, $R_2$, and $R_3$ are each independently selected from hydrogen, alkyl, and aryl groups; $L_1$ is a linker that covalently couples a cationic center to a monomer double bond.

For each $R_1$, $R_2$, and $R_3$ in structural formulas shown herein representative alkyl groups include $C_1$-$C_{30}$ straight chain and branched alkyl groups. According to aspects of the present disclosure, the alkyl group is further substituted with one of more substituents including, for example, an aryl group (e.g., —$CH_2C_6H_5$, benzyl).

For each $R_1$, $R_2$, and $R_3$ in structural formulas shown herein representative aryl groups include $C_6$-$C_{12}$ aryl groups including, for example, phenyl including substituted phenyl groups (e.g., benzoic acid).

For each $R_1$, $R_2$, and $R_3$ in structural formulas shown herein representative alkyl groups include $C_1$-$C_{10}$ straight chain and branched alkyl groups.

According to aspects of the present disclosure, the alkyl group is further substituted with one of more substituents including, for example, an aryl group (e.g. —$CH_2C_5H_6$, benzyl).

According to aspects of the present disclosure, $R_2$ and $R_3$ in structural formulas shown herein are methyl.

According to aspects of the present disclosure, $R_1$, $R_2$, and $R_3$ in structural formulas shown herein are methyl.

According to aspects of the present disclosure, $R_2$ and $R_3$ are taken together with N⁺ form the cationic center in structural formulas shown herein.

According to aspects of the present disclosure, $L_1$ includes a functional group (e.g., ester or amide) that couples the remainder of $L_1$ to the C=C double bond for the monomers. In addition to the functional group, $L_1$ can include a $C_1$-$C_{20}$ alkylene chain. Representative $L_1$ groups include —C(=O)O—$(CH_2)_n$— and —C(=O)NH—$(CH_2)$n-, where n is 1-20 (e.g., n=2).

According to aspects of the present disclosure, $R_1$, $R_2$, and $R_3$ in structural formulas shown herein are independently selected from the group consisting of $C_1$-$C_3$ alkyl. In one embodiment, $R_1$, $R_2$, and $R_3$ in structural formulas shown herein are methyl.

According to aspects of the present disclosure, $L_1$ in structural formulas shown herein is selected from the group consisting of —C(=O)O—$(CH_2)$n- and —C(=O)NH—$(CH_2)$n-, wherein n is 1-20. In one embodiment, $L_1$ in structural formulas shown herein is —C(=O)O—$(CH_2)_2$—.

According to aspects of the present disclosure, the zwitterionic monomer has the structural formula (II):

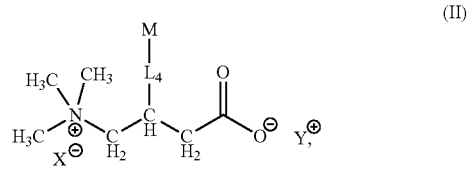

where M is a monomeric repeating unit, $L_4$ is a linker, X– is a counter ion associated with a cationic center of structure (II) and Y+ is a counter ion associated with an anionic center of structure (II). According to aspects of the present invention, M is a repeating unit of a polymer selected from the group consisting of: polyester, polyamide, poly(amino acid), polyimide, polycarbonate, polysiloxane, polyurethane, polyphosphazene, acrylic polymer, amino resin, epoxy resin, phenolic resin, and alkyd resin. According to aspects of the present invention, $L_4$ is —C(=O)O—$(CH_2)_{n1}$— or —C(=O)NH—$(CH_2)_{n1}$—, where n1 is an integer from 0 to 20, such as where n1 is 0, 1, 2, 3, 4, 5, 6, 7, 8, 9, 10, 11, 12, 13, 14, 15, 16, 17, 18, 19, or 20. In one embodiment, $L_4$ in structural formulas shown herein is —C(=O)O—$(CH_2)_{n1}$—, where n1 is 0.

$X^-$ in structural formula (If) is the counter ion associated with the cationic center. The counter ion can be the counter ion that results from the synthesis of the monomers (e.g., $Cl^-$, $Br^-$, $I^-$). The counter ion that is initially produced from the synthesis of the cationic center can also be exchanged with other suitable counter ions to provide materials having controllable hydrolysis properties and other biological properties. According to aspects of the present disclosure, representative hydrophobic counterions include carboxylates, such as benzoic acid and fatty acid anions (e.g., $CH_3(CH_2)_nCO_2^-$ where n can be from 1 to 19); alkyl sulfonates (e.g., $CH_3(CH_2)_nSO_3^-$ where n can be from 1 to 19); salicylate; lactate; bis(trifluoromethylsulfonyl)amide anion ($N^-(SO_2CF_3)2$); and derivatives thereof. Other counter ions also can be chosen from chloride, bromide, iodide, sulfate; nitrate; perchlorate ($ClO_4$); tetrafluoroborate ($BF_4$); hexafluorophosphate ($PF_6$); trifluoromethylsulfonate ($SO_3CF_3$); and derivatives thereof. Other suitable counter ions include salicylic acid (2-hydroxybenzoic acid), benzoate, and lactate.

$Y+$ in structural formulas (II) is a metal ion, an ammonium ion, or an organic ion.

Zwitterionic monomers can be obtained by synthesis and/or are commercially available.

Zwitterionic monomers containing carboxybetaine and sulfobetaine can be synthesized by using a tertiary amine containing acrylate, acrylamide, or vinyl monomer to react with lactone or sultone, or to react with alkyl halides containing acid groups, or to react with alkyl halides containing acid esters followed by removal acid ester to give acid groups.

Regarding zwitterionic monomers and zwitterionic polymers, U.S. Patent Application Publication 2012/0322939 is hereby incorporated by reference in its entirety and particularly sections 0081-0159 describing zwitterionic monomers and zwitterionic polymers included in hydrogels and methods according to aspects of the present disclosure.

Zwitterionic Polymers

An included zwitterionic polymer according to aspects of the present disclosure has a plurality of repeating units, where each repeating unit has structural formula (III):

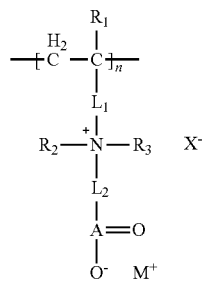

where $R_1$, $R_2$, and $R_3$ are each independently selected from hydrogen, alkyl, and aryl groups; $L_1$ is a linker that covalently couples a cationic center to a polymer backbone; $L_2$ is a linker that covalently couples the cationic center to an anionic group; A(=O)O$^-$ is the anionic group; X– is a counter ion associated with the cationic center; and $M^+$ is a metal cation, an ammonium cation, or an organic cation; n is an integer in the range of 2 to about 100,000.

An included zwitterionic polymer according to aspects of the present disclosure has a plurality of repeating units, where each repeating unit has structural formula (III), where $R_1$ is selected from the group consisting of hydrogen, fluorine, trifluoromethyl, $C_1$-$C_6$ alkyl, and $C_6$-$C_{12}$ aryl groups; $R_2$ and $R_3$ are independently selected from the group consisting of alkyl and aryl, or taken together with a nitrogen to which they are attached form a cationic center; $L_1$ is a linker that covalently couples the cationic center [$N^+(R_2)(R_3)$] to its polymer backbone [—($CH_2$—$CR_1)_n$—]; $L_2$ is a linker that covalently couples an anionic center [A(=O)—O—] to the cationic center; A is C, S, SO, P, or PO; $M^+$ is a metal ion, an ammonium ion, or an organic ion; $X^-$ is a counter ion associated with the cationic center; and n is an integer in the range of 2 to about 100,000.

For each $R_1$, $R_2$, and $R_3$ in structural formulas of zwitterionic polymers shown herein, representative alkyl groups include $C_1$-$C_{30}$ straight chain and branched alkyl groups. According to aspects of the present disclosure, the alkyl group is further substituted with one of more substituents including, for example, an aryl group (e.g., —$CH_2C_6H_5$, benzyl).

For each $R_1$, $R_2$, and $R_3$ in structural formulas of zwitterionic polymers shown herein representative aryl groups include $C_6$-$C_{12}$ aryl groups including, for example, phenyl including substituted phenyl groups (e.g., benzoic acid).

For each $R_1$, $R_2$, and $R_3$ in structural formulas of zwitterionic polymers shown herein representative alkyl groups include $C_1$-$C_{10}$ straight chain and branched alkyl groups. According to aspects of the present disclosure, the alkyl group is further substituted with one of more substituents including, for example, an aryl group (e.g., —$CH_2C_6H_5$, benzyl).

According to aspects of the present disclosure, $R_2$ and $R_3$ in structural formula (III) shown herein are methyl.

According to aspects of the present disclosure, $R_1$, $R_2$, and $R_3$ in structural formula (III) shown herein are methyl.

According to aspects of the present disclosure, $R_2$ and $R_3$ are taken together with N+ form the cationic center in structural formula (III) shown herein.

According to aspects of the present disclosure, $L_1$ includes a functional group (e.g., ester or amide) that couples the remainder of $L_1$ to the backbone for the polymers. In addition to the functional group, $L_1$ can include a $C_1$-$C_{20}$ alkylene chain. Representative $L_1$ groups include —C(=O)O—$(CH_2)_n$— and —C(=O)NH—$(CH_2)$n-, where n is 1-20 (e.g., n=2).

$L_2$ can be a $C_1$-$C_{20}$ alkylene chain according to aspects of the present disclosure. Representative $L_2$ groups include —$(CH_2)_n$—, where n is 1-20 (e.g., 1, 2, or 3).

A(=O)O$^-$ is an anionic group in structural formulas shown herein. The group is a carboxylic acid (where A is C), a sulfnic acid (where A is S), a sulfonic acid (where A is SO), a phosphinic acid (where A is P), or a phosphonic acid (where A is PO).

$X^-$ in structural formula shown herein is the counter ion associated with the cationic center. The counter ion can be the counter ion that results from the synthesis of the polymers or the monomers (e.g., $Cl^-$, $Br^-$, $I^-$). The counter ion that is initially produced from the synthesis of the cationic center can also be exchanged with other suitable counter ions to provide materials having controllable hydrolysis properties and other biological properties. According to aspects of the present disclosure, representative hydrophobic counterions include carboxylates, such as benzoic acid and fatty acid anions (e.g., $CH_3(CH_2)_nCO_2^-$ where n can be from 1 to 19); alkyl sulfonates (e.g., $CH_3(CH_2)_nSO_3^-$ where n can be from 1 to 19); salicylate; lactate; bis(trifluoromethyl-sulfonyl)amide anion (N⁻(SO₂CF₃)2); and derivatives thereof. Other counter ions also can be chosen from chloride, bromide, iodide, sulfate; nitrate; perchlorate (ClO₄); tetrafluoroborate (BF₄); hexafluorophosphate (PF₆); trifluoromethylsulfonate (SO₃CF₃); and derivatives thereof. Other suitable counter ions include salicylic acid (2-hydroxybenzoic acid), benzoate, and lactate.

M+ in structural formulas shown herein is a metal ion, an ammonium ion, or an organic ion.

In structural formulas shown herein N⁺ is the cationic center. In certain embodiments, the cationic center is a quaternary ammonium (N bonded to $L_1$, $R_2$, $R_3$, and $L_2$). In addition to ammonium, other useful cationic centers ($R_2$ and $R_3$ taken together with N) include imidazolium, triazaolium, pyridinium, morpholinium, oxazolidinium, pyrazinium, pyridazinium, pyrimidinium, piperazinium, and pyrrolidinium.

According to aspects of the present disclosure, $R_1$, $R_2$, and $R_3$ in structural formulas shown herein are independently selected from the group consisting of $C_1$-$C_3$ alkyl. In one embodiment, $R_1$, $R_2$, and $R_3$ in structural formulas shown herein are methyl.

According to aspects of the present disclosure, $L_1$ in structural formulas shown herein is selected from the group consisting of —C(=O)O—(CH₂)n- and —C(=O)NH—(CH₂)n-, wherein n is 1-20. In one embodiment, $L_1$ in structural formulas shown herein is —C(=O)O—(CH₂)₂—.

According to aspects of the present disclosure, $L_2$ in structural formulas shown herein is —(CH₂)n-, where n is an integer from 1-20. In one embodiment, $L_2$ in structural formulas shown herein is —(CH₂)—.

According to aspects of the present disclosure, $R_1$, $R_2$, and $R_3$ in structural formulas shown herein are methyl, $L_1$ in structural formulas shown herein is —C(=O)O—(CH₂)₂—, $L_2$ in structural formulas shown herein is —(CH₂)—, A is C.

An included zwitterionic polymer according to aspects of the present disclosure has a plurality of repeating units, where each repeating unit has structural formula (VI):

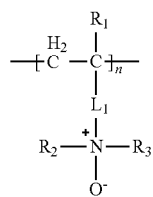

where $R_1$, $R_2$, and $R_3$ are each independently selected from hydrogen, alkyl, and aryl groups; $L_1$ is a linker that covalently couples a cationic center to a polymer backbone; n is an integer in the range of 2 to about 100,000.

An included zwitterionic polymer according to aspects of the present disclosure has a plurality of repeating units, where each repeating unit has structural formula (VI), where $R_1$ is selected from the group consisting of hydrogen, fluorine, trifluoromethyl, $C_1$-$C_6$ alkyl, and $C_6$-$C_{12}$ aryl groups; $R_2$ and $R_3$ are independently selected from the group consisting of alkyl and aryl, or taken together with a nitrogen to which they are attached form a cationic center; $L_1$ is a linker that covalently couples the cationic center [N*($R_2$)($R_3$)] to its polymer backbone [—(CH₂—C$R_1$)n-]; and n is an integer in the range of 2 to about 100,000.

For each $R_1$, $R_2$, and $R_3$ in structural formulas of zwitterionic polymers shown herein, representative alkyl groups include $C_1$-$C_{30}$ straight chain and branched alkyl groups. According to aspects of the present disclosure, the alkyl group is further substituted with one of more substituents including, for example, an aryl group (e.g., —CH₂C₆H₅, benzyl).

For each $R_1$, $R_2$, and $R_3$ in structural formulas of zwitterionic polymers shown herein representative aryl groups include $C_6$-$C_{12}$ aryl groups including, for example, phenyl including substituted phenyl groups (e.g., benzoic acid).

For each $R_1$, $R_2$, and $R_3$ in structural formulas of zwitterionic polymers shown herein representative alkyl groups include $C_1$-$C_{10}$ straight chain and branched alkyl groups. According to aspects of the present disclosure, the alkyl group is further substituted with one of more substituents including, for example, an aryl group (e.g., —CH₂C₆H₅, benzyl).

According to aspects of the present disclosure, $R_2$ and $R_3$ in structural formula (VI) shown herein are methyl.

According to aspects of the present disclosure, $R_2$ and $R_3$ are taken together with N+ form the cationic center in structural formula (VI) shown herein.

According to aspects of the present disclosure, $R_1$, $R_2$, and $R_3$ in structural formula (VI) shown herein are independently selected from the group consisting of $C_1$-$C_3$ alkyl. In one embodiment, $R_1$, $R_2$, and $R_3$ in structural formula (VI) shown herein are methyl.

According to aspects of the present disclosure, $L_1$ in structural formula (VI) shown herein is selected from the group consisting of —C(=O)O—(CH₂)n- and —C(=O)NH—(CH₂)n-, wherein n is 1-20. In one embodiment, $L_1$ in structural formula (VI) shown herein is —C(=O)O—(CH₂)₂—.

An included zwitterionic polymer according to aspects of the present disclosure is a carnitine-derived zwitterionic polymer having a plurality of repeating units, where each repeating unit has structural formula (IV):

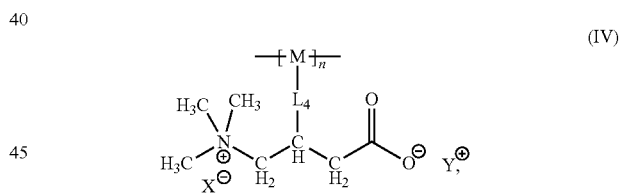

where M is a monomeric repeating unit, $L_4$ is a linker, n is an integer from 1 to about 10000, X⁻ is a counter ion associated with the cationic center, and Y⁺ is a counter ion associated with the anionic center. According to aspects of the present invention, M is a repeating unit of a polymer selected from the group consisting of: polyester, polyamide, poly(amino acid), polyimide, polycarbonate, polysiloxane, polyurethane, polyphosphazene, acrylic polymer, amino resin, epoxy resin, phenolic resin, and alkyd resin. n is an integer in the range of 2 to about 100,000.

According to aspects of the present disclosure, $L_4$ includes a functional group (e.g., ester or amide) that couples the remainder of $L_4$ to the C=C double bond for the monomers, or the backbone for the polymers. In addition to the functional group, $L_4$ can include a $C_1$-$C_{20}$ alkylene chain. Representative $L_4$ groups include —C(=O)O—(CH₂)$_n$— and —C(=O)NH—(CH₂)$_n$—, where n is 0-20 (e.g., n=0, n=2 etc.). According to aspects of the present invention, L4 is —C(=O)O—(CH₂)$_{n1}$— or —C(=O)NH—(CH₂)$_{n1}$—, where n1 is 0 or is an integer from 1 to 20, such as where n1 is 0, 1, 2, 3, 4, 5, 6, 7, 8, 9, 10, 11, 12, 13, 14, 15, 16, 17, 18, 19, or 20.

An included zwitterionic polymer according to aspects of the present disclosure according to aspects of the present disclosure has a plurality of repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, a phosphobetaine vinyl compound; and a mixture of any two or more thereof.

An included zwitterionic polymer according to aspects of the present disclosure is selected from the group consisting of: a sulfobetaine acrylate polymer, a sulfobetaine methacrylate polymer, a sulfobetaine acrylamide polymer, a sulfobetaine methacrylamide polymer, a sulfobetaine vinyl polymer, a carboxybetaine acrylate polymer, a carboxybetaine methacrylate polymer, a carboxybetaine acrylamide polymer, a carboxybetaine methacrylamide polymer, a carboxybetaine vinyl polymer, a phosphobetaine acrylate polymer, a phosphobetaine methacrylate polymer, a phosphobetaine acrylamide polymer, a phosphobetaine methacrylamide polymer, a phosphobetaine vinyl polymer; a polymer comprising of two or more zwitterionic repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, a phosphobetaine vinyl compound; and a mixture of any two or more zwitterionic polymers thereof.

An included zwitterionic polymer according to aspects of the present disclosure is selected from the group consisting of: PCBAA, PCBAA-1; PCBMA, PSBMA, PMPC, PCBOH, PCAR, and a mixture of any two or more thereof.

A zwitterionic polymer formed from a zwitterionic monomer in structural formulas shown herein can have 2 to about 100,000 monomer unit per polymer chain.

According to aspects, the zwitterionic polymer is selected from the group consisting of: poly(3-[[2-(methacryloyloxy)ethyl]dimethylammonio]propionate) (PCBMA); poly(N-(carboxymethyl)-2-hydroxy-N,N-dimethyl-3-[(2-methyl-1-oxo-2-propen-1-yl)oxy]-1-propanaminium) (PCBOH); poly[2-(methacryloyloxy)ethyl]dimethyl-(3-sulfopropyl) ammonium hydroxide (PSBMA); poly(((2R)-3-carboxy-N,N,N-trimethyl-2-[(1-oxo-2-propen-1-yl)oxy]-1-propanaminium) (PCAR); and poly(methacryloyloxyethyl phosphorylcholine) (PMPC).

Lipid-Derived Monomers and Polymers

According to aspects of the present disclosure, a copolymer included in a composition includes a plurality of repeating hydrophobic units, where the structural formula of each repeating hydrophobic unit, also termed "lipid-derived monomer" herein, is: [polymerizable moiety]-lipid.

Lipids included in lipid/zwitterionic copolymer-based particles of the present disclosure can be naturally-occurring lipids, synthetic lipids or combinations thereof.

Lipids may be included in a lipid/zwitterionic copolymer and/or may be included in the particles without inclusion in the copolymers. Thus, for example, a lipid/zwitterionic copolymer may be used alone to form micelles, liposomes, or other particles, or a lipid/zwitterionic copolymer may be included in particles which are substantially composed of lipids not present in a lipid/zwitterionic copolymer.

A lipid included in a copolymer, [polymerizable moiety]-lipid, may be bonded to the polymerizable moiety via any of various covalent bonds depending on which functional groups are present in the polymerizable moiety and lipid. For example, a [polymerizable moiety]-lipid in certain embodiment is formed by reacting an available OH group, COOH group, $PO_4^{2-}$ group, and/or $NH_2$ group of a lipid to bond to a polymerizable moiety. The polymerizable moiety and/or lipid can be modified to introduce an appropriate functional group for use in reaction to bond the polymerizable moiety and lipid using standard methodology to produce a desired [polymerizable moiety]-lipid.

An included [polymerizable moiety]-lipid according to aspects of the present disclosure has a structure of $(R_4)(C=)$C—C(=O)O-Lipid1. $R_4$ is hydrogen or a $C_1$-$C_4$ alkyl group. According to embodiments, $(R_4)(C=)$C—C(=O)O-Lipid1 is a reaction product of OH-Lipid1 and $(R_4)(C=)$C—C(=O)O—H, where OH-Lipid1 represents an OH group-containing lipid, including sterols, cholesterol, phytosterols, OH-containing steroids, hydroxysteroids, OH-containing fat-soluble vitamins (e.g., vitamins A, D, E, and K), OH containing phospholipids and their derivatives (phosphatidylinositol, phosphatidylglycerol, bisphosphatidyl glycerol, lysophosphatidylcholine, etc.), monoglycerides, diglycerides, sphingolipids (sphingosine, ceramides, sphingomyelins, cerebrosides, gangliosides, etc.), glycolipids (glyceroglycolipids, glycosphingolipids, etc.), prenol lipids, saturated and unsaturated fatty alcohols with carbon number being 9 and above (lauryl, stearyl, and oleyl alcohols, etc.).

An included [polymerizable moiety]-lipid according to aspects of the present disclosure has a structure of $(R_4)(C=)$C—C(=O)O—$R_5$—O—(C=O)-Lipid2 or $(R_4)(C=)$C—C(=O)O—$R_5$—$PO_4$-Lipid2. $R_4$ is hydrogen or a $C_1$-$C_4$ alkyl group. $R_5$ is a $C_1$-$C_6$ alkyl group, wherein $(R_4)(C=)$C—C(=O)O—$R_5$—O—(C=O)-Lipid2 and $(R_4)(C=)$C—C(=O)O—$R_5$—$PO_4$-Lipid2 are reaction products of OH—(C=O)-Lipid2 or $PO_4^{2-}$-Lipid2, respectively, with a suitable polymerizable moiety. Examples of COOH group-containing lipids and $PO_4^{2-}$ containing-lipids, are retinoic acid, COOH-containing phospholipids and their derivatives (phosphatidylserine, etc.), $PO_4^{2-}$-containing phospholipids and their derivatives (phosphatidic acid, etc), COOH containing sphingolipids (gangliosides, etc.), $PO_4^{2-}$-containing sphingolipids (sphingomyelins, etc.), and saturated and unsaturated fatty acids with carbon number 8 and above (C8 and greater).

An included [polymerizable moiety]-lipid according to aspects of the present disclosure has a structure of $(R_4)(C=)$C—C(=O)—NH-Lipid3. $R_4$ is hydrogen or a C1-C4 alkyl group, wherein $(R_4)(C=)$C—C(=O)—NH-Lipid3 is a reaction product of $NH_2$-Lipid3 with a suitable polymerizable moiety. Examples of $NH_2$ group-containing lipids, include $NH_2$ group-containing phospholipids and their derivatives (phosphatidylethanolamine), and NH2-containing sphingolipids (sphingosine, sphingomyelins, etc.), glycosphingolipids, etc.

Lipid/zwitterionic copolymer-based particles according to aspects of the present disclosure can include one or more types of neutral, cationic lipid and/or anionic lipid. Such lipids may be included in a lipid/zwitterionic copolymer and/or may be included in the particles without inclusion in the copolymers.

The term "cationic lipid" refers to any lipid which has a net positive charge at physiological pH. Examples of cationic lipids include, but are not limited to, N-(1-(2,3-dioleyloxy)propyl)-N,N,N-trimethylammonium chloride (DOTMA); 1,2-dioleoyloxy-3-(trimethylammonium)propane (DOTAP); 1,2-dioleoyl-3-dimethylammonium-propane (DODAP); dioctadecylamidoglycylspermine (DOGS); 1,2-dipalmitoylphosphatidylethanolamidospermine (DPPES); 2,3-dioleyloxy-N-(2-(sperminecarboxamido)ethyl)-N,N-dimethyl-1-propanaminium trifluoroacetate (DOSPA); dimyristoyltrimethylammonium propane (DMTAP); (3-dimyristyloxypropyl)(dimethyl)(hydroxyethyl)ammonium (DMRIE); dioctadecyldimethylammonium chloride (DODAC), Dimethyldidodecylammonium bromide (DDAB); 3β[N—(N',N'-dimethylaminoethane)-carbamoyl]cholesterol (DC-Chol); 1-[2-(9(Z)-octadecenoyloxy)-ethyl]-2-(8(Z)-heptadecenyl)-3-(2-hydroxyethyl)-imidazolinium (DOTIM); bis-guanidinium-spermidine-cholesterol (BGTC); bis-guanidinium-tren-cholesterol (BGTC); 1,3-Di-oleoyloxy-2-(6-carboxy-spermyl)-propylamid (DOSPER) N-[3-[2-(1,3-dioleoyloxy)propoxy-carbonyl]propyl]-N,N,N-trimethylammonium iodide (YKS-220); as well as biologically acceptable salts and mixtures thereof. Additional examples of cationic lipids are described in Lasic and Papahadjopoulos, Medical Applications of Liposomes, Elsevier, 1998; U.S. Pat. Nos. 4,897,355; 5,208,036; 5,264,618; 5,279,833; 5,283,185; 5,334,761; 5,459,127; 5,736,392; 5,753,613; 5,785,992; 6,376,248; 6,586,410; 6,733,777; and 7,145,039.

The term "neutral lipid" refers to any lipid which has no net charge, either uncharged or in neutral charge zwitterionic form, at physiological pH. Examples of neutral lipids include, but are not limited to, L-alpha-phosphatidylcholine (ePC), distearoylphosphatidylcholine (DSPC), dioleoylphosphatidylethanolamine (DOPE), distearoylphosphatidylethanolamine (DSPE); 1,2-dioleoyl-sn-glycero-3-Phosphocholine (DOPC), 1,2-dipalmitoyl-sn-glycero-3-phosphoethanolamine (DPPE), cephalin, ceramide, cerebrosides, cholesterol, diacylglycerols, and sphingomyelin.

The term "anionic lipid" refers to any lipid which has a net negative charge at physiological pH. Examples of anionic lipids include, but are not limited to, dihexadecylphosphate (DhP), phosphatidyl inositols, phosphatidyl serines, such as dimyristoyl phosphatidyl serine, and dipalmitoyl phosphatidyl serine, phosphatidyl glycerols, such as dimyristoylphosphatidyl glycerol, dioleoylphosphatidyl glycerol, dilauryloylphosphatidyl glycerol, dipalmitoylphosphatidyl glycerol, distearyloylphosphatidyl glycerol, phosphatidic acids, such as dimyristoyl phosphatic acid and dipalmitoyl phosphatic acid and diphosphatidyl glycerol.

The term "modified lipid" refers to lipids modified to aid in, for example, inhibiting aggregation and/or precipitation of the particles, inhibiting immune response and/or improving half-life in circulation in vivo. Modified lipids include, but are not limited to, pegylated lipids, such as polyethyleneglycol 2000 distearoylphosphatidylethanolamine (PEG (2000) DSPE); 1,2-dipalmitoyl-sn-glycero-3-phosphoethanolamine-N-[methoxy(polyethylene glycol)-2000] (DPPE-PEG-2000), and polyethyleneglycol 750 octadecylsphingosine (PEG(750) C8).

An included lipid in a lipid-derived monomer or polymer according to aspects of the present disclosure is a fatty acid or fatty alcohol. According particular aspects, the fatty acid or fatty alcohol is a $C_4$ to $C_{28}$ fatty acid or fatty alcohol, such as a $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, or $C_{28}$ fatty acid or fatty alcohol.

According particular aspects, the fatty acid or fatty alcohol of a lipid-derived monomer or polymer is selected from the group consisting of: caprylic, capric, lignoceric, cerotic, pelargonic, lauric, myristic, palmitic, stearic, isostearic, hydroxystearic, myristoleic, palmitoleic, sapienic, oleic, elaidic, vaccenic, linoleic, linoelaidic, ricinoleic, arachidic, arachidonic, eicosapentaenoic, behenic, erucic, and docosahexaenoic acids or alcohols.

According particular aspects, the fatty acid or fatty alcohol of a lipid-derived monomer or polymer is saturated, monounsaturated, or polyunsaturated.

According particular aspects, the polymerizable moiety of a lipid-derived monomer is an acrylate, a hydroxyalkyl ester, a polyvalent ester, and a vinyl ester.

According particular aspects, the polymerizable moiety of a lipid-derived monomer is a carbonate; an acrylate selected from the group consisting of: methacrylate, methyl (meth)acrylate, ethyl (meth)acrylate, butyl (meth)-acrylate, 2-ethylhexyl (meth)acrylate, phenyl (meth)acrylate and benzyl (meth)acrylate; a hydroxyalkyl ester selected from the group consisting of: 2-hydroxyethyl (meth)acrylate and 2-hydroxypropyl (meth)acrylate; a polyvalent ester selected from the group consisting of: ethylene glycol diacrylate, polyethylene glycol di(meth)acrylate, neopentyl glycol di(meth)acrylate, trimethylolpropane tri(meth)acrylate and pentaerythritol tetraacrylate; (meth)acrylonitrile, (meth)acrylamide, N-substituted (meth)acrylamide; a vinyl ester selected from the group consisting of: vinyl acrylate, vinyl acetate, vinyl propionate and vinyl succinate; a vinyl compound selected from the group consisting of: a vinyl ether, styrene, halogenated styrene, divinylbenzene, vinylnaphthalene, N-vinylpyrrolidone, diallyl phthalate, diallyl malate, triallyl isocyanate triallyl phosphate.

According particular aspects, the polymerizable moiety of a lipid-derived monomer is a methacrylate.

According particular aspects, the [polymerizable moiety]-lipid is octadecyl acrylate (ODA) and wherein the lipid-derived polymer is poly(octadecyl acrylate) (PODA).

A lipid-derived polymer formed from a lipid-derived monomer according to aspects of the present disclosure can have 2 to about 100,000 monomer unit per polymer chain.

Copolymers

An included copolymer according to aspects of the present disclosure is a copolymer including a zwitterionic polymer and a lipid-derived polymer.

An included copolymer according to aspects of the present disclosure is selected from the group consisting of: PCBMA-PODA, PCBOH-PODA, PSBMA-PODA, PCAR-PODA, and PMPC-PODA.

A copolymer formed from one or more zwitterionic monomers and one or more lipid-derived monomers according to aspects of the present disclosure can have 2 to about 100,000 monomer unit per polymer chain.

Polymerization Reactions

According to aspects of the present disclosure, polymerization of monomers and crosslinkers according to aspects shown or described herein will result in polymer backbones including vinyl backbones (i.e., —C(R')(R'')—C(R''')(R'''')—, where R', R'', R''', and R'''' are independently selected from hydrogen, alkyl, and aryl) derived from vinyl monomers (e.g., acrylate, methacrylate, acrylamide, methacrylamide, styrene).

Methods of polymerization include radical polymerization, living polymerization, condensation, ring opening polymerization and click chemistry. Details of polymerization mechanisms are well-known along with appropriate reaction conditions, initiators, catalysts and other standard co-factors as exemplified herein.

Zwitterionic polymers (linear zwitterionic polymers), lipid-derived polymers, and copolymers thereof, are synthesized through free radical polymerization method or living polymerization method. These polymerization methods normally involve initiators, zwitterionic monomers, lipid-derived monomers, catalysts (optional), and the polymerization condition is selected from heating, lighting, etc. The feeding monomer amount relative to initiator amount is varied to obtain polymers with different molecular weight (MW). The obtained polymers are typically purified by dialyzing against water followed by freeze-drying.

Zwitterionic Polymer-Lipid Conjugate

According to aspects of the present disclosure, a zwitterionic polymer-lipid conjugate included in a composition includes a conjugation product of zwitterionic polymer and a lipid.

A lipid included in the zwitterionic polymer-lipid conjugate, may be bonded to one or both terminal groups of the zwitterionic polymer via any of various covalent bonds depending on which functional groups are present in one or both terminal groups of zwitterionic polymer and lipid. For example, a zwitterionic polymer-lipid conjugate according to aspects of the present disclosure is formed by reacting an available OH group, COOH group, $PO_4^{2-}$ group, and/or $NH_2$ group of a lipid to bond to one or both terminal groups of the zwitterionic polymer. One or both terminal groups of zwitterionic polymer and/or lipid can be modified to introduce an appropriate functional group for use in reaction to bond the zwitterionic polymer and lipid using standard methodology to produce a desired zwitterionic polymer-lipid conjugate.

A hydrophobic precursor to the zwitterionic polymer with improved solubility can be used according to aspects of the present disclosure, such as a cationic ester of the zwitterionic polymer, for the conjugation reaction. After the conjugation reaction, the precursor polymer can be converted back to a zwitterionic polymer, producing a zwitterionic polymer-lipid conjugate.

A lipid included in the zwitterionic polymer-lipid conjugate, may be modified to introduce a chemical group which can further initiate a polymerization of zwitterionic monomers to form a zwitterionic polymer from the modified lipid depending on which functional groups are present in the lipid. For example, a zwitterionic polymer-lipid conjugate according to aspects of the present disclosure is formed by reacting an available OH group, COOH group, $PO_4^{2-}$ group, and/or $NH_2$ group of a lipid to introduce a radical initiator group, which further initiates a free radical and/or living polymerization of the zwitterionic monomers to form a zwitterionic polymer from the modified lipid under an appropriate polymerization condition, and optionally including a catalyst.

A hydrophobic precursor to the zwitterionic polymer with improved solubility can be used according to aspects of the present disclosure, such as a cationic ester of the zwitterionic polymer, for the conjugation reaction. After the conjugation reaction, the precursor polymer can be converted back to a zwitterionic polymer, producing a zwitterionic polymer-lipid conjugate. According particular aspects, the zwitterionic polymer-lipid conjugate is DSPE-PCB (DSPE lipid conjugated with poly(N-methacryloyloxyethyl-N,N-dimethylammonium-α-N-methylcarboxybetaine)).

A zwitterionic polymer-lipid conjugate may be used alone to form micelles, liposomes, or other particles, or a zwitterionic polymer-lipid conjugate may be included in particles which are substantially composed of lipids not present in the zwitterionic polymer-lipid conjugate.

Block Copolymer Containing Zwitterionic Polymer Block and Hydrophobic Polymer Block According to aspects of the present disclosure, a block copolymer included in a composition includes a conjugation product of zwitterionic polymer block included in this disclosure and a hydrophobic polymer block. The hydrophobic polymer block included in the block copolymer, may be bonded to one or both terminal groups of the zwitterionic polymer via any of various covalent bonds depending on which functional groups are present in one or both terminal groups of zwitterionic polymer block and hydrophobic polymer block. For example, a block copolymer in certain embodiment is formed by reacting an available OH group, COOH group, and/or $NH_2$ group from one or both terminal groups of the hydrophobic polymer block to bond to one or both terminal groups of the zwitterionic polymer. One or both terminal groups of zwitterionic polymer block and/or hydrophobic polymer block can be modified to introduce an appropriate functional group for use in reaction to bond the zwitterionic polymer block and hydrophobic polymer block using standard methodology to produce a desired zwitterionic polymer-hydrophobic polymer block copolymer.

In certain embodiments, there may be a difficulty in finding an appropriate solvent or co-solvent to dissolve the hydrophobic polymer block and the zwitterionic polymer block. Then a hydrophobic precursor to the zwitterionic polymer block with improved solubility can be used instead, such as a cationic ester of the zwitterionic polymer, for the conjugation reaction. After the conjugation reaction, the precursor polymer can be converted back to zwitterionic polymer to obtain the zwitterionic polymer-hydrophobic polymer block copolymer.

The hydrophobic polymer block included in the block copolymer, may be modified to introduce a chemical group to one or both terminal groups which can further initiate a polymerization of zwitterionic monomers to form a zwitterionic polymer block from the modified hydrophobic polymer block depending on which functional terminal group or groups are present in the hydrophobic polymer block. For example, such block copolymer in certain embodiment is formed by reacting an available OH group, COOH group, and/or $NH_2$ group of one or both terminal groups of the hydrophobic polymer block to introduce a radical initiator group, which further initiates a free radical and/or living polymerization of the zwitterionic monomers to form a zwitterionic polymer from the modified hydrophobic polymer block at an appropriate polymerization condition including a catalyst when needed. In certain embodiment, there may be a difficulty in finding an appropriate solvent or co-solvent to dissolve the hydrophobic polymer block and the zwitterionic monomer. Then a hydrophobic precursor to the zwitterionic monomer with improved solubility can be used instead, such as a cationic ester of the zwitterionic monomer, for the polymerization reaction. After the polymerization reaction, the polymerized precursor polymer can be converted back to zwitterionic polymer block to obtain the zwitterionic polymer-hydrophobic polymer block copolymer.

In certain embodiments, the hydrophobic polymer block can be a polymer block that is biocompatible or FDA-approved. The hydrophobic polymer block can be a homopolymer or a copolymer.

In certain embodiments, the hydrophobic polymer block is biodegradable, and can be selected from but not limited to peptides, polyesters, polyorthoesters, polyanhydrides, polyesteramindes, and polyoxaesters, and their derivatives or combinations thereof.

In certain embodiments, the hydrophobic polymer block comprises a polymer selected from poly(lactic-co-glycolic acid)(PLGA), polycaprolactone (PCL), polyglycolide (PG), polylactic acid (PLA), poly-3-hydroxybutyrate, polydioxanone, polytrimethylenecarbonate, poly(glycolide-co-caprolactone), poly(glycolide-co-trimethylenecarbonate), and poly(dioxanone-co-trimethylenecarbonate-co-glycolide).

In certain embodiments, the hydrophobic block has a number average molecular weight from 200 to 200,000 Da.

According to particular aspects, the zwitterionic polymer-hydrophobic polymer block copolymer is PLGA-PCB, containing PLGA block and poly(N-methacryloyloxyethyl-N,N-dimethylammonium-α-N-methylcarboxybetaine) block. The block copolymer containing zwitterionic polymer block and hydrophobic polymer block may be used alone to form micelles, liposomes, polymersomes or other particles.

Zwitterionic Nanohydrogel and Microhydrogel Particles

According to aspects of the present disclosure, zwitterionic nanogel and microgel particles are chemical hydrogel particles selected from the group consisting of: a polymerization product of a zwitterionic monomer included in this disclosure and a non-zwitterionic crosslinker; a polymerization product of a zwitterionic monomer included in this disclosure and a zwitterionic copolymer comprising one or more reactive groups reactive with the zwitterionic monomer; and a polymerization product of a first zwitterionic copolymer comprising reactive functional groups and a second zwitterionic copolymer comprising reactive functional groups, wherein the first and second zwitterionic copolymers are identical or different.

A zwitterionic monomer included in zwitterionic nanohydrogel and microhydrogel particles according to aspects of the present disclosure is selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, a phosphobetaine vinyl compound; and a mixture of any two or more thereof.

A non-zwitterionic crosslinker reacted with a zwitterionic monomer according to aspects of the present disclosure is a polyreactive crosslinking agent. According to particular aspects, a non-zwitterionic crosslinker is an acryloyl-containing crosslinker. According to particular aspects, a non-zwitterionic crosslinker is an allyl crosslinker. According to particular aspects, a non-zwitterionic crosslinker is a vinyl compound.

A non-zwitterionic crosslinker reacted with a zwitterionic monomer according to aspects of the present disclosure is one or more of: allyl methacrylate, diallyl itaconate, monoallyl itaconate, dially maleate, diallyl fumarate, diallyl succinate, diallyl phthalate, triallyl cyanurate, triallyl isocyanurate, diethylene glycol bis-allyl carbonate, divinyl ether of diethylene glycol, triallyl phosphate, triallyl trimellitate, allyl ether, diallylimidazolidone, pentaerythritol triallyl ether (PETE), N,N-diallylmelamine, triallyl-1,3,5-triazine-2,4,6-(1H,3H,5H)trione (TATT), 2,4,6-Triallyloxy-1,3,5-triazine; vinyl compounds, e.g. divinyl benzene, N,N'-methylene bis acrylamide (MBAA), methylenebis(methacrylamide), ethylene glycol dimethacrylate, ethylene glycol diacrylate, neopentylglycol dimethacrylate, tetraethylene glycol dimethacrylate, polyethylene glycol dimethacrylate, polyethylene glycol diacrylate, hexamethylene bis maleimide, divinyl urea, bisphenol A bis methacrylate, divinyl adipate, glycerin trimethacrylate, trimethylolpropane triacrylate, trivinyl trimellitate, 1,5-pentadiene, 1,7-octadiene, 1,9-decadiene, 1,3-bis(4-methacryloxybutyl) tetramethyl disiloxane, divinyl ether, divinyl sulfone, N-vinyl-3 (E)-ethylidene pyrrolidone (EVP), ethylidene bis(N-vinyl pyrrolidone) (EBVP).

A non-zwitterionic crosslinker reacted with a zwitterionic monomer according to aspects of the present disclosure is MBAA.

According to aspects of the present disclosure, zwitterionic nanohydrogel and microhydrogel particles include a polymerization product of a zwitterionic monomer described herein and a non-zwitterionic crosslinker which is degradable under physiological conditions. Upon the degradation of the non-zwitterionic crosslinker, the formed hydrogel particles disintegrate, facilitating further degradation and/or clearance from the body of a subject to whom the zwitterionic nanohydrogel and microhydrogel particles were administered. Degradability of the non-zwitterionic crosslinker may be facilitated by various structural features such as, but not limited to, a hydrolysable moiety and/or a reducible moiety. The non-zwitterionic crosslinker may have hydrolysable moieties including but not limited to a carboxylate ester, a phosphate ester, a carbamate, an anhydride, an acetal, a ketal, an acyloxyalkyl ether, an imine, a hydrazone, an orthoester, a thioester, a carbonate, a sulfonate, a peptide, an oligonucleotide, etc. The non-zwitterionic crosslinker may have reducible moieties including but not limited to a disulfide, etc.

In preferred aspects, the non-zwitterionic crosslinker is an acrylate, methacrylate, acrylamide, or methacrylamide degradable non-zwitterionic crosslinker.

In preferred aspects, the non-zwitterionic crosslinker is N,N'-bis(acryloyl)cystamine.

A zwitterionic copolymer having reactive groups according to aspects of the present disclosure has the structural formula (VII):

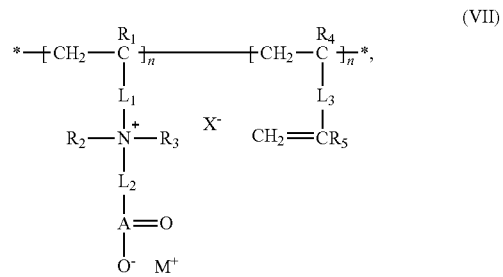

(VII)

where $R_1$, $R_2$, $R_3$, $R_4$, and $R_5$ are each independently selected from hydrogen, alkyl, and aryl groups; $L_1$ is a linker that covalently couples a cationic center to the polymer backbone; $L_2$ is a linker that covalently couples the cationic center to an anionic group; $A(=O)O^-$ is the anionic group; A is C, S, SO, P, or PO; $X^-$ is the counter ion associated with the cationic center; and $M^+$ is a metal ion, an ammonium ion, or an organic ion; $L_3$ is a linker that covalently couples a double bond to a polymer backbone, n is an integer in the range of 2 to about 100,000, m is a positive non-zero number; and m/n is in the range of 0.1%-50%.

A zwitterionic copolymer having reactive groups according to aspects of the present disclosure has the structural formula: (VII), where $R_1$, $R_2$, $R_3$, $R_4$, and $R_5$ are each independently selected from hydrogen, alkyl, and aryl groups; $R_1$, $R_4$, and $R_5$ are each independently selected from the group consisting of hydrogen, fluorine, trifluoromethyl, C1-C6 alkyl, and C6-C12 aryl groups; $R_2$ and $R_3$ are independently selected from the group consisting of alkyl and aryl, or taken together with the nitrogen to which they are attached form a cationic center; $L_1$ is a linker that covalently couples a cationic center [$N^+(R_2)(R_3)$] to a monomer double bond or its polymer backbone [—$(CH_2—CR_1)_n$—]; $L_2$ is a linker that covalently couples a anionic center [$A(=O^-)$—$O^-$] to a cationic center; A is C, S, SO, P, or PO; $M^+$ is a counter ion associated with the $(A=O)O^-$ anionic center; $X^-$ is a counter ion associated with the cationic center; $L_3$ is a linker that covalently couples a double bond to a polymer backbone; n is an integer in the range of 2 to about 100,000, m is a positive non-zero number; and m/n is in the range of 0.1%-50%.

A zwitterionic copolymer having reactive groups according to aspects of the present disclosure is a PCBAA-1 macrocrosslinker having the structural formula:

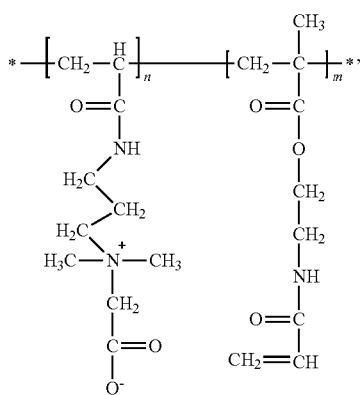

where n is an integer in the range of 2 to about 100,000, m is a positive non-zero number; and m/n is in the range of 0.1%-50%. According to aspects of the present disclosure, m/n is in the range of 0.2%-50%, 0.25%-50%, 0.5%-50%, 0.75%-50%, 1%-50%, 2%-50%, 3%-50%, 4%-50%, 5%-50%, 6%-50%, 7%-50%, 8%-50%, 9%-50%, 10%-50%, 15%-50% or 20%-50%.

According to aspects of the present disclosure, zwitterionic nanohydrogel and microhydrogel particles further include hydrophobic moieties. According to aspects of the present disclosure, zwitterionic nanohydrogel and microhydrogel particles include a polymerization product of a composition described herein further including other monomers with hydrophobic moieties.

The function of the hydrophobic moieties includes increase of the retention of the biologically active agent to be associated. These hydrophobic moieties and/or monomers can be of any of various structures, including, but not limited to, lipids and/or lipid-derived monomers described herein.

According to aspects, the zwitterionic nanohydrogel and microhydrogel particles are synthesized through free radical polymerization method or living polymerization method. These polymerization methods normally involve initiators, zwitterionic monomers, hydrophobic monomers (optional), crosslinkers, surfactants (optional; to form emulsion), catalysts (optional), and the polymerization condition is selected from heating, lighting, etc. The feeding monomer amount relative to initiator amount and/or the feeding monomer amount relative to crosslinker amount and/or the overall monomer concentration is varied to obtain crosslinked hydrogel particles. The obtained zwitterionic nanohydrogel and microhydrogel particles (1 nm to 10 um size) are typically purified by centrifugation to remove large gel particles, and dialyzing against water to remove unreacted reagents and surfactants, if any.

Biologically Active Agents

A composition according to aspects of the present disclosure includes particles, wherein the particles include one or more zwitterionic polymers and one or more biologically active agents, wherein the biologically active agent is a protein, peptide, or dietary supplement.

A biologically active agent, wherein the biologically active agent is a protein, peptide, or dietary supplement included according to aspects of the present disclosure is characterized by low bioavailability when administered orally. The term "bioavailability" refers to the rate and extent to which the biologically active agent reaches a target from an administered dosage form.

The term "biologically active agent" as used herein refers to any protein, peptide, or dietary supplement which possesses a desired biological activity, such as an effect on a biological system, such as a therapeutic, diagnostic, or prophylactic activity in vivo. An included "biologically active agent" can be any of various proteins, peptides, and dietary supplements. A combination or mixture of any two or more biologically active agents can be included.

A biologically active agent which is a protein, peptide, or dietary supplement included according to aspects of the present disclosure can have any of various therapeutic applications including, but not limited to, antibiotics, antifungals, antivirals, antiparasitics, antiprotozoals, antineoplastic agents, analgesics, anesthetics, antipyretics, antidepressants, antipsychotics, anti-cancer agents, antihistamines, hemostasis agents, immunosuppressive agents, antigens, anti-osteoporosis agents, anti-osteonecrosis agents, antiinflammatory agents, anxiolytics, sedatives, hypnotics, tranquilizers, muscle relaxants, chemotherapeutic agents, diuretics, growth factors, hormones, birth control agents, progestational agents, non-steroidal anti-inflammatory agents, antipyretics, vasoactive agents, radiosensitizers, bronchodilators, calcium antagonists, angiotensin-converting enzyme inhibitors, channel blockers, beta-blockers, centrally active alpha-agonists, alpha-$i$-antagonists, anticholinergics, antispasmodics, vasopressin analogues, antiarrhythmic agents, anti-parkinsonian agents, antispasmodics, antianginal agents, antihypertensive agents, anticoagulant agents, antiplatelet agents, antithrombotic agents, laxatives, antidiarrheal agents, vaccines, anti-glaucoma agents, ophthalmic agents, antidiabetics, antiepileptics, decongestants, enzyme inhibitors, diuretics, and antidiuretics.

A biologically active agent, wherein the biologically active agent is a protein, peptide according to aspects of the present disclosure can be, but is not limited to, an antibody, such as a mAb. As used herein, the terms "antibody" and "antibodies" relate to monoclonal antibodies, polyclonal antibodies, bispecific antibodies, multispecific antibodies, human antibodies, humanized antibodies, chimeric antibodies, camelized antibodies, single domain antibodies, single-chain Fvs (scFv), single chain antibodies, disulfide-linked Fvs (sdFv), and anti-idiotypic (anti-Id) antibodies (including, e.g., anti-Id antibodies to antibodies of the invention), and epitope-binding fragments of any of the above. In particular, antibodies include immunoglobulin molecules and immunologically active fragments of immunoglobulin molecules, i.e., molecules that contain an antigen binding site. Immunoglobulin molecules are of any type (e.g., IgG, IgE, IgM, IgD, IgA and IgY), class (e.g., IgG1, IgG2a, IgG2b, IgG2, IgG3, IgG4, IgA1, and IgA2), or subclass.

Examples of antibody fragments include Fab fragments, Fab' fragments, F(ab')2 fragments, Fd fragments, Fv fragments, scFv fragments, and domain antibodies (dAb). Antibody fragments may be generated by any technique known to one of skill in the art. For example, Fab and F(ab')2 fragments may be produced by proteolytic cleavage of immunoglobulin molecules, using enzymes such as papain (to produce Fab fragments) or pepsin (to produce F(ab') 2 fragments). F(ab') 2 fragments contain the complete light chain, and the variable region, the CH 1 region and the hinge region of the heavy chain. Antibody fragments are also produced by recombinant DNA technologies. Antibody fragments may be one or more complementarity determining regions (CDRs) of antibodies.

Examples of such antibodies include, but are not limited to, 3F8, 8H9, abagovomab, abituzumab, abrilumab, actoxumab, adalimumab, adecatumumab, aducanumab, afasevikumab, afutuzumab, alemtuzumab, alirocumab, altumomab, amatuximab, anetumab, anifrolumab, anrukinzumab, apolizumab, aprutumab, arcitumomab, ascrinvacumab, aselizumab, atezolizumab, atidortoxumab, atinumab, atorolimumab, avelumab, azintuxizumab, bapineuzumab, basiliximab, bavituximab, begelomab, belimumab, benralizumab, bermekimab, bertilimumab, besilesomab, bevacizumab, bezlotoxumab, bimagrumab, bimekizumab, bivatuzumab, bleselumab, blontuvetmab, blosozumab, bococizumab, brazikumab, brentuximab, briakinumab, brodalumab, brontictuzumab, burosumab, cabiralizumab, camidanlumab, camrelizumab, canakinumab, cantuzumab, cantuzumab, capromab, carlumab, carotuximab, catumaxomab, cedelizumab, cemiplimab, cergutuzumab, cetuximab, cixutumumab, clazakizumab, clenoliximab, clivatuzumab, codrituzumab, coltuximab, conatumumab, concizumab, crenezumab, crotedumab, dacetuzumab, daclizumab, dalotuzumab, dapirolizumab, daratumumab, dectrekumab, demcizumab, denintuzumab, denosumab, depatuxizumab, derlotuximab, detumomab, dinutuximab, diridavumab, domagrozumab, drozitumab, duligotuzumab, dupilumab, durvalumab, dusigitumab, ecromeximab, eculizumab, edobacomab, edrecolomab, efalizumab, eldelumab, elgemtumab, elotuzumab, elsilimomab, emactuzumab, emapalumab, emibetuzumab, emicizumab, enoblituzumab, enfortumab, enavatuzumab, enfortumab, enlimomab, enoblituzumab, enokizumab, enoticumab, ensituximab, epitumomab, epratuzumab, eptinezumab, erenumab, ertumaxomab, etaracizumab, etrolizumab, evinacumab, evolocumab, exbivirumab, fanolesomab, faralimomab, farletuzumab, fasinumab, felvizumab, fezakinumab, ficlatuzumab, figitumumab, firivumab, flanvotumab, fletikumab, fontolizumab, foralumab, foravirumab, fremanezumab, fresolimumab, fulranumab, futuximab, galcanezumab, galiximab, ganitumab, gantenerumab, gavilimomab, gemtuzumab, gevokizumab, girentuximab, glembatumumab, golimumab, gomiliximab, guselkumab, ianalumab, ibalizumab, ibritumomab, icrucumab, idarucizumab, ifabotuzumab, igovomab, imab362, imalumab, imeiromab, imgatuzumab, inclacumab, indatuximab, indusatumab, inebilizumab, infliximab, inolimomab, inotuzumab, intetumumab, ipilimumab, iratumumab, isatuximab, istiratumab, itolizumab, ixekizumab, keliximab, labetuzumab, ladiratuzumab, lanadelumab, landogrozumab, laprituximab, larcaviximab, lebrikizumab, lemalesomab, lenzilumab, lerdelimumab, lexatumumab, lifastuzumab, ligelizumab, lilotomab, lintuzumab, lirilumab, lokivetmab, loncastuximab, lorvotuzumab, lucatumumab, lulizumab, lumiliximab, lumretuzumab, lupartumab, lutikizumab, mapatumumab, margetuximab, matuzumab, mavrilimumab, mepolizumab, metelimumab, milatuzumab, minretumomab, mirikizumab, mirvetuximab, mitumomab, mogamulizumab, monalizumab, morolimumab, mosunetuzumab, motavizumab, moxetumomab, muromonab-CD3, namilumab, naptumomab, naratuximab, narnatumab, natalizumab, necitumumab, nemolizumab, nerelimomab, nesvacumab, nimotuzumab, nivolumab, obiltoxaximab, obinutuzumab, ocaratuzumab, ocrelizumab, odulimomab, ofatumumab, olaratumab, oleclumab, olokizumab, omalizumab, omburtamab, onartuzumab, ontuxizumab, opicinumab, oregovomab, orticumab, otelixizumab, otlertuzumab, oxelumab, ozanezumab, pagibaximab, palivizumab, pamrevlumab, panitumumab, pankomab, panobacumab, parsatuzumab, pascolizumab, pateclizumab, patritumab, pembrolizumab, pemtumomab, perakizumab, pertuzumab, pidilizumab, pinatuzumab, placulumab, pidilizumab, plozalizumab, polatuzumab, ponezumab, prezalizumab, priliximab, pritoxaximab, pritumumab, quilizumab, racotumomab, radretumab, rafivirumab, ralpancizumab, ramucirumab, ranevetmab, ranibizumab, ravulizumab, raxibacumab, refanezumab, regavirumab, relatlimab, remtolumab, reslizumab, rilotumumab, rinucumab, risankizumab, rituximab, robatumumab, roledumab, romosozumab, rontalizumab, rovalpituzumab, rovelizumab, rozanolixizumab, ruplizumab, sacituzumab, samalizumab, sarilumab, satralizumab, satumomab, secukinumab, seribantumab, setoxaximab, sibrotuzumab, sifalimumab, siltuximab, simtuzumab, siplizumab, sirukumab, sofituzumab, solanezumab, sonepcizumab, sontuzumab, spartalizumab, stamulumab, sutimlimab, suvizumab, suvratoxumab, tabalumab, tacatuzumab, tadocizumab, talizumab, tanezumab, taplitumomab, tarextumab, tefibazumab, telimomab, telisotuzumab, tenatumomab, teneliximab, teplizumab, teprotumumab, tesidolumab, tetulomab, tezepelumab, theralizumab, tigatuzumab, tildrakizumab, timolumab, tislelizumab, tisotumab, tocilizumab, toralizumab, tositumomab, tovetumab, tralokinumab, trastuzumab, TRBS07, tregalizumab, tremelimumab, trevogrumab, tucotuzumab, tuvirumab, ublituximab, ulocuplumab, urelumab, ustekinumab, urtoxazumab, utomilumab, vadastuximab, vandortuzumab, vanticumab, vanucizumab, vapaliximab, varlilumab, vatelizumab, vedolizumab, veltuzumab, vesencumab, visilizumab, volociximab, vorsetuzumab, votumumab, xentuzumab, XMAB-5574, zalutumumab, zanolimumab, zatuximab, zenocutuzumab, ziralimumab, zolbetuximab, and zolimomab.

A biologically active agent included according to aspects of the present disclosure can be, but is not limited to, an Fc fusion.

A biologically active agent included according to aspects of the present disclosure can be, but is not limited to, an enzyme, a cytokine, a coagulation factor, and a plasma protein.

A biologically active agent included according to aspects of the present disclosure can be a nutritional supplement such as, but not limited to, Coenzyme Q10, fish oil, krill oil, omega-3, 6, 9, a vitamin, particularly a fat soluble vitamin, such as but not limited to, vitamin A, vitamin D, vitamin E, and vitamin K.

An antidiabetic biologically active agent which is a protein, peptide, or dietary supplement can be insulin, such as human insulin, or a human insulin analogue or derivative, a glucagon-like peptide (GLP-1), a GLP-1 analogue or GLP-1 receptor agonist, or an analogue or derivative of any thereof, such as but not limited to, dulaglutide, exenatide, semaglutide, liraglutide, and lixisenatide. Antidiabetic agents include insulin derivatives such as insulin conjugates containing zwitterionic polymers such as described in WO2018136505A. A combination or mixture of any two or more antidiabetic agents can be included.

As used herein, the term "derivative" refers to any substance which is sufficiently structurally similar to the original substance so as to have substantially similar functionality or activity such as substantially similar therapeutic effectiveness.

A particle composition according to aspects of the present disclosure includes at least one biologically active agent in an amount of 0.0001-90%, w/w, of the particle composition.

Particle Formulations

Compositions including a plurality of particles according to aspects of the present disclosure are provided wherein each particle has an exterior surface, the exterior surface defining a particle interior, the exterior surface having at least one type of zwitterionic polymer disposed thereon and/or extending therefrom; and a biologically active agent, wherein the biologically active agent is a protein, peptide, or dietary supplement, disposed on the exterior surface and/or in the particle interior, methods of synthesis and use thereof.

Particles including a zwitterionic polymer and a biologically active agent, wherein the biologically active agent is a protein, peptide, or dietary supplement, can be lipid-containing or non-lipid containing particles such as, but not limited to, micelles, liposomes, unilamellar or mulitlamellar vesicles; polymer particles such as zwitterionic hydrogel particles, polyglycolic acid particles, polylactic acid particles; inorganic particles such as calcium phosphate particles such as described in for example U.S. Pat. No. 5,648,097; and inorganic/organic particulate carriers such as described for example in U.S. Pat. No. 6,630,486.

Particles including a zwitterionic polymer and a biologically active agent, wherein the biologically active agent is a protein, peptide, or dietary supplement, can further include one or more lipids; one or more additional polymers; one or more inorganic or organic components; mixtures or combinations of any thereof. A mixture of particle types can also be included in a composition for oral and/or mucosal administration for delivery of the biologically active agent.

Particles according to the present disclosure have average particle size in the range of about 1 nm-10 microns. In particular aspects, the particles are formulated to have an average particle size in the range of about 5 nm-10 microns.

Particles according to aspects of the present disclosure include a lipid/zwitterionic copolymer-based biologically acceptable carrier. The term "lipid/zwitterionic copolymer-based" refers to macromolecular structures having lipid and zwitterionic copolymer as the major constituent forming the structure, excluding the "cargo" material, i.e. the biologically active agent, wherein the biologically active agent is a protein, peptide, or dietary supplement.

Particles according to aspects of the present disclosure include a zwitterionic polymer-lipid conjugate-based biologically acceptable carrier. The term "zwitterionic polymer-lipid conjugate-based" refers to macromolecular structures having lipid and zwitterionic polymer as the major constituent forming the structure, excluding the "cargo" material, i.e. the biologically active agent, wherein the biologically active agent is a protein, peptide, or dietary supplement.

Particles according to aspects of the present disclosure include a zwitterionic polymer-hydrophobic polymer block copolymer-based biologically acceptable carrier. The term "zwitterionic polymer-hydrophobic polymer block copolymer-based" refers to macromolecular structures having a hydrophobic polymer block and a zwitterionic polymer block as the major constituent forming the structure, excluding the "cargo" material, i.e. the biologically active agent, wherein the biologically active agent is a protein, peptide, or dietary supplement.

Particles according to aspects of the present disclosure include a zwitterionic nanohydrogel or microhydrogel-based biologically acceptable carrier. The term "zwitterionic nanohydrogel or microhydrogel" refers to macromolecular structures having a crosslinked network of zwitterionic polymer as the major constituent forming the structure, excluding the "cargo" material, i.e. the biologically active agent, wherein the biologically active agent is a protein, peptide, or dietary supplement.

Lipid-containing particles are generated using well-known standard methods, including, but not limited to, solvent/hydration methods, ethanol or ether injection methods, freeze/thaw methods, sonication methods, reverse-phase evaporation methods, and surfactant methods.

Liposomes and methods relating to their preparation and use are found in Liposomes: A Practical Approach (The Practical Approach Series, 264), V. P. Torchilin and V. Weissig (Eds.), Oxford University Press; 2nd ed., 2003; N. Duzgunes, Liposomes, Part A, Volume 367 (Methods in Enzymology) Academic Press; 1st ed., 2003; L. V. Allen, Jr. et al., Ansel's Pharmaceutical Dosage Forms and Drug Delivery Systems, 8th Ed., Philadelphia, PA: Lippincott, Williams & Wilkins, 2005, pp. 663-666; and A. R. Gennaro, Remington: The Science and Practice of Pharmacy, Lippincott Williams & Wilkins, 21st ed., 2005, pp. 766-767.

Association of a Biologically Active Agent with Particles

A biologically active agent can be associated with particles of the present disclosure by any of various methods.

Methods through which a biologically active agent can be associated with particles of the present invention have been well known in the field. Through these methods a biologically active agent can be disposed on the exterior particle surface and/or in the particle interior.

According to aspects of the present disclosure, a lipid/zwitterionic copolymer-based biologically acceptable carrier, a zwitterionic polymer-lipid conjugate-based biologically acceptable carrier, and/or a zwitterionic polymer-hydrophobic polymer block copolymer-based biologically acceptable carrier, depend on the composition, will assemble into micelles, liposomes, vesicles, and/or spheres, among other particle forms in an aqueous environment. This is driven by the amphiphilic nature (containing both hydrophilic and hydrophobic moieties) of these carriers. A biologically active agent can be associated with particles of the present disclosure by mixing with a lipid/zwitterionic copolymer-based biologically acceptable carrier, a zwitterionic polymer-lipid conjugate-based biologically acceptable carrier, and/or a zwitterionic polymer-hydrophobic polymer block copolymer-based biologically acceptable carrier, before, during, and/or after the formation of the particles.

According to aspects of the present disclosure, a zwitterionic nanohydrogel or microhydrogel is formed through a polymerization and/or crosslinking process. A biologically active agent can be associated with particles of the present invention by mixing with a formed zwitterionic nanohydrogel or microhydrogel, and/or a pre-polymerization and/or pre-crosslinking preparation before forming the zwitterionic nanohydrogel or microhydrogel.

According to aspects of the present disclosure, after the association of a biologically active agent with particles, the preparation can be further purified through centrifugation, ultrafiltration, dialysis against water or aqueous solution, and/or size-exclusion column to remove impurities and/or unassociated biologically active agent, if any.

Additives

Compositions according to aspects of the present disclosure further include an additive effective to aggregate and/or condense, and/or insolubilize the biologically active agent. The additive interacts with the biologically active agent through any of various mechanisms, such as, but not limited to, electrostatic interaction, condensation and/or precipitation with the biologically active agent, and/or physically interaction with the biologically active agent.

The additive functions to prevent the premature release of the biologically active agent from the particles while the particles are being stored before being administered.

The additive functions to prevent the premature release of the biologically active agent from the particles where the particles have been administered orally and/or to a mucosal surface of a subject, but have not been absorbed, such as have not yet been absorbed through epithelium of stomach and/or intestine following oral administration.

According to aspects of the present disclosure, an additive or additives functions to retain an amount in the range of 1% to 90% or more of the biologically active agent in association with the particles before the particles have been absorbed through epithelium of stomach and/or intestine, which may take 1 min to 30 min, 30 min to 1 h, or longer after being orally administered to a subject.

According to aspects of the present disclosure, an additive or additives functions to allow release of the biologically active agent from the particles at an appropriate time and space. According to aspects of the present disclosure, a biologically active agent cannot perform its biological activity/function while encapsulated and/or associated with the particles. According to aspects of the present disclosure, association of the additive with the biologically active agent functions to modulate the release of the biologically active agent from the particles. The association of the additive with the biologically active agent is formulated to allow for shorter or longer release times such that the biologically active agent is released and performs its biological activity/function within or over a desired period of time after administration to the subject, such that quick release, delayed release, or prolonged release is achieved, providing, for example, absorption through the epithelium of stomach and/or intestine of the subject.

According to aspects of the present disclosure, unlike typical absorption enhancers which open stomach and/or intestinal epithelium tight junctions and allow free biological active agents to be absorbed through paracellular transport, particles according to aspects of the present disclosure are efficiently absorbed via interaction with transporters and/or receptors of gastrointestinal epithelium cells without opening tight junctions and/or without allowing paracellular transport of an unassociated biologically active agent. Association of a biologically active agent with a particle according to aspects of the present disclosure is promoted by inclusion of an additive, thereby promoting absorption of the biologically active agent and particle together across the gastrointestinal epithelium.

According to aspects of the present disclosure, an additive includes metal ions, such as $Zn^{2+}$, $Ca^{2+}$, etc, interacting with the biologically active agent through, for example, electrostatic attraction and/or chelation According to aspects of the present disclosure, an additive includes a charged peptide and/or protein, such as protamine, etc. electrostatically interacting with the biologically active agent through attraction According to aspects of the present disclosure, an additive includes a charged polymer electrostatically interacting with the biologically active agent through attraction.

According to aspects of the present disclosure, an additive includes a degradable polymer, such as polylactic acid (PLA), poly(lactic-co-glycolic acid) (PLGA), etc, which is condensed and/or precipitated together with the biologically active agent.

According to aspects of the present disclosure, the additive creates a pH condition under which the protein and/or peptide (biologically active agent) forms a condensed/aggregated state. For example, the protein and/or peptide becomes more condensed/aggregated as the pH approaches the isoelectric point of the protein and/or peptide.

A particle formulation can contain a mixture of particles including different types and/or amount of additive or additives.

According to aspects of the present disclosure, the additive is protamine.

According to aspects of the present disclosure the additive is a metal ion. According to aspects of the present disclosure the metal ion is $Zn^{2+}$ and/or $Ca^{2+}$.

According to aspects of the present disclosure, the additive is PLGA and/or PLA.

An additive or additives can be added to compositions according to aspects of the present disclosure by any of various methods. According to aspects of the present disclosure, an additive or additives can be added to the composition before or after the biologically active agent is added. According to aspects of the present disclosure, an additive or additives can be added to the composition before or after the particle is formed.

According to aspects of the present disclosure, an additive or additives can stay with the compositions, or can be removed from the compositions through centrifugation, ultrafiltration, dialysis against water or aqueous solution, and/or size-exclusion column, if needed.

Formulations

Once formed, the particles including a biologically active agent can be further modified to enhance delivery to a targeted region in the subject.

Pharmaceutical compositions suitable for delivery to a subject may be prepared in various forms illustratively including physiologically acceptable sterile aqueous or nonaqueous solutions, dispersions, suspensions or emulsions, and sterile powders for reconstitution into sterile injectable solutions or dispersions. Examples of suitable aqueous and nonaqueous carriers include water, ethanol, polyols such as propylene glycol, polyethylene glycol, glycerol, and the like, suitable mixtures thereof; vegetable oils such as olive oil; and injectable organic esters such as ethyloleate. Proper fluidity can be maintained, for example, by the use of a coating such as lecithin, by the maintenance of the required particle size in the case of dispersions, and by the use of surfactants, such as sodium lauryl sulfate. Additional components illustratively including a buffer, a solvent, or a diluent may be included.

Such formulations are administered by oral and/or mucosal administration.

A composition administered by mucosal administration delivers the biologically active agent transmucosally, i.e. via a muscosal membrane. Examples include, but are not limited to, buccal administration, sublingual administration, nasal administration, vaginal administration, and rectal administration.

These compositions may also contain adjuvants such as preserving, wetting, emulsifying, and dispensing agents. Prevention of the action of microorganisms can be ensured by various antibacterial and antifungal agents, for example, parabens, chlorobutanol, phenol, sorbic acid, and the like. It may also be desirable to include isotonic agents, for example, sugars, sodium chloride, and substances similar in nature. Prolonged delivery can be brought about by the use of agents delaying absorption, for example, aluminum monostearate and gelatin.

Solid dosage forms for oral and/or mucosal administration include capsules, tablets, pills, powders, and granules. The term "solid dosage form" includes materials such as gels, including for example, gelatin capsules and the like.

According to aspects of the present disclosure, particles including the biologically active agent are lyophilized to a powder or granules as a solid dosage form for oral and/or mucosal administration. According to further aspects of the present disclosure, particles including the biologically active agent which are lyophilized to a powder or granules as a solid dosage form are inserted into a container, such as a capsule or other acceptable solid dosage form container.

In such solid dosage forms, the particles including the biologically active agent are optionally admixed with at least one inert customary excipient such as sodium citrate or dicalcium phosphate or (a) fillers or extenders, as for example, starches, lactose, sucrose, glucose, mannitol, and silicic acid, (b) binders, as for example, carboxymethylcellulose, alignates, gelatin, polyvinylpyrrolidone, sucrose, and acacia, (c) humectants, as for example, glycerol, (d) disintegrating agents, as for example, agar-agar, calcium carbonate, plant starches such as potato or tapioca starch, alginic acid, certain complex silicates, and sodium carbonate, (e) solution retarders, as for example, paraffin, (f) absorption accelerators, as for example, quaternary ammonium compounds, (g) wetting agents, as for example, cetyl alcohol, glycerol monostearate, and glycols (h) adsorbents, as for example, kaolin and bentonite, and (i) lubricants, as for example, talc, calcium stearate, magnesium stearate, solid polyethylene glycols, sodium lauryl sulfate, or mixtures thereof. In the case of capsules, tablets, and pills, the dosage forms may also include a buffering agent.

Solid compositions of a similar type may also be employed as fillers in soft and hard-filled gelatin capsules using such excipients as lactose or milk sugar as well as high molecular weight polyethyleneglycols, and the like.

Solid dosage forms such as tablets, dragees, capsules, pills, and granules can be prepared with coatings and shells, such as enteric coatings and others well known in the art. They may contain opacifying agents, and can also be of such composition that they release the active compound or compounds in a certain part of the intestinal tract in a delayed manner. Examples of embedding compositions which can be used are polymeric substances and waxes. The active compounds can also be in micro-encapsulated form, if appropriate, with one or more of the above-mentioned excipients.

Besides such inert diluents, the composition can also include adjuvants, such as wetting agents, emulsifying and suspending agents, sweetening, flavoring, and perfuming agents.

Compositions according to aspects of the present disclosure can be formulated in the form of a lotion, gel, ointment, cream, or emulsion.

Biologically acceptable carriers and formulation of pharmaceutical compositions are known in the art, illustratively including, but not limited to, as described in Remington: The Science and Practice of Pharmacy, $21^{st}$ Ed., Lippincott, Williams & Wilkins, Philadelphia, PA, 2006; and Allen, L. V. et al., Ansel's Pharmaceutical Dosage Forms and Drug Delivery Systems, $8^{th}$ Ed., Lippincott, Williams & Wilkins, Philadelphia, PA, 2005.

Methods

Methods and compositions of the present disclosure can be used for prophylaxis as well as amelioration of signs and/or symptoms of a condition to be treated. The terms "treating" and "treatment" used to refer to treatment of an undesired condition in a subject include: preventing, inhibiting or ameliorating the undesired condition in the subject, such as slowing progression of the undesired condition and/or reducing or ameliorating a sign or symptom of the undesired condition.

Subjects are identified as having, or at risk of having, an undesired condition using well-known medical and diagnostic techniques. It is appreciated that undesired cosmetic conditions are encompassed by the term "undesired condition" and that such conditions can also be treated with compositions according to aspects of the present disclosure.

Methods of treatment of a subject having, or at risk of having, an undesired condition are provided according to aspects of the present disclosure including oral and/or mucosal administration of a biologically effective amount of particles including a zwitterionic polymer and a biologically active agent, wherein the biologically active agent is a protein, peptide, or dietary supplement.

The term "subject" refers to an individual in need of treatment for an undesired condition responsive to the beneficial effects of compositions of the present disclosure, and generally includes mammals and birds, such as, but not limited to, humans, other primates, cats, dogs, cows, horses, rodents, pigs, sheep, goats and poultry. According to particular aspects, the subject is human.

An inventive composition may be administered acutely or chronically. For example, a composition as described herein may be administered as a unitary dose or in multiple doses over a relatively limited period of time, such as seconds-hours. In a further embodiment, administration may include multiple doses administered over a period of days-years, such as for treatment of a chronic condition.

A therapeutically effective amount of a pharmaceutical composition according to the present disclosure will vary depending on the particular pharmaceutical composition used, the severity of the condition to be treated, the species of the subject, the age and sex of the subject and the general physical characteristics of the subject to be treated. One of skill in the art could determine a therapeutically effective amount in view of these and other considerations typical in medical practice. In general it is contemplated that a therapeutically effective amount would be in the range of about 0.001 mg/kg to 100 mg/kg body weight. Further, dosage may be adjusted depending on whether treatment is to be acute or continuing.

In particular aspects of the present disclosure, a treated subject is an individual known to have diabetes, suspected of having diabetes or at risk of having diabetes. Methods of treatment of a subject having, or at risk of having, diabetes are provided according to aspects of the present disclosure including oral and/or mucosal administration of a biologically effective amount of particles including a zwitterionic polymer and an antidiabetic biologically active agent which is a protein or peptide, such as insulin, an insulin analogue, or a pharmaceutical agent having a therapeutic effect of insulin, wherein the insulin analogue, or pharmaceutical agent is a protein, or peptide.

In particular aspects of the present disclosure, a treated subject is an individual known to have type 1 diabetes, suspected of having type 1 diabetes or at risk of having type 1 diabetes. Methods of treatment of a subject having, or at risk of having, type 1 diabetes are provided according to aspects of the present disclosure including oral and/or mucosal administration of a biologically effective amount of particles including a zwitterionic polymer and an antidiabetic biologically active agent which is a protein or peptide, such as insulin, an insulin analogue, or a pharmaceutical agent having a therapeutic effect of insulin, wherein the insulin analogue, or pharmaceutical agent is a protein, or peptide.

In particular aspects of the present disclosure, a treated subject is an individual known to have type 2 diabetes, suspected of having type 2 diabetes or at risk of having type 2 diabetes. Methods of treatment of a subject having, or at risk of having, type 2 diabetes are provided according to aspects of the present disclosure including oral and/or mucosal administration of a biologically effective amount of particles including a zwitterionic polymer and an antidiabetic biologically active agent which is a protein or peptide, such as insulin, an insulin analogue, or a pharmaceutical agent having a therapeutic effect of insulin, wherein the insulin analogue, or pharmaceutical agent is a protein, or peptide.

An antidiabetic biologically active agent which is a protein or peptide can be insulin, such as human insulin, or a human insulin analogue or derivative, a glucagon-like peptide (GLP-1), a GLP-1 analogue or GLP-1 receptor agonist, or an analogue or derivative of any thereof, such as but not limited to, dulaglutide, exenatide, semaglutide, liraglutide, and lixisenatide. Antidiabetic agents include insulin derivatives such as insulin conjugates containing zwitterionic polymers such as described in WO2018136505A. A combination or mixture of any two or more antidiabetic agents can be included.

In particular aspects of the present disclosure, a treated subject is an individual known to have type 2 diabetes, suspected of having type 2 diabetes or at risk of having type 2 diabetes. Methods of treatment of a subject having, or at risk of having, type 2 diabetes are provided according to aspects of the present disclosure including oral and/or mucosal administration of a biologically effective amount of particles including a zwitterionic polymer and an antidiabetic biologically active agent which is a protein or peptide, such as insulin, such as human insulin, and/or a human insulin analogue or derivative, a glucagon-like peptide (GLP-1), a GLP-1 analogue or GLP-1 receptor agonist, or an analogue or derivative of any thereof, such as but not limited to, dulaglutide, exenatide, semaglutide, liraglutide, and lixisenatide, wherein the insulin analogue, or pharmaceutical agent is a protein, or peptide.

In particular aspects, treatment of a subject to treat diabetes is characterized by prevention or amelioration of signs and symptoms of diabetes as assessed by techniques known in the art and described herein.

Embodiments of inventive compositions and methods are illustrated in the following examples. These examples are provided for illustrative purposes and are not considered limitations on the scope of inventive compositions and methods.

EXAMPLES

Zwitterionic Particle Increases Transport Through Mucus.

Figure 2A:
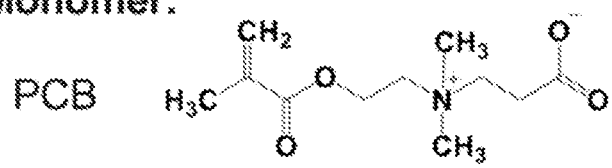
FIG. 2A shows monomer and crosslinker structures included in nanogel particles according to aspects of the present disclosure, including zwitterionic PCB (poly(3-[[2-(methacryloyloxy)ethyl]dimethylammonio]propionate)), neutral nonionic PEG (polyethylene glycol), anionic PSPMA (poly 3-sulforpropyl methacrylate potassium salt), or cationic PMTTA (poly((2-(methacryloyloxy) ethyl) trimethylammonium chloride)), and crosslinked by a fluorescent dye (fluorescein O,O'-dimethacrylate)
Figure 2A:
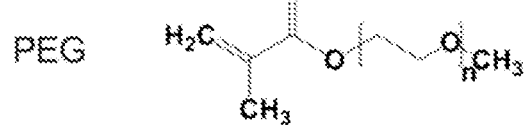
Figure 2A:
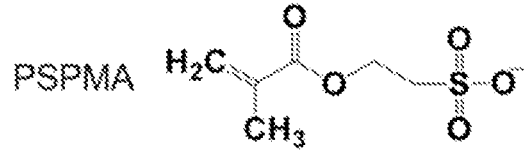
Figure 2A:
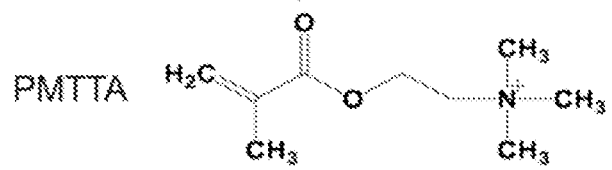
Figure 2A:
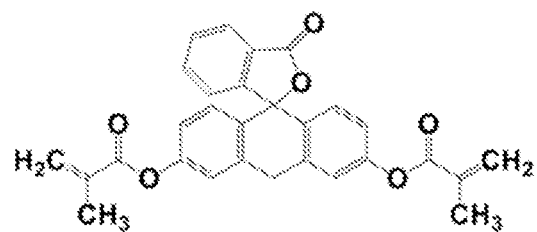
Figures 2B, 2C:
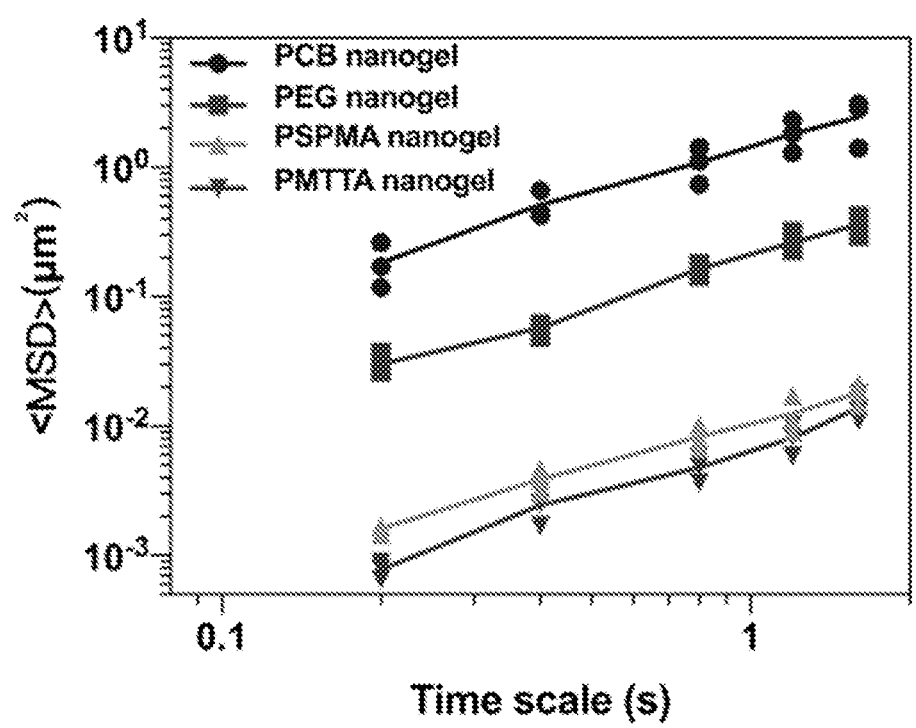
FIG. 2B is a table showing hydrodynamic size and zeta-potential for particle samples measured by DLS (N=3 independent samples, mean±SD)
FIG. 2C is a graph showing transport of nanogels in reconstituted porcine stomach mucus; the graph shows the MSD as a function of time for different types of particles; data represent three independent experiments with 50 particles tracked for each experiment (N=3 independent samples, means connected)

In this example, nanogel particles were made with zwitterionic monomers and other neutral, positive and negative charged monomers crosslinked with a fluorescent crosslinker (FIG. 2A). This nanogel chemistry allows convenient preparation of particles that had comparable hydrodynamic size (~40 nm) but different zeta-potentials as determined by Dynamic Light Scattering (DLS) (FIG. 2B). These particles were incubated with reconstituted porcine stomach mucus, and their diffusion trajectory was tracked under a spinning disc confocal fluorescent microscope. It was found that the ensemble-averaged geometric mean square displacement (MSD) of the zwitterionic PCB particle (made from poly (3-[[2-(methacryloyloxy)ethyl]dimethylammonio]propionate)) was about 6.7 times of the PEG particle and 100 times or more of anionic and cationic particles (FIG. 2C). These results indicate that zwitterionic particles diffuse much faster than the state-of-the-art mucus-penetrating PEG particles in the mucus.

Figure 2D:
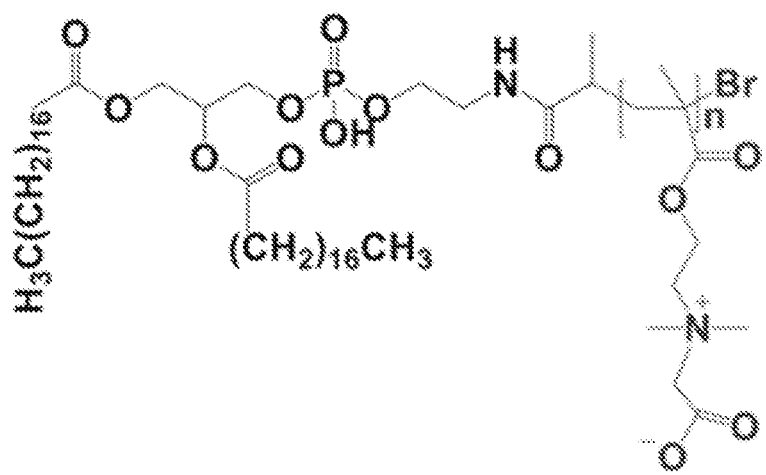
FIG. 2D shows chemical structures for DSPE-PCB and Polysorbate 80 micelles.
Figure 2D:
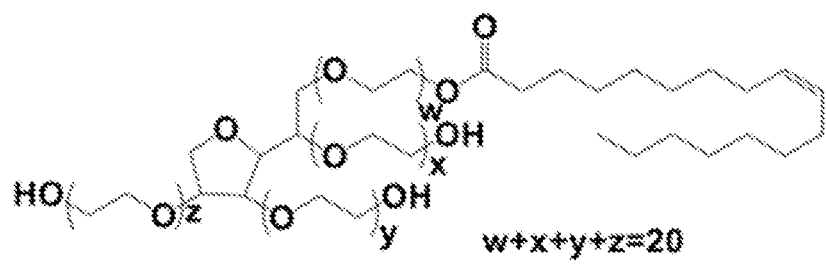
Figures 2E, 2F:
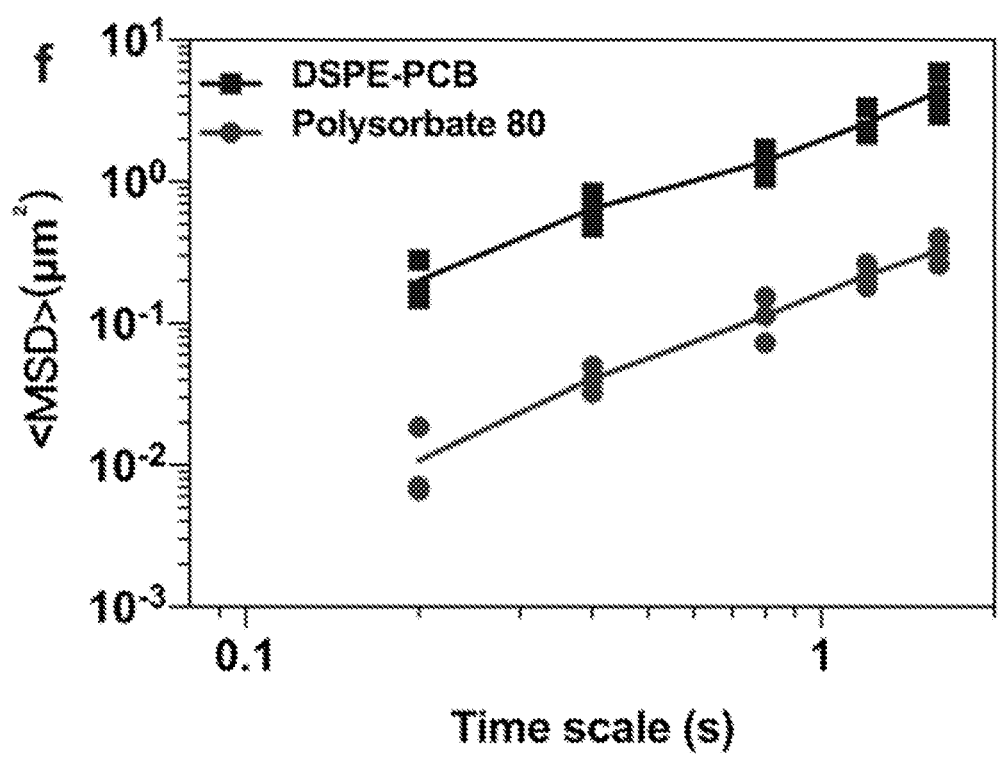
FIG. 2E is a table showing hydrodynamic size and zeta-potential for micelle samples with fluorescent payload encapsulated measured by DLS (N=3 independent samples, mean±SD)
FIG. 2F is a graph showing transport of micelle samples in reconstituted porcine stomach mucus; the graph shows the MSD as a function of time for different types of particles.

Zwitterionic DSPE-PCB micelles (DSPE lipid conjugated with poly(N-methacryloyloxyethyl-N,N-dimethylammonium-α-N-methylcarboxybetaine)) were constructed which included a fluorescent payload (polystyrene nanoparticle crosslinked by fluorescent dye) encapsulated using the method detailed in Lu, Y. et al. Nat Biomed Eng 2, 318-325 (2018), and compared with Polysorbate 80 micelles (containing PEG chains in the hydrophilic group) for their diffusive behaviors in the reconstituted porcine stomach mucus under the same test condition (FIGS. 2D, 2E). This is to examine the mucus-diffusive potential of DSPE-PCB which could be further utilized for drug delivery. Results showed that MSD of zwitterionic DSPE-PCB micelles was ~12 times larger than Polysorbate 80 micelles (FIG. 2F). These results indicate that particles (both nanogel and micelles) with virus-mimetic zwitterionic surface property diffuse much faster than the state-of-the-art mucus-penetrating PEG based particles in mucus.

Zwitterionic micelle increases absorption via transporters. The zwitterionic DSPE-PCB was used to encapsulate human recombinant insulin via a simple process where $Zn^{2+}$ was slowly added with both DSPE-PCB and insulin present, which induced the insulin precipitation and the encapsulation by micelles. Both DSPE-PCB/insulin and Polysorbate 80/insulin were obtained with their hydrodynamic size below 30 nm as characterized by TEM and DLS (FIGS. 3A, 3B). The obtained micelle/insulin formulation was injected directly into the lumen of the ileum of streptozotocin (STZ)-induced C57BL/6 diabetic mice. Ileal administration was used to evaluate intestinal mucosal absorption in order to exclude the significant pH and enzyme degradation factors found in the stomach and duodenum, which can be overcome by strategies such as enteric coatings. In this example it was found that mouse blood glucose level was efficiently lowered by insulin delivered by DSPE-PCB—more efficiently than insulin encapsulated by PEG micelles (i.e., Polysorbate 80) (FIG. 3C). Native insulin not encapsulated by any carrier hardly achieved any glucose-lowering effect, which was quantified by comparison with baseline blood glucose level of mice that received saline (FIG. 3C). Insulin encapsulated by zwitterionic polymer micelles DSPE-PCB had a pharmacological activity of 41.2%, which is four times that of insulin loaded in Polysorbate 80, which was 10.6%.

The efficient intestinal absorption was hypothesized to be mediated by PAT1 transporter given that the surface of DSPE-PCB micelle contains a polymerized version of betaine, which is a known substrate for PAT1. To study the pathway by which DSPE-PCB micelles cross the epithelial layer, DSPE-PCB with gold nanoparticles encapsulated were constructed as detailed in Lu, Y. et al. *Nat Biomed Eng* 2, 318-325 (2018), and the DSPE-PCB/gold nanoparticles were administered by ileum injection. At one hour post injection, mice were sacrificed with epithelial tissue surrounding the injection site collected and processed for TEM imaging (FIG. 3D). Gold nanoparticles located at the inside of the epithelial cells support a transporter mediated pathway.

In a further example, an in vitro cellular uptake study of DSPE-PCB/fluorescently labeled polystyrene nanoparticles (previously used for mucus diffusion assay in FIGS. 2E, 2F) using a confocal laser scanning microscopy and flow cytometry. A significantly higher level of cellular uptake of the DSPE-PCB micelle particles was observed in Caco-2 cells (human colon epithelial cells known for PAT1 overexpression) compared with regular 3T3 cells (FIGS. 4A, 4B). Such high level cellular uptake by Caco-2 was significantly inhibited with the presence of betaine or L-tryptophan, which are known as PAT1 substrates (FIGS. 4A, 4B). Polysorbate 80 was used as non-targeting control and no observable polysorbate 80 uptake by Caco-2 cells was found. Three-dimensional visualization of cells confirmed that the micelle particles entered the cells rather than binding to the cell membrane/surface.

Penetration of Epithelium without Opening Tight Junctions

To examine potential impact on tight junctions by DSPE-PCB micelle, lactulose, mannitol, and free micelles were co-administered to both healthy and diabetic mice via ileum injection. One hour after the administration, the animals were sacrificed, and urine samples were collected in which lactulose and mannitol contents were quantified using HPLC-MS-MS (FIGS. 5A, 5B). The excretion ratio of lactulose to mannitol (L/M) in urine has been routinely studied in clinical practice as a measure for intestinal permeability and the integrity of mucosal barrier. A tight junction opening allows more lactulose (larger in size than mannitol) to pass through and overall increases the excreted L/M ratio. No significant change in L/M ratio was observed for the DSPE-PCB micelle treated group, compared with the control group, where animals received only the lactulose and mannitol but without any micelles (FIGS. 5A, 5B). By contrast, both polysorbate 80 and sodium decanoate treated groups showed drastically higher L/M ratio values, and it appeared that sodium decanoate, a known tight junction opener, with higher CMC values (50 mM, v.s. 0.015 mM for polysorbate 80) showed even higher L/M value (FIGS. 5A, 5B).

The intestine epithelial tissues surrounding the injection sites were fixed and processed for TEM imaging. DSPE-PCB micelle-treated tissue showed intact tight junctions morphologically similar to the control tissue not treated by any micelle (FIG. 5C). Tissues treated with polysorbate 80 and sodium decanoate showed more and even more severe tight junction opening, respectively (FIG. 5C). As an independent confirmation of the integrity of tight junctions after treatment by DSPE-PCB micelles, DSPE-PCB and control micelles were incubated with a monolayer of Caco-2 cells for 2 hours, followed by ZO-1 staining (tight junction protein) (FIG. 10). Results showed that DSPE-PCB treatment did not compromise the integrity of tight junctions while control micelles (tight junction openers) significantly disrupted the tight junction protein ZO-1. A transepithelial electrical resistance (TEER) test indicated that incubation with DSPE-PCB for 4 hours did not increase the permeability of Caco-2 cell layers, while both polysorbate 80 and sodium decanoate treated groups showed drastically decreased TEER values (FIG. 11).

Oral Insulin Formulation

The solution form of DSPE-PCB/insulin was able to address both intestinal mucus and epithelial barriers and achieved a pharmacological activity as high as 41.2% through ileum injections as previously mentioned. Nevertheless, direct oral gavage of the solution form to diabetic mice can hardly achieve a comparably high pharmacological activity as the ileum injected group at the same dose of 20 IU/kg, even by further increasing the oral dose to 30 IU/kg (FIG. 6A). This indicates the possibility of destabilization or degradation of DSPE-PCB/insulin at the harsh stomach environment (the first barrier) and necessitates the drugability to form an oral capsule to overcome this barrier. For comparison, solution form of polysorbate 80/insulin was similarly studied and achieved a far less capability in lowering blood glucose through either ileum injection or oral gavage at comparable doses (FIG. 6B).

The solution form of DSPE-PCB/insulin was freeze-dried into powders (without any additive cryoprotectant), the powders were then reconstituted into the solution form, and the pharmacological activity before and after the lyophilization was compared by ileum injections to diabetic mice (FIG. 6C). No apparent change of pharmacological activity for DSPE-PCB/insulin was observed after lyophilization. In comparison, there was an obvious loss of the blood glucose lowering activity of polysorbate 80/insulin after experiencing the lyophilization procedure (FIG. 6C). The performance loss is expected to be due to insulin leakage during lyophilization: DSPE-PCB/insulin retained 98.2% while polysorbate 80/insulin leaked 25% as determined by resolubilizing the formulation in water, followed by ultracentrifugation separation (10K MWCO) and BCA quantification for insulin.

Lyophilized powder of DSPE-PCB/insulin was inserted into a size M porcine gelatin capsule, followed by an Eudragit L100-55 enteric-coating procedure. The obtained insulin capsule (containing DSPE-PCB/insulin, or polysorbate 80/insulin) was administered to diabetic rats through oral gavage at the dose of 20 IU/kg followed by periodic measurement of blood glucose and serum insulin concentration using a glucometer and human insulin ELISA assay, respectively (FIG. 7A, 7B). Rats receiving subcutaneous (s.c.) injection of 5 IU/kg free insulin solution were used as controls. Based on the glucose lowering profile (FIG. 7A), the pharmacological activity of DSPE-PCB/insulin capsule was calculated to be 43.4%, much higher than Polysorbate 80/insulin capsule which was 8.56%. Based on the serum insulin profile (FIG. 7B), the bioavailability of DSPE-PCB/insulin capsule was calculated to be 42.6%, while polysorbate 80/insulin was merely 8.35%. It should be noted that when the free insulin capsule was orally administered, almost no insulin presence in serum was observed, indicating the inability for free insulin to get absorbed through the intestine.

DSPE-PCB/insulin capsule after oral gavage to diabetic rats showed an accelerated action time in lowering blood glucose as less $Zn^{2+}$ was used during the formulation procedure ($Zn^{2+}$ composition: Formulation 1<Formulation 2<Formulation 3) (FIG. 7C). By further decreasing $Zn^{2+}$ composition, the peak action time for the oral insulin can reach 1-2 h (such as Formulation 0 in FIG. 12). By increasing the $Zn^{2+}$ composition during the insulin precipitation and encapsulation process, more condensed insulin aggregation forms in the hydrophobic core of the micelle, which results in slower release rate of insulin (FIG. 9).

The effect of food on DSPE-PCB/insulin capsules was studied (FIG. 7D). Since betaine was found to decrease the uptake of DSPE-PCB micelle by blocking/inhibiting PAT1 transporter (FIG. 4), betaine water was selected as a model food in this study. Betaine water was gavaged to the diabetic rats 30 mins before or after the oral insulin administration at the dose of 80 mg betaine/kg. This dose roughly equals to the average daily betaine intake for rats. Results indicate that potential food interference could be minimized by administering oral insulin capsule 30 min before the meal (betaine water) consumption.

Absorption sites of oral insulin formulations were examined at different post-gavage time points in an ex vivo fluorescent imaging study (insulin labeled with Cy7) (FIG. 7E). DSPE-PCB/Cy7-insulin (formulation 1-3) and polysorbate 80/Cy7-insulin control were placed into the enteric capsules and administered to the rats through oral gavage. Results showed that DSPE-PCB/insulin had improved retention and absorption in the small intestine (jejunum and ileum) compared with polysorbate 80/insulin, consistent with the finding that PAT1 is highly expressed at the small intestine. The retention/absorption sites did not differ significantly among the three DSPE-PCB/insulin formulations. Formulation 3 had the slowest release rate of encapsulated insulin (highest $Zn^{2+}$ composition) and showed the highest fluorescent intensity retained.

Biocompatibility and Long-Term Safety

The in vitro cell viability and live/dead imaging, and in vivo long-term safety of the zwitterionic micelles were examined. For cell viability, both DSPE-PCB and polysorbate 80 exhibited no significant cytotoxicity on the Caco-2 cells between 0.01 and 1 mg/ml concentration range, which was also confirmed through live/dead staining (FIG. 8A, 8B). To examine potential cell-membrane disruption, both DSPE-PCB and Polysorbate 80 were incubated with Caco-2 cells and no significant lactate dehydrogenase (LDH) release was observed (FIG. 8C). Since single dosing with DSPE-PCB micelle did not open the tight junction (FIG. 5), tight junction opening and safety concerns were examined under a long-term dosing regimen in which mice received oral gavage of DSPE-PCB micelle twice-daily for 14 consecutive days. At day 14, the urine lactulose/mannitol test showed that there was no significant tight junction opening even after the long-term repeated dose challenge (FIG. 8D). H&E staining images on day 14 showed that no significant structural damage occurred to the small intestine tissue (FIG. 8E). The fingerlike villi were found intact in all the tissues examined and no significant inflammation was observed (FIG. 8E).

Potential leaky gut was investigated by examining the endotoxin and proinflammatory cytokine levels in blood serum from the mice receiving oral gavage of DSPE-PCB micelle and control micelles twice-daily for 14 consecutive days (at the same dose that was used to formulate oral insulin) (FIGS. 8F-8L). Results showed that the endotoxin and certain inflammatory cytokines such as TNF-α, IFN-γ and IL-6 had an observable increase even 1 hour after the mice received the oral dose of polysorbate 80 and sodium decanoate. Such high level of endotoxin and cytokines was further increased over the 14 days of consecutive administration, and did not appeared to be temporary, e.g., as characterized by the high serum level before administrating micelles on day 14. Between the control micelles, sodium decanoate induced even higher endotoxin leakage and proinflammatory response compared with polysorbate 80, which is consistent to its higher tight junction opening capability (FIG. 5). By contrast, DSPE-PCB did not induce any observable increase in terms of endotoxin and pro-inflammatory cytokines, supporting its long-term safe use without opening tight junctions and inducing leaky gut.

Methods

Materials. DSPE-PCB micelle was synthesized as described in Cao, Z. et al., *Langmuir* 28, 11625-11632 (2012). Human recombinant insulin (Cat #: NC1063131) was purchased from Life Technologies Corporation. Polysorbate 80, porcine stomach mucin type II, streptozotocin (STZ), $ZnCl_2$, $HAuCl_4$, $NaBH_4$, styrene, divinylbenzene, fluorescein O,O'-dimethacrylate, poly(ethylene glycol) methyl ether methacylate (average Mn 500), SPMA (3-sulfopropyl methacrylate potassium salt) and MTTA ((2-(methacryloyloxy) ethyl) trimethylammonium chloride, betaine, lactulose, mannitol, Corning® Transwell polyester membrane cell culture inserts, Lactate dehydrogenase activity assay kit (Cat #MAK066) were purchased from Sigma-Aldrich. Eudragit L 100-55 was obtained from Evonik Industries. ZO-1 Monoclonal Antibody Alexa Fluor 488 was purchased from Invitrogen (Cata #MA3-39100-A488, Lot #UE288707), Mouse Magnetic Luminex® assays was purchased from R&D systems (Cata #LXSAMSM-6, Lot #L131929).

Synthesis and characterization of zwitterionic nanogels and zwitterionic micelle labeled with polystyrene nanoparticles. In a typical preparation to synthesize nanogels, 100 mg monomer (PCB monomer: 3-[[2-(methacryloyloxy) ethyl]dimethylammonio]propionate), 0.3 mg fluorescein crosslinker (fluorescein O, O'-dimethacrylate), 3.5 mg surfactant (sodium dodecyl sulfate, SDS), 2 mg initiator (ammonium persulfate, APS) and 0.25 mg catalysts (N, N, N', N'-tetramethylethylenediamine, TEMED) was dissolved in 3 ml water which was previously purged with nitrogen. The reaction took two hours under vigorous stirring. The resulting mixture was then purified by 0.22 μm filter membrane, centrifuged several times to remove large particles, and dialyzed against deionized water to remove unreacted monomer and surfactant. The obtained nanogel solution was condensed to an appropriate concentration with ultrafiltration. The obtained nanogels were characterized using dynamic light scattering (DLS, Zetasizer Nano ZS; Malvern Instruments) to measure the hydrodynamic size and zeta-potential. In a typical preparation to synthesize micelles containing polystyrene nanoparticle payloads, DSPE-PCB or polysorbate 80 micelles, ammonium persulfate, styrene and divinyl benzene and fluorescein crosslinker (molar ratio is typically 1:10:1.5:1:1) were sonicated in deionized water to form nano-emulsion, followed by 20 min heating in water bath at 40° C. Micelles with polystyrene nanoparticle loaded were further purified through 10K MWCO ultrafiltration to remove rough materials, and 0.22 m filter to remove unexpected large particles. The size and zeta-potential of the polystyrene nanoparticles were determined by DLS.

Tracking nanoparticle diffusion in mucus. Nanoparticle diffusion behavior in mucus was studied by modifying methods as described in Lai, S. K. et al. *P Natl Acad Sci USA* 104, 1482-1487 (2007) and Olmsted, S. S. et al. *Biophys J* 81, 1930-1937 (2001). Mucus was reconstituted by dissolving porcine stomach mucin in phosphate buffered saline (PBS) at 30 mg/ml. Nanogels were added into 100 μl mucus to reach a final concentration of 3% vol/vol (final particle concentration, $8.25 \times 10^{-7}$ wt/vol) and incubated for 1 h on a Nunc™ glass bottom dish (0.17 mm thickness for the inside bottom glass) before observation. Movies were captured with 64×oil-immersion objective in a spinning disc confocal microscope (Yokogawa CSU-X1M 5000 microlens, Zeiss LSM 800). For each nanogel sample, trajectories of n=50 particles were analyzed, and three samples were examined for each type of nanogel. MSD was calculated with the equation of $MSD=<|r(t)-r(0)|^2>$ at a temporal resolution of 200 ms for 20 s.

Preparation and characterization of DSPE-PCB/insulin formulations and oral insulin capsules. In a typical preparation of DSPE-PCB/insulin formulation, 15 mg DSPE-PCB was added into 1 mL insulin solution (1 mg/mL, dissolved in 0.1 M sodium bicarbonate) under stirring at 800 r/min. Then 200 µl of $ZnCl_2$ solution (2 mg/mL) were added dropwise to insulin-containing solution and the resulting mixture was purified by an ultrafiltration membrane (10 K Da cutoff). The encapsulation efficiency for insulin was found to be over 98% by quantifying insulin content retained by the micelle using BCA Protein Assay Kit. Polysorbate 80/insulin formulation was prepared following the same procedure. Obtained DSPE-PCB/insulin formulations were measured for hydrodynamic size with DLS, and stained with phosphotungstic acid (2%, w/v) and visualized using JEOL 2010 transmission electron spectroscopy. To prepare oral insulin capsules, dry powder of DSPE-PCB/insulin or polysorbate 80/insulin was placed into a porcine gelatin capsule (size M, Torpac Inc., USA) followed by immersing the capsule in the Eudragit L 100-55 methanol solution (15% w/w) and drying at room temperature for three times to obtain the enteric coating. The amount of DSPE-PCB/insulin or polysorbate 80/insulin loaded per capsule was varied with targeted animal weight (each animal received one capsule containing 20 IU/kg insulin).

Cell uptake of polystyrene nanoparticles for Caco-2 and 3T3 cells. Caco-2 human colon epithelial cells and NIH 3T3 mouse embryonic fibroblast cells were used as received from the American Type Culture Collection without further authentication, and were cultured in Dulbecco's Modified Eagle's Medium (DMEM) and Eagle's Minimum Essential Medium (EMEM) at 37° C. in a 5% $CO_2$ environment respectively. Human Caco-2 was tested negative for Mycoplasm contamination per supplier. It is unclear whether NIH/3T3 has been tested for *mycoplasma* contamination by the supplier. Cells were seeded in a 12-well plate at a density of $1 \times 10^5$ cells per well overnight, washed twice with prewared PBS, and incubated with DSPE-PCB/polystyrene nanoparticles in culture medium at 37° C. for 2 h. For inhibitory groups, cells were pretreated with proton-assisted amino acid transporter inhibitors (betaine and L-tryptophan respectively, concentration: 5 mg/ml) in culture medium at 37° C. for 1 h before incubating with DSPE-PCB/polystyrene nanoparticles. The cells were further stained with 20 µL Hochest 33342 (1 mg/ml) and 700 µL of CellMask (Invitrogen, USA), each for 10 min at 37° C. followed by three times wash with PBS, and fixed using 4% glutaraldehyde for 15 min. Cellular uptake of DSPE-PCB/polystyrene nanoparticles in different groups was examined by an Zeiss LSM 780 confocal laser scanning microscope. The Z-stack method was used for three-dimensional visualization, where the section thickness was 2.5 µm, the step interval was 2 m, and the total z-stack length was 44 µm (23 slices). Fluorescent signal was quantified by using the image J software. Cellular uptake was also quantitively measured with flow cytometry (BD FACSAria II flow cytometer) and analyzed with FlowJo X software.

In vitro cytotoxicity and live/dead assay. In vitro cytotoxicity was evaluated using MTT assay with Caco-2 cells. Caco-2 cells were seeded on 96-well plates at a density of $2 \times 10^4$ cells per well in Eagle's Minimum Essential Medium (EMEM) with 20% FBS and cultured in 5% $CO_2$ atmosphere at 37° C. for 24 h. Then the cells were washed twice with HBSS and incubated with 100 µl of DSPE-PCB micelle or Polysorbate 80 solutions in EMEM with concentrations of 0.01, 0.1, and 1.0 mg/ml, respectively. After 24 h of incubation at 37° C., the DSPE-PCB micelle and Polysorbate 80 solution were replaced with 100 µL of MTT solution (0.5 mg/ml in HBSS), and the cells were incubated for an additional 4 h at 37° C. Subsequently, the supernatant was carefully removed and 150 µL of dimethyl sulfoxide (DMSO) was added to each well. The absorbance of the resultant solutions was measured at 570 nm using a microplate reader (Bio-Rad, USA). Untreated cells were used as negative control for 100% cell viability. Cell viability was expressed as percentage of absorbance relative to the control. Live/dead assay was conducted by staining the cells with 100 µL of PBS buffer containing 2 µM Calcein and 4 µM ethidiumhomodimer-1 (Live/Dead viability/cytotoxicity kit, Invitrogen, CA, USA). The cells were incubated at room temperature for 30 minutes and observed by the EVOS FL fluorescence microscope (AMG).

The LDH leakage assay. Caco-2 cells were seeded in a 96-well plate at a concentration of 104 cells per well. After incubating the plate overnight at 37° C., the medium was aspirated and replaced with DSPE-PCB or polysorbate solutions (100 µl per well at various concentrations). After 2 h of exposure, 50 µl of media from each well was transferred to a new, clear plate and was measured with the sigma lactate dehydrogenase activity assay kit. LDH level were quantified by comparing the absorbance of treated cells with that of untreated (negative control). Cells completely lysed were used as positive control.

The tight junction ZO-1 protein staining. Caco-2 cells were seeded on 96-well plates at a density of $2 \times 10^4$ cells per well in Eagle's Minimum Essential Medium (EMEM) with 20% FBS and cultured in 5% $C_{O2}$ atmosphere at 37° C. Then cells were washed twice with HBSS and incubated with different micelles respectively. After 2 h of incubation at 37° C., the cells were washed with PBS solution, and the cells were further stained with 20 µL Hochest 33342 (1 mg/ml) and ZO-1 Monoclonal Antibody Alexa Fluor 488 for 10 min at 37° C. followed by three times wash with PBS, and fixed using 4% glutaraldehyde for 15 min. The tight junction ZO-1 protein was examined by a Zeiss LSM 780 confocal laser scanning microscope.

Transepithelial electrical resistance (TEER) study. Caco-2 cells were suspended in EMEM supplemented with 20% FBS, and seeded at a density of $2 \times 10^5$ cells per well on Corning® Transwell polyester membrane cell culture inserts and incubated for 96 h. The TEER was monitored to confirm proper barrier formation and only monolayers with initial TEER values of at least $300\Omega \times cm^2$ were used for TEER or molecular permeability experiments. Prior to the study, the medium in the apical and basolateral chambers was replaced with prewarmed EMEM. After equilibration at 37° C. for 30 min, the apical solution was replaced with Sodium decanoate, polysorbate 80 or DSPE-PCB (0.2% w/v) in EMEM. After incubation for 4 h, the TEER value of each insert was measured with EVOM2

Epithelial volt/ohmmeter to explore the integrity of the tight junction.

Animals and diabetes induction. All animal experiments were performed according to the National Institute of Health (NIH) guidelines for animal research under a protocol approved by the Institutional Animal Care and Use Committee (IACUC) at Wayne State University. To establish streptozotocin (STZ)-induced diabetic mice model, healthy mice (C57BL/6J, male, 6-8 weeks of age, Jackson Lab) received a daily intraperitoneal injection of 5 mg/ml STZ at 50 mg/kg body weight for 5 consecutive days. 17 days after the first injection, body weight and blood glucose were measured to confirm the diabetic status. Diabetic mice with blood glucose above 300 mg/dL were selected for further in vivo test. To establish STZ-rat model, healthy rats (Sprague Dawley rat, male, ~180 g, Charles River) received a one-time intraperitoneal injection of 65 mg/kg STZ. 10 days after injection, diabetic rats with blood glucose above 300 mg/dL were selected for further in vivo test.

Ileum injection surgery. Mice received buprenorphine SR subcutaneously and surgical anesthesia was managed by isoflurane inhalation. The surgical site (abdomen) was shaved and prepped with three alternating scrubs of betadine and alcohol. On prepped animal, a single incision (1.5-2 cm) was made through abdomen skin. About 0.5-1 cm ileum of intestine was pulled-out from the enterocoelia. The enteric cavity of ileum was injected with different formulations and abdominal wall was closed with 3-0 nylon suture, and the skin wound was closed with wound clips ¼" apart. The duration of procedure was 20 minutes or less. During the whole surgical procedure mice was placed on a warm pad. Mice remained fasted during this experiment (less than 12 h) and were euthanized thereafter. To evaluate glucose lowering performance of ileum injected formulations, blood samples were collected from the tails at predetermined time intervals for glucose testing.

The lactulose-mannitol intestinal permeability test. Healthy and diabetic mice remained fasted for 8 h and were restricted from water for 3 h before the experiment. Then mice received 500 µL water through oral gavage. 1 h later, the lactulose, mannitol, and free micelles were co-administered via ileum injection at the dose of 40/8/5.2 mg/ml (50 µL) and the wound is closed with wound clips. 1 h post ileum injection, the urine was collected, and the ileum tissue surrounding the injection site was collected for TEM imaging. The concentrations of lactulose and mannitol were measured using LC-MS-MS, with a mobile phase of 10 mM ammonium formate in water and acetonitrile (90:10), and an Agilent advanced bio glucan mapping column (2.1×100 mm×2.7 µm) (precursor and product: mannitol 180.7→89; lactulose 341.2→160.8).

TEM imaging of tight junctions affected by the ileum injected formulations. 1 h post ileum injection of the formulations, mice were euthanized and small parts of ileum (5×5 mm) near to the injection site were collected and washed with PBS. The samples were continuously fixed in 2.5% glutaraldehyde+2.5% paraformaldehyde in 0.1M PBS buffer and 4% osmium tetroxide solution and transferred into Beem® embed capsule with micro-embed resin added to embed samples. The obtained blocks were further sectioned with ultra-microtomy to obtain sections with thickness of ~70 nm. These sections were retrieved via copper grid and stained with 1% lead citrate and 4% uranyl acetate separately, and then visualized under a JEM-100CX II electron microscope operated at 100 kV.

Oral administration of insulin capsules. Diabetic rats were fasted overnight, received one capsule containing the predetermined insulin dose through oral gavage, and remained fasted during the experiment (water ad libitum). At predetermined time intervals, blood samples were collected for glucose testing. Serum insulin level was determined using a Mercodia human insulin ELISA assay.

Absorption sites and kinetics of orally delivered insulin. Healthy rats were fasted for 12 h and then administered with DSPE-PCB/Cy7-insulin enteric capsules (Formulation 1-3) or Polysorbate 80/Cy7-insulin enteric capsules (20 IU/kg) by oral gavage. At various post-administration time points, the entire intestine was collected and visualized with the Bruker In-Vivo Xtreme imaging system.

Long-term safety of repeated consecutive dosing. Healthy mice were administered with saline or free DSPE-PCB micelles through oral gavage (0.258 mg DSPE-PCB per mice, the same dose in the intestinal permeability test) twice daily for 14 consecutive days. At day 14, the lactulose/mannitol experiment was conducted to examine potential tight junction opening through the lactulose-mannitol intestinal permeability test. In addition, the ileum tissue was collected and fixed in 10% zinc fixative (BD Pharmingen™), dehydrated in ethanol, and embedded in paraffin. Five-µm cross-sections of intestine tissue were deparaffinized, rehydrated, and stained with Hematoxylin and Eosin. Histological morphology was examined using an EVOS XL Core Cell Imaging microscope. In addition, healthy mice received the same oral administered with DSPE-PCB micelle, saline, Polysorbate 80, or sodium decanoate twice daily for 14 consecutive days (the same dose as above). On day 0 and 14, before and 1 h after the oral administration, blood serum was collected and the endotoxin and pro-inflammatory cytokines (IFN-γ, IL-1β, ILL-4, IL-6, IL-12, TNF-α) were measured with Pierce LAL Chromogenic Endotoxin Quantitation Kit and the mouse magnetic Luminex® assays (Lot No: L131929).

Statistical analysis. Animal cohorts were randomly selected, but investigators were not blind to the experiments. The one-way ANOVA with Tukey multiple comparisons test was used to determine significant differences among multiple groups with unpaired biological replicates. A two-tailed t-test analysis was used to determine significant difference between two groups with unpaired biological replicates. P values were reported in figure legends. A value of $P<0.05$ was considered statistically significant.

Figure 1B:
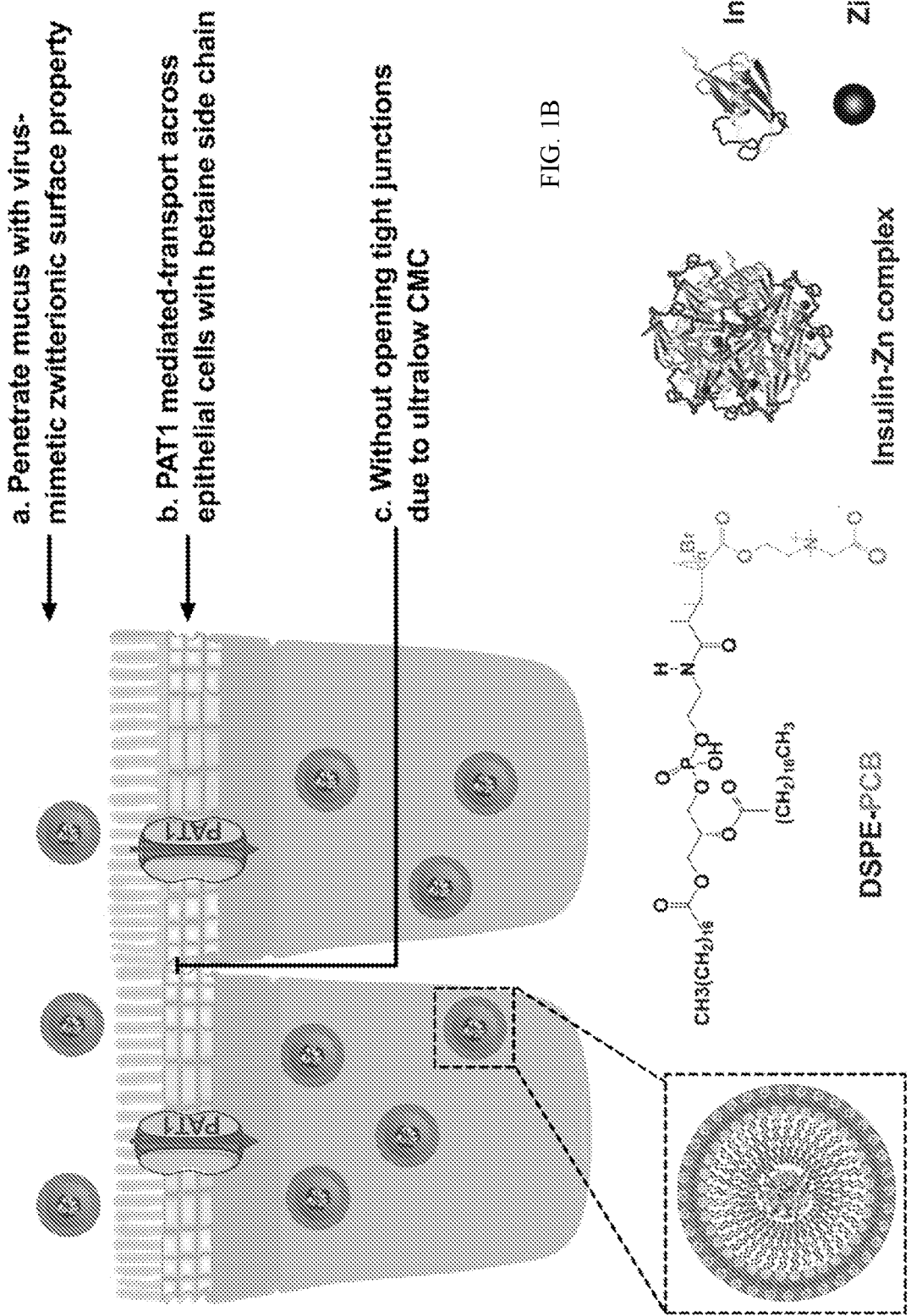
FIG. 1B is a schematic diagram showing a composition according to aspects of the present disclosure addresses both the mucus (a) and the epithelial cell layer (b) barriers without opening tight junctions (c), contributing to an overall enhanced intestinal absorption.

FIG. 1B. DSPE-PCB micelle platform addresses both the mucus (a) and the epithelial cell layer (b) barriers without opening tight junctions (c), contributing to an overall enhanced intestinal absorption.

FIGS. 2A, 2B, 2C, 2D, 2E, 2F show that nanoparticles with virus-mimetic zwitterionic surface show the highest diffusive property in mucus compared with others including the PEG-based particles. FIG. 2A: Monomer and crosslinker structures for different nanogel particles. The nanogel particles were made from monomers for zwitterionic PCB (poly(3-[[2-(methacryloyloxy)ethyl]dimethylammonio]propionate)), neutral nonionic PEG (polyethylene glycol), anionic PSPMA (poly 3-sulforpropyl methacrylate potassium salt), or cationic PMTTA (poly((2-(methacryloyloxy)ethyl) trimethylammonium chloride)), and crosslinked by a fluorescent dye (fluorescein O,O'-dimethacrylate). FIG. 2B: Hydrodynamic size and zeta-potential for particle samples measured by DLS (N=3 independent samples, mean±SD). FIG. 2C: Transport of nanogels in reconstituted porcine stomach mucus. The graph shows the MSD as a function of time for different types of particles. Data represent three independent experiments with 50 particles tracked for each experiment (N=3 independent samples, means connected).

FIG. 2D: Structures for DSPE-PCB and Polysorbate 80 micelles. FIG. 2E: Hydrodynamic size and zeta-potential for micelle samples with fluorescent payload encapsulated measured by DLS (N=3 independent samples, mean±SD). FIG. 2F: Transport of micelle samples in reconstituted porcine stomach mucus. The graph shows the MSD as a function of time for different types of particles. Data represent three independent experiments with 50 particles tracked for each experiment (N=3 independent samples, means connected).

FIGS. 3A, 3B, 3C, 3D show zwitterionic micelle/insulin formulation: characterization, high intestinal absorption efficacy, and transporter mediated absorptive mechanism. FIG. 3A: Representative TEM image of DSPE-PCB/insulin formulation. This experiment was repeated independently three times with similar results. FIG. 3B: Hydrodynamic size of different micelle, and micelle/insulin formulations (N=3 independent experiments, mean±SD) measured by DLS. FIG. 3C: Blood glucose lowering (pharmacological) performance for DSPE-PCB/insulin formulation on diabetic mice through ileum injection, compared with polysorbate 80/insulin formulation and non-formulated native insulin at the same dose of 20 IU/Kg (N=3 biologically independent animals, means connected). Insulin/ZnCl2 feeding ratio is 2.5/1 by weight. S.c. injected native insulin at 5 IU/Kg was used as a control (1 IU/ml). FIG. 3D: Representative TEM image of epithelial tissues collected 1 hour after the ileum injection of DSPE-PCB/gold nanoparticles. Scale bar shown is 0.2 µm. This experiment was repeated independently three times with similar results.

FIGS. 4A and 4B demonstrate in vitro cellular uptake of zwitterionic micelle particles showed a transporter-mediated mechanism. Confocal laser scanning microscopy images were obtained in three independent experiments showing similar results. 3D visualization of the Caco-2 cells incubated with DSPE-PCB/fluorescently labeled polystyrene nanoparticles was performed and repeated independently three times with similar results.

FIG. 4A is a graph showing quantitated results of confocal data of zwitterionic DSPE-PCB and polysorbate 80 fluorescently labeled polystyrene nanoparticles incubated with 3T3 cells, Caco-2 cells, or Caco-2 cells treated with betaine or L-tryptophan (PAT1 substrates) (N=3 biologically independent samples, mean±SD). A one-way analysis of variance with Tukey multi-comparison was used for statistical analysis.

FIG. 4B is a graph showing quantitated results of flow cytometry data of zwitterionic DSPE-PCB and polysorbate 80 fluorescently labeled polystyrene nanoparticles incubated with 3T3 cells, Caco-2 cells, or Caco-2 cells treated with betaine or L-tryptophan (PAT1 substrates) (N=3 biologically independent samples, mean±SD). A one-way analysis of variance with Tukey multi-comparison was used for statistical analysis.

FIGS. 5A, 5B, 5C show zwitterionic micelle/insulin treatment did not open intestinal tight junctions. FIGS. 5A, 5B: Intestinal permeability tests on diabetic mice and healthy mice, respectively. One hour after co-administering lactulose, mannitol, and different types of surfactants through ileum injection, urine was collected to measure the ratio of lactulose and mannitol contents (N=4 biologically independent animals, mean±SD). A one-way analysis of variance with Tukey multi-comparison was used for statistical analysis (NS: not significant). FIG. 5C: Representative TEM images of epithelial tissues at 1 hour post-ileum injection of different types of surfactants. Tight junctions were indicated by arrows. Scale bar shown is 0.2 µm.

FIGS. 6A, 6B, 6C show zwitterionic micelle/insulin aqueous formulation loses pharmacological activity through direct oral administration but shows stability to form dry powders for potentially oral capsule formulation. Blood glucose lowering (pharmacological) performance for DSPE-PCB/insulin (FIG. 6A) and polysorbate 80/insulin (FIG. 6B) aqueous formulation on diabetic mice through oral gavage at 20 and 30 IU/Kg compared with ileum injection at 20 IU/kg (N=3 biologically independent animals, means connected). Insulin/ZnCl2 feeding ratio is 2.5/1 by weight. Subcutaneously injected native insulin at 5 IU/Kg was used as a control (1 IU/ml). FIG. 6C: Blood glucose lowering (pharmacological) performance for DSPE-PCB/insulin and polysorbate 80/insulin aqueous formulation on diabetic mice through ileum injection at 20 IU/Kg before and after a lyophilization procedure (N=3 biologically independent animals, means connected).

FIG. 7A, 7B, 7C, 7D, 7E show pharmacological activity and bioavailability of an oral insulin capsule containing zwitterionic micelle/insulin, and the capability in adjusting the drug acting profile. FIG. 7A: Blood glucose lowering (pharmacological) performance for DSPE-PCB/insulin capsule on diabetic rats through oral gavage, compared with polysorbate 80/insulin capsule at the same dose of 20 IU/Kg (N=6 biologically independent animals, means connected). Insulin/ZnCl2 feeding ratio is 2.5/1 by weight. S.c. injected native insulin at 5 IU/Kg was used as a control (10 IU/ml). FIG. 7B: Serum insulin concentration (bioavailability) for DSPE-PCB/insulin capsule on diabetic rats through oral gavage, compared with polysorbate 80/insulin capsule and native insulin capsule at the same dose of 20 IU/Kg (N=6 biologically independent animals, means connected). S.c. injected native insulin at 5 IU/Kg was used as a control. FIG. 7C: Blood glucose lowering (pharmacological) performance for various formulations of DSPE-PCB/insulin capsules on diabetic rats through oral gavage (N=6 biologically independent animals, means connected). Formulation 1, 2, and 3 had an insulin/ZnCl2 feeding ratio of 50/1, 20/1, and 2.5/1 by weight during the encapsulation process, respectively. Their drug loading is 6.24%, 6.23% and 6.10%, while the corresponding particle hydrodynamic sizes are 28.52, 26.36 and 25.96 nm respectively. FIG. 7D: Food effect on the glucose-lowering efficacy of DSPE-PCB/insulin capsule. Diabetic rats received oral gavage of 80 mg/kg betaine water (model food) 30 minutes before or after the oral gavage of DSPE-PCB/insulin capsule, followed by blood glucose measurement at predetermined intervals (N=3 biologically independent animals, means connected). FIG. 7E: Absorption sites and kinetics of orally delivered insulin. Healthy rats were administered with DSPE-PCB/Cy7-insulin enteric capsules (Formulation 1-3) or Polysorbate 80/Cy7-insulin enteric capsule (20 IU/kg) by oral gavage after fasting for 12 h. At different post-administration time points, the entire intestine was collected and visualized with the Bruker In-Vivo Xtreme imaging system. a.u., arbitrary units. Experiments were repeated independently twice with similar results.

FIGS. 8A, 8B, 8C, 8D, 8E, 8F, 8G, 8H, 8I, 8J, 8K, 8L show DSPE-PCB micelles show no significant cytotoxicity or leaky gut-related endotoxin leakage and inflammation of repeated consecutive dosing. FIG. 8A: Caco-2 cells were incubated with DSPE-PCB and Polysorbate 80 micelles with concentration range of 0.01-1 mg/mL for 24 h. Cell viability was measured in an MTT assay (Mean±SD, N=6 biologically independent samples). FIG. 8B: The treated Caco-2 cells were further visualized using live/dead staining (Calcein AM and EthD-1, respectively). Scale bar: 400 µm. Experiments were repeated three times independently with similar results. FIG. 8C: Cell membrane integrity test by measuring lactate dehydrogenase (LDH) leakage. Caco-2 cells were co-cultured with DSEP-PCB, Polysorbate 80 for 24 hours, and the LDH levels were measured using LDH assay kit (Sigma) and plotted as % of untreated cell negative control (N=6 biologically independent samples, mean±SD). As a positive control, 1% Triton X-100 and sonication were used to completely lyse the caco-2 cells and its LDH leakage level was found to be 240%. FIG. 8D: Healthy mice were administered with DSPE-PCB micelle or saline through oral gavage twice daily for 14 consecutive days, followed by the intestinal permeability test. One hour after co-administering lactulose, mannitol, and DSPE-PCB micelles through ileum injection, urine was collected to measure the ratio of lactulose and mannitol contents (N=4 biologically independent samples, mean±SD). A two-tailed t-test analysis was used for statistical analysis (NS: not significant). FIG. 8E: Small intestine tissue sections were stained with Hematoxylin and Eosin (Scale bar: 200 µm). Sections at higher magnification (Scale bar: 50 µm). Experiments were repeated four times independently with similar results. (FIGS. 8F-8L). Healthy mice were administered with DSPE-PCB micelle, saline, Polysorbate 80, or sodium decanoate through oral gavage twice daily for 14 consecutive days. On day 0 and 14, before and 1 h after the oral administration, blood serum was collected and the endotoxin and pro-inflammatory cytokines were measured with the mouse magnetic Luminex® assays (N=4 biologically independent samples, mean±SD). A one-way analysis of variance with Tukey multi-comparison was used for statistical analysis; compare with saline within the same group.

FIG. 9 DSPE-PCB/insulin formulations with increasing zinc content showed increased retention of insulin release. DSPE-PCB/insulin formulations were dialyzed (10 kDa MWCO) against pH 1.2 and 6.8 buffer with 5 mM bile salt at 37° C. Formulation 1, 2, and 3 had an insulin/$ZnCl_2$ feeding ratio of 50/1, 20/1, and 2.5/1 by weight during the encapsulation process, respectively. Their drug loading is 6.24%, 6.23% and 6.10%, while the corresponding particle sizes are 28.52, 26.36 and 25.96 nm respectively. The cumulative released insulin was measured using the BCA assay (N=3 independent experiments, means connected).

FIG. 10 Representative images of the tight junction protein ZO-1 of monolayer of Caco-2 cells after treated with different micelles. The tight junction protein ZO-1 was stained with ZO-1 Monoclonal Antibody Alexa Fluor 488 while the nucleus was stained with Hochest 33342. Scale bar=20 µm. Experiments were repeated three times independently with similar results.

FIG. 11 DSPE-PCB micelles did not increase intestinal monolayer permeability in vitro. Sodium decanoate caused greater reductions in the TEER of Caco-2 monolayers than polysorbate 80. (N=3 biologically independent samples, means connected). Caco-2 cells were cultured for 96 hours to form monolayers and then treated with different micelles for 4 hours. The electrical resistance was measured at different time points.

FIG. 12 Blood glucose profiles for various formulations of DSPE-PCB/insulin capsules on diabetic rats through oral gavage (N=6 biologically independent animals, means connected). Formulation 0, 1, 2 and 3 had an insulin/$ZnCl_2$ feeding ratio of 75/1, 50/1, 20/1, and 2.5/1 by weight during the encapsulation process, respectively. Their drug loading is 6.25%, 6.24%, 6.23% and 6.10%, while the corresponding particle hydrodynamic sizes are 28.56, 28.52, 26.36 and 25.96 nm respectively.

Example 2

Exenatide (Exendin-4) with Protamine Additives Encapsulated by DSPE-PCB Micelles.

In a typical preparation, 15 mg DSPE-PCB was added into 1 mL exenatide solution (1 mg/mL, dissolved in deionized (DI) water) under stirring at 800 r/min. Then protamine solution in DI water was added dropwise to exenatide-containing solution and the resulting mixture was purified by an ultrafiltration membrane (10 K Da cutoff). The ratio of exenatide:protamine could be adjusted at 1:1, 1:3, 1:5, 1:7, 1:10, and 1:20 by changing the volume and/or concentration of protamine added.

The series of DSPE-PCB/exenatide formulations were administered through ileum injection to STZ induced diabetic mice and compared with free exenatide control that was administered through s.c. injection (FIG. 13). Significant blood glucose lowering effect was observed with the administered DSPE-PCB/exenatide formulation. Pharmacological activity for 1:1, 1:3, 1:5, 1:7, 1:10, and 1:20 (exenatide:protamine weight ratio) DSPE-PCB/exenatide formulations was calculated to be 64%, 110%, 112%, 72%, 52% and 33% respectively.

The DSPE-PCB/exenatide formulation can be freeze-dried and further placed into a capsule such as a porcine gelatin capsule (size M, Torpac Inc., USA), followed by forming an enteric coating such as by immersing the capsule in the Eudragit L 100-55 methanol solution (15% w/w) and drying at room temperature for three times. The amount of DSPE-PCB/exenatide loaded per capsule can be varied with targeted animal weight (each animal received one capsule containing 100 mmol/kg exenatide). Enhanced oral absorption is expected since DSPE-PCB/exenatide formulation showed enhanced intestinal absorption as demonstrated in the ileum injection study (FIG. 13).

FIG. 13. Blood glucose lowering (pharmacological) performance for a series of DSPE-PCB/exenatide formulations on STZ induced diabetic mice through ileum injection at the same dose of 100 mmol/Kg (N=3; mean±SD). 1:1, 1:3, 1:5, 1:7, 1:10, and 1:20 represent the weight ratio of exenatide: protamine during the formulation. S.c. injected native exenatide at 25 mmol/Kg was used as a control.

Example 3

Insulin with $Zn^{2+}$ additives encapsulated by copolymers CBMA-ODA, CBOH-ODA, SBMA-ODA, CAR-ODA, MPC-ODA Synthesis of CBOH Monomer (N-(carboxymethyl)-2-hydroxy-N,N-dimethyl-3-[(2-methyl-1-oxo-2-propen-1-yl)oxy]-1-propanaminium)

1.49 g Glycidyl methacrylate and 1.03 g N, N-Dimethylglycine was reacted in 40 ml ethanol at room temperature for 3 days. The obtained reaction solution was added to the anhydrous acetone to remove the unreacted reactant. After that, the obtained product was further precipitated in ethyl ether, then dried under vacuum and stored under −20° C.

Example 4

Synthesis of CBOH-ODA Micelles

Polymerization of CBOH-ODA random copolymer was carried out in anhydrous methanol using 2,2'-Azobis(2-methylpropionitrile) (AIBN) as initiator as shown in FIG.

15. Methanol was purged to remove oxygen by bubbling with nitrogen. Then 441 mg CBOH monomer, 32.5 mg Octadecyl acrylate (ODA) and 8.4 mg AIBN were added to a round bottom flask with 15 ml methanol which was further deoxygenated by cycling between nitrogen fill and vacuum three times. The reaction ran overnight at 75° C. After the polymerization, the reaction mixture was fully precipitated in ethyl ether. The precipitate was then dried under vacuum, dissolved in 3 mL methanol and precipitated in ethyl ether 3 times. The obtained product was dried overnight under vacuum and dissolved in water, centrifuged with Amicon® Ultra-15 10K Centrifugal Filter Units (portion retained collected) and freeze-dried.

Example 5

Synthesis of CBMA-ODA Micelles

Polymerization of CBMA-ODA random copolymer was carried out in anhydrous methanol using AIBN as initiator as shown in FIG. 16. Methanol was purged to remove oxygen by bubbling with nitrogen. Then 441 mg 3-[[2-(Methacryloyloxy)ethyl]dimethylammonio]propionate (CBMA) monomer, 32.5 mg ODA and 8.4 mg AIBN were added to a round bottom flask with 15 ml methanol which was deoxygenated by cycling between nitrogen filling and vacuum for three times. The reaction ran overnight at 75° C. After the polymerization, the obtained product was fully precipitated in ethyl ether and then dried under vacuum. The precipitate was then dried under vacuum, dissolved in 3 mL methanol and precipitated in ethyl ether 3 times. The obtained product was dried overnight under vacuum and dissolved in water, centrifuged with Amicon® Ultra-15 10K Centrifugal Filter Units (portion retained collected) and freeze-dried.

Example 6

Synthesis of SBMA-ODA Micelles

[2-(Methacryloyloxy)ethyl]dimethyl-(3-sulfopropyl)ammonium hydroxide (SBMA) monomer was purchased from Sigma. Polymerization of SBMA-ODA random copolymer was carried out in anhydrous methanol using AIBN as an initiator as shown in FIG. 17. Methanol was purged to remove oxygen by bubbling with nitrogen. Then 441 mg SBMA monomer, 32.5 mg ODA and 8.4 mg AIBN were added to a round bottom flask which was deoxygenated by cycling between nitrogen filling and vacuum for three times. The reaction ran overnight at 75° C. After the polymerization, the bottom gel was washed with ethyl ether three times and then dried under vacuum. The obtained product was dissolved in water, centrifuged with Amicon® Ultra-15 10K Centrifugal Filter Units (portion retained collected) and freeze-dried.

Example 7

Synthesis of Carnitine-ODA Micelles

Polymerization of carnitine-ODA random copolymer was carried out in anhydrous methanol using AIBN as an initiator as shown in FIG. 18. Methanol was purged to remove oxygen by bubbling with nitrogen. Then 441 mg L-Carnitine (CAR) monomer ((2R)-3-carboxy-N,N,N-trimethyl-2-[(1-oxo-2-propen-1-yl)oxy]-1-propanaminium; prepared according to J. Mater. Chem. B, 2017, 5, 8676), 32.5 mg ODA and 8.4 mg AIBN were added to a round bottom flask which was deoxygenated by cycling between nitrogen filling and vacuum for three times. The reaction ran overnight at 75° C. After the polymerization, the bottom gel was washed with ethyl ether for three times and then dried under vacuum. The obtained product was dissolved in water, centrifuged with Amicon® Ultra-15 10K Centrifugal Filter Units (portion retained collected) and freeze-dried.

Example 8

Synthesis of MPC-ODA Micelles

Polymerization of MPC-ODA random copolymer was carried out in anhydrous methanol using AIBN as an initiator as shown in FIG. 19. Methanol was purged to remove oxygen by bubbling with nitrogen. Then 441 mg 2-Methacryloyloxyethyl phosphorylcholine (MPC) monomer, 32.5 mg ODA and 8.4 mg AIBN were added to a round bottom flask which was deoxygenated by cycling between nitrogen filling and vacuum for three times. The reaction ran overnight at 75° C. After the polymerization, the bottom gel was washed with ethyl ether three times and then dried under vacuum. Then the polymer was dissolved in water and centrifuged with Amicon® Ultra-15 Centrifugal Filter Units 10K (portion retained collected) and freeze-dried.

Example 9

Encapsulated insulin formulations with CBMA-ODA, CBOH-ODA, SBMA-ODA, CAR-ODA, or MPC-ODA micelles, respectively:

In a typical preparation, 15 mg CBMA-ODA, CBOH-ODA, SBMA-ODA, CAR-ODA, or MPC-ODA was added into 1 mL insulin solution (1 mg/mL, dissolved in 0.1 M sodium bicarbonate) under stirring at 800 r/min. Then 200 µl of ZnCl2 solution (2 mg/mL) were added dropwise to insulin-containing solution and the resulting mixture was purified by an ultrafiltration membrane (10 K Da cutoff). The ratio of insulin:$Zn^{2+}$ could be adjusted by changing the volume and/or concentration of ZnCl2 added.

The obtained formulation CBMA-ODA 5K 5%/insulin, CBOH-ODA 5K 5%/insulin, CBOH-ODA 5K 10%/insulin, and MPC-ODA 5K 20%/insulin (5K indicates the molecular weight of the copolymer; 5%, 10% and 20% indicate the feeding molar percentage of ODA in the original monomer mixture for copolymerization) were administered through ileum injection to STZ induced diabetic mice and compared with native insulin control that was administered through s.c. injection (FIG. 14). Significant blood glucose lowering effect was observed with the administered copolymer/insulin formulations. Pharmacological activity for CBMA-ODA 5K 5%/insulin, CBOH-ODA 5K 5%/insulin, CBOH-ODA 5K 10%/insulin, and MPC-ODA 5K 20%/insulin was calculated to be 34.18%, 28.49%, 31.39%, and 26.53% respectively.

The copolymer/insulin formulation can be freeze-dried and further placed into a capsule such as a porcine gelatin capsule (size M, Torpac Inc., USA), followed by forming an enteric coating such as by immersing the capsule in the Eudragit L 100-55 methanol solution (15% w/w) and drying at room temperature for three times. The amount of copolymer/insulin loaded per capsule can be varied with targeted animal weight (each animal received one capsule containing 20 IU/kg insulin). Enhanced oral absorption is expected since copolymer/insulin formulation showed enhanced intestinal absorption as demonstrated in the ileum injection study (FIG. 14).

FIG. 14. Blood glucose lowering (pharmacological) performance for CBMA-ODA/insulin (CBMA 5%), CBOH-ODA/insulin (CBOH 5% and 10%), MPC-ODA/insulin (MPC 20%) formulations on diabetic mice through ileum injection at the same dose of 20 IU/Kg (N=3 biologically independent animals, mean±SD). Insulin/ZnCl2 feeding ratio is 20/1 by weight. S.c. injected native insulin at 5 IU/Kg was used as a control (1 IU/ml).

Example 10

Synthesis of TMAOAA-ODA and TMAOMA-ODA Micelles

TMAOAA (dimethylaminopropylacrylamide N-oxide) monomer can be synthesized through oxidation of dimethylaminopropylacrylamide following an established procedure (US2020/0123294 A1). In a similar way, TMAOMA (2-(Dimethylamino)ethyl methacrylate N-oxide) monomer can be synthesized through oxidation of 2-(Dimethylamino) ethyl methacrylate.

Polymerization of TMAOAA-ODA or TMAOMA-ODA random copolymer will be carried out in anhydrous methanol using AIBN as an initiator. Methanol will be purged to remove oxygen by bubbling with nitrogen. Then 441 mg TMAOAA or TMAOMA monomer, 32.5 mg ODA and 8.4 mg AIBN will be added to a round bottom flask which will be deoxygenated by cycling between nitrogen filling and vacuum for three times. The reaction will run overnight at 75° C. After the polymerization, the bottom gel will be washed with ethyl ether three times and then dried under vacuum. Then the polymer will be dissolved in water and centrifuged with Amicon® Ultra-15 Centrifugal Filter Units 10K (portion retained collected) and freeze-dried.

In a typical preparation to associate insulin with particles according to aspects of the present disclosure, 15 mg micelle-forming TMAOAA-ODA or TMAOMA-ODA can be added into 1 mL insulin solution (1 mg/mL, dissolved in 0.1 M sodium bicarbonate) under stirring at 800 r/min. Then 200 µl of $ZnCl_2$ solution (2 mg/mL) can be added dropwise to insulin-containing solution and the resulting mixture can be purified by an ultrafiltration membrane (10 K Da cutoff). The ratio of insulin:$Zn^{2+}$ could be adjusted by changing the volume and/or concentration of ZnCl2 added.

In a typical preparation to encapsulate exenatide, 15 mg micelle-forming TMAOAA-ODA or TMAOMA-ODA can be added into 1 mL exenatide solution (1 mg/mL, dissolved in deionized (DI) water) under stirring at 800 r/min. Then protamine solution in DI water can be added dropwise to exenatide-containing solution and the resulting mixture can be purified by an ultrafiltration membrane (10 K Da cutoff). The ratio of exenatide:protamine could be adjusted at 1:1, 1:3, 1:5, 1:7, 1:10, and 1:20 by changing the volume and/or concentration of protamine added.

Example 11

PLGA-PCB Block Copolymer for Insulin Encapsulation

PLGA-PCB block copolymer containing PLGA block and poly(N-methacryloyloxyethyl-N,N-dimethylammonium-α-N-methylcarboxybetaine) block can be synthesized according to U.S. Pat. No. 8,617,592B2. The molecular weight for PCB and PLGA can be varied to obtain a series of PLGA-PCB block copolymers.

In a typical preparation to encapsulate insulin, 15 mg micelle-forming PLGA-PCB block copolymer can be added into 1 mL insulin solution (1 mg/mL, dissolved in 0.1 M sodium bicarbonate) under stirring at 800 r/min. Then 200 µl of $ZnCl_2$ solution (2 mg/mL) can be added dropwise to insulin-containing solution and the resulting mixture can be purified by an ultrafiltration membrane (10 K Da cutoff). The ratio of insulin:$Zn^{2+}$ could be adjusted by changing the volume and/or concentration of ZnCl2 added.

In a typical preparation to encapsulate exenatide, 15 mg micelle-forming PLGA-PCB can be added into 1 mL exenatide solution (1 mg/mL, dissolved in deionized (DI) water) under stirring at 800 r/min. Then protamine solution in DI water can be added dropwise to exenatide-containing solution and the resulting mixture can be purified by an ultrafiltration membrane (10 KDa cutoff). The ratio of exenatide:protamine could be adjusted at 1:1, 1:3, 1:5, 1:7, 1:10, and 1:20 by changing the volume and/or concentration of protamine added.

Example 12

Synthesis of CBMA-ODA, CBOH-ODA, SBMA-ODA, CAR-ODA, or MPC-ODA Nanohydrogels

CBMA-ODA, CBOH-ODA, SBMA-ODA, CAR-ODA, or MPC-ODA nanohydrogels can be respectively produced using an inverse microemulsion polymerization method. 0.7 g Tween 80, 0.8 g Span 80 and 4 mg V-70 can be dissolved in 20 mL of hexane and kept in an ice bath. 110 mg CBMA, CBOH, SBMA, CAR or MPC, together with 8 mg ODA and 1 mg N,N'-bis(acryloyl)cystamine crosslinker will be dissolved in 0.5 mL of DI water. The two stock solutions can be mixed with vigorous stirring, then strong sonication will be applied to form the microemulsion. The mixture will be purged with nitrogen at 4° C. for 30 min to remove dissolved oxygen. During polymerization, the reaction will be kept at 40° C. for 4 h with stirring and nitrogen protection. The obtained product can be washed with tetrahydrofuran to remove the surfactants, then dispersed in water followed by further purification through ultrafiltration or size-exclusion column (de-salting column). For storage purpose, the solution product can be freeze-dried.

Polymerization and crosslinking of CBMA-ODA, CBOH-ODA, SBMA-ODA, CAR-ODA, or MPC-ODA nanohydrogels can also be carried out in anhydrous methanol using AIBN as an initiator. Methanol will be purged to remove oxygen by bubbling with nitrogen. Then 441 mg CBMA, CBOH, SBMA, CAR or MPC monomer, together with 32.5 mg ODA, 4 mg N,N'-bis(acryloyl)cystamine crosslinker and 8.4 mg AIBN will be added to a round bottom flask which can be deoxygenated by cycling between nitrogen filling and vacuum for three times. The reaction can run overnight at 75° C. After the polymerization and crosslinking, the bottom gel will be washed with ethyl ether three times and then dried under vacuum. Then the polymer will be dissolved in water and repeatedly centrifuged with Amicon® Ultra-15 Centrifugal Filter Units 10K (portion retained collected) and freeze-dried.

Alternatively, the obtained nanohydrogel can be purified by centrifugation to remove large gel particles, and dialyzing against water or aqueous buffer to remove unreacted reagents and surfactants, if any.

Example 13

Encapsulated Insulin Formulations with CBMA-ODA, CBOH-ODA, SBMA-ODA, CAR-ODA, or MPC-ODA Nanohydrogels In a typical preparation, 15 mg CBMA-ODA, CBOH-ODA, SBMA-ODA, CAR-ODA, or MPC-ODA nanohydrogels can be added into 1 mL insulin solution (1 mg/mL, dissolved in 0.1 M sodium bicarbonate) under stirring at 800 r/min. Then 200 μl of ZnCl$_2$ solution (2 mg/mL) can be added dropwise to insulin-containing solution and the resulting mixture can be purified by an ultrafiltration membrane (10 K Da cutoff). The ratio of insulin:Zn$^{2+}$ could be adjusted by changing the volume and/or concentration of ZnCl$_2$ added.

Example 14

PLGA Additives to Further Improve the Retention of Exenatide or Insulin in DSPE-PCB Micelles In a typical preparation, 15 mg DSPE-PCB was added into 1 mL exenatide solution (1 mg/mL, dissolved in deionized (DI) water) under stirring at 800 r/min. Then protamine solution in DI water was added dropwise to exenatide-containing solution. The ratio of exenatide:protamine could be adjusted at 1:1, 1:3, 1:5, 1:7, 1:10, and 1:20 by changing the volume and/or concentration of protamine added. The resulting mixture can be subjected to further drop-wise addition of PLGA and/or PLA solution (e.g., 0.1, 0.5, 1, or 5 mg/ml in water mixable organic solvent, such as TIF) of various volume (e.g., ¼ of the aqueous volume for the mixture containing exenatide, DSPE-PCB and protamine) under stirring (e.g., 1000 rpm). This could result in different amount of PLGA or PLA being deposited or precipitated into the core of the DSPE-PCB micelles, further strengthening the association of the exenatide payload with the particle. After 2 h, the solvent can be exchanged to saline and resulting particles can be concentrated to a desired concentration by an Amicon Ultra-4 centrifugal filter (Millipore, Billerica, MA, US) with 100,000 Da MW cutoff.

In a typical preparation of DSPE-PCB/insulin formulation, 15 mg DSPE-PCB was added into 1 mL insulin solution (1 mg/mL, dissolved in 0.1 M sodium bicarbonate) under stirring at 800 r/min. Then 200 μl of ZnCl$_2$ solution (2 mg/mL) were added dropwise to insulin-containing solution. The resulting mixture can be subjected to further drop-wise addition of PLGA and/or PLA solution (e.g., 0.1, 0.5, 1, or 5 mg/ml in water mixable organic solvent, such as TIF) of various volume (e.g., ¼ of the aqueous volume for the mixture containing insulin, DSPE-PCB and ZnCl2) under stirring (e.g., 1000 rpm). This could result in different amount of PLGA or PLA being deposited or precipitated into the core of the DSPE-PCB micelles, further strengthening the association of the insulin payload with the particle. After 2 h, the solvent can be exchanged to saline and resulting particles can be concentrated to a desired concentration by an Amicon Ultra-4 centrifugal filter (Millipore, Billerica, MA, US) with 100,000 Da MW cutoff.

The obtained exenatide or insulin containing particles in general show a slower payload release profile compared with respective particles without PLGA and/or PLA additives. Therefore they show an even longer action time for antidiabetic actions.

Items

Item 1. A composition for oral and/or mucosal administration of a biologically active agent, comprising: a plurality of particles, wherein each particle has an exterior surface, the exterior surface defining a particle interior, the exterior surface having at least one type of zwitterionic polymer disposed thereon and/or extending therefrom; and a biologically active agent disposed on the exterior surface and/or in the particle interior, wherein the biologically active agent is a protein, peptide, or dietary supplement.

Item 2. The composition of item 1, wherein the zwitterionic polymer is present in a copolymer with a lipid-derived polymer.

Item 3. The composition of item 1 or 2, wherein the zwitterionic polymer comprises a plurality of repeating zwitterionic units, where the structural formula of each repeating unit is (III):

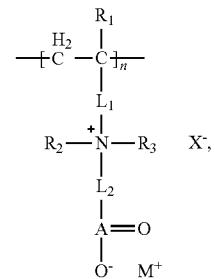

where $R_1$, $R_2$, and $R_3$ are each independently selected from hydrogen, alkyl, and aryl groups; $L_1$ is a linker that covalently couples a cationic center to a polymer backbone; $L_2$ is a linker that covalently couples the cationic center to an anionic group; A(=O)O$^-$ is the anionic group; A is C, S, SO, P, or PO; X$^-$ is a counter ion associated with the cationic center; M$^+$ is a counter ion associated with the (A=O)O$^-$ anionic center; and n is an integer in the range of 2 to about 100,000.

Item 4. The composition of item 1, 2, or 3, wherein the zwitterionic polymer has a plurality of repeating units, where the structural formula of each repeating unit is (III)

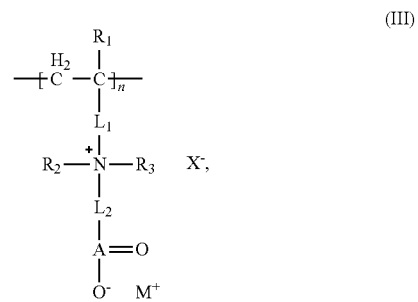

(III)

where $R_1$ is selected from the group consisting of hydrogen, fluorine, trifluoromethyl, $C_1$-$C_6$ alkyl, and $C_6$-$C_{12}$ aryl groups; $R_2$ and $R_3$ are independently selected from the group consisting of alkyl and aryl, or taken together with a nitrogen to which they are attached form a cationic center; $L_1$ is a linker that covalently couples the cationic center [N$^+$($R_2$) ($R_3$)] to a monomer double bond or its polymer backbone [—(CH$_2$—CR$_1$)$_n$—]; $L_2$ is a linker that covalently couples an anionic center [A(=O$^-$)—O-] to the cationic center; A is C, S, SO, P, or PO; M$^-$ is a metal ion, an ammonium ion, or an organic ion; X$^-$ is a counter ion associated with the cationic center; and n is an integer in the range of 2 to about 100,000.

Item 5. The composition of any of items 1 to 4, wherein the zwitterionic polymer has a plurality of repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, a phosphobetaine vinyl compound; and a mixture of any two or more thereof.

Item 6. The composition of any of items 1 to 5, wherein the zwitterionic polymer is selected from the group consisting of: a sulfobetaine acrylate polymer, a sulfobetaine methacrylate polymer, a sulfobetaine acrylamide polymer, a sulfobetaine methacrylamide polymer, a sulfobetaine vinyl polymer, a carboxybetaine acrylate polymer, a carboxybetaine methacrylate polymer, a carboxybetaine acrylamide polymer, a carboxybetaine methacrylamide polymer, a carboxybetaine vinyl polymer, a phosphobetaine acrylate polymer, a phosphobetaine methacrylate polymer, a phosphobetaine acrylamide polymer, a phosphobetaine methacrylamide polymer, a phosphobetaine vinyl polymer; a polymer comprising of two or more zwitterionic repeating units selected from the group consisting of: a sulfobetaine acrylate, a sulfobetaine methacrylate, a sulfobetaine acrylamide, a sulfobetaine methacrylamide, a sulfobetaine vinyl compound, a carboxybetaine acrylate, a carboxybetaine methacrylate, a carboxybetaine acrylamide, a carboxybetaine methacrylamide, a carboxybetaine vinyl compound, a phosphobetaine acrylate, a phosphobetaine methacrylate, a phosphobetaine acrylamide, a phosphobetaine methacrylamide, a phosphobetaine vinyl compound; and a mixture of any two or more zwitterionic polymers thereof.

Item 7. The composition of item 1 or 2, wherein the zwitterionic polymer has a plurality of repeating units, where the structural formula of each repeating unit has structural formula (IV):

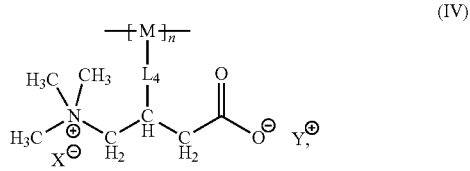

(IV)

where M is a monomeric repeating unit, $L_4$ is a linker, n is an integer from 1 to about 10000, $X^-$ is a counter ion associated with the cationic center, and $Y^+$ is a counter ion associated with the anionic center. According to aspects of the present invention, M is a repeating unit of a polymer selected from the group consisting of: polyester, polyamide, poly(amino acid), polyimide, polycarbonate, polysiloxane, polyurethane, polyphosphazene, acrylic polymer, amino resin, epoxy resin, phenolic resin, and alkyd resin.

Item 8. The composition of item 1 or 2, wherein the zwitterionic polymer has a plurality of repeating units, where the structural formula of each repeating unit has structural formula (VI):

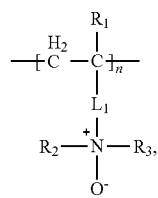

where $R_1$, $R_2$, and $R_3$ are each independently selected from hydrogen, alkyl, and aryl groups; $L_1$ is a linker that covalently couples a cationic center to a polymer backbone; and n is an integer in the range of 2 to about 100,000.

Item 9. The composition of any of items 1 to 8, wherein the copolymer comprises a plurality of repeating hydrophobic units, where the structural formula of each repeating hydrophobic unit is: [polymerizable moiety]-lipid.

Item 10. The composition of any of items 1 to 9, wherein the copolymer comprises a plurality of repeating hydrophobic units, where the structural formula of each repeating hydrophobic unit is: $(R_4)(C=)C-C(=O)O$-Lipid1, $(R_4)(C=)C-C(=O)O-R_5-O-(C=O)$-Lipid2, $(R_4)(C=)C-C(=O)O-R_5-PO_4$-Lipid2 or $(R_4)(C=)C-C(=O)-NH$-Lipid3, where $R_4$ is hydrogen or a $C_1$-$C_4$ alkyl group, $R_5$ is a C1-C6 alkyl group, where $(R_4)(C=)C-C(=O)O$-Lipid1 is a reaction product of OH-Lipid1 and $(R_4)(C=)C-C(=O)O-H$, where OH-Lipid1 represents an OH group-containing lipid, wherein $(R_4)(C=)C-C(=O)O-R_5-O-(C=O)$-Lipid2 and $(R_4)(C=)C-C(=O)O-R_5-PO_4$-Lipid2 are reaction products of OH—(C=O)-Lipid2 or $PO_4^{2-}$-Lipid2, respectively, with a suitable polymerizable moiety, and wherein $(R_4)(C=)C-C(=O)-NH$-Lipid3 is a reaction product of $NH_2$-Lipid3 with a suitable polymerizable moiety.

Item 11. The composition of item 9 or 10, wherein the lipid comprises a fatty acid, a fatty alcohol, or a mixture thereof.

Item 12. The composition of item 9, 10 or 11, wherein the fatty acid comprises a C4 to C28 fatty acid, a C4 to C28 fatty alcohol, or a mixture thereof.

Item 13. The composition of any of items 9 to 12, wherein the fatty acid and/or fatty alcohol comprises a C4, C5, C6, C7, C8, C9, C10, C11, C12, C13, C14, C15, C16, C17, C18, C19, C20, C21, C22, C23, C24, C25, C26, C27, or C28 fatty acid and/or fatty alcohol.

Item 14. The composition of any of items 9 to 13, wherein the fatty acid and/or fatty alcohol is selected from the group consisting of: caprylic, capric, lignoceric, cerotic, pelargonic, lauric, myristic, palmitic, stearic, isostearic, hydroxystearic, myristoleic, palmitoleic, sapienic, oleic, elaidic, vaccenic, linoleic, linoelaidic, ricinoleic, arachidic, arachidonic, eicosapentaenoic, behenic, erucic, and docosahexaenoic acids and/or alcohols.

Item 15. The composition of any of items 9 to 14, wherein the fatty acid and/or fatty alcohol is saturated, monounsaturated, or polyunsaturated.

Item 16. The composition of any of items 9 to 15, wherein the polymerizable moiety is an acrylate, a hydroxyalkyl ester, a polyvalent ester, and a vinyl ester.

Item 17. The composition of any of items 9 to 16, wherein the polymerizable moiety is a carbonate; an acrylate selected from the group consisting of: methacrylate, methyl (meth)acrylate, ethyl (meth)acrylate, butyl (meth)-acrylate, 2-ethylhexyl (meth)acrylate, phenyl (meth)acrylate and benzyl (meth)acrylate; a hydroxyalkyl ester selected from the group consisting of: 2-hydroxyethyl (meth)acrylate and 2-hydroxypropyl (meth)acrylate; a polyvalent ester selected from the group consisting of: ethylene glycol diacrylate, polyethylene glycol di(meth)acrylate, neopentyl glycol di(meth)acrylate, trimethylolpropane tri(meth)acrylate and pentaerythritol tetraacrylate; (meth)acrylonitrile, (meth)acrylamide, N-substituted (meth)acrylamide; a vinyl ester selected from the group consisting of: vinyl acrylate, vinyl acetate, vinyl propionate and vinyl succinate; a vinyl compound selected from the group consisting of: a vinyl ether, styrene, halogenated styrene, divinylbenzene, vinylnaphthalene, N-vinylpyrrolidone, diallyl phthalate, diallyl malate, triallyl isocyanate triallyl phosphate.

Item 18. The composition of any of items 9 to 17, wherein the polymerizable moiety is a methacrylate moiety.

Item 19. The composition of any of items 1 to 18, wherein the zwitterionic polymer or copolymer comprises a polymer selected from the group consisting of: poly(3-[[2-(methacryloyloxy)ethyl]dimethylammonio]propionate) (PCBMA); poly(N-(carboxymethyl)-2-hydroxy-N,N-dimethyl-3-[(2-methyl-1-oxo-2-propen-1-yl)oxy]-1-propanaminium) (PCBOH); poly[2-(methacryloyloxy)ethyl]dimethyl-(3-sulfopropyl)ammonium hydroxide (PSBMA); poly(((2R)-3-carboxy-N,N,N-trimethyl-2-[(1-oxo-2-propen-1-yl)oxy]-1-propanaminium) (PCAR); and poly(methacryloyloxyethyl phosphorylcholine) (PMPC).

Item 20. The composition of any of items 9 to 19, wherein the [polymerizable moiety]-lipid is octadecyl acrylate (ODA) and wherein the polymerized [polymerizable moiety]-lipid is poly(octadecyl acrylate) (PODA).

Item 21. The composition of any of items 2 to 21, wherein the copolymer is selected from the group consisting of: PCBMA-PODA, PCBOH-PODA, PSBMA-PODA, PCAR-PODA, PMPC-PODA, and a combination of any two or more thereof.

Item 22. The composition of any of items 1 to 21, wherein the particles are micelles.

Item 23. The composition of any of items 1 to 21, wherein the particles are liposomes.

Item 24. The composition of any of items 1 to 21, wherein the particles are hydrogel particles.

Item 25. The composition of any of items 1 to 24, wherein the biologically active agent comprises an antibody.

Item 26. The composition of any of items 1 to 25, wherein the biologically active agent comprises a nutritional supplement.

Item 27. The composition of any of items 1 to 26, wherein the biologically active agent comprises a nutritional supplement selected from the group consisting of: Coenzyme Q10, fish oil, krill oil, omega-3, 6, 9, and a fat-soluble vitamin.

Item 28. The composition of any of items 1 to 27, wherein the nutritional supplement comprises a fat-soluble vitamin selected from the group consisting of: vitamins A, D, E, and K.

Item 29. The composition of any of items 1 to 28, wherein the biologically active agent comprises an antidiabetic agent which is a protein or peptide.

Item 30. The composition of any of items 1 to 29, wherein the biologically active agent comprises an antidiabetic agent which is a protein or peptide selected from the group consisting of: insulin, human insulin, a protein or peptide human insulin analogue or derivative, a glucagon-like peptide (GLP-1), a protein or peptide GLP-1 analogue, a protein or peptide GLP-1 receptor agonist, dulaglutide, exenatide, semaglutide, liraglutide, and lixisenatide, a biologically acceptable salt or solvate of any thereof, an analogue or derivative of any thereof, and a mixture of any two or more thereof.

Item 31. The composition of any of items 1 to 30, wherein the biologically active agent comprises insulin.

Item 32. The composition of any of items 1 to 31, further comprising an additive effective to aggregate and/or condense, and/or insolubilize the biologically active agent.

Item 33. The composition of item 32, wherein the additive interacts with the biologically active agent through electrostatic interaction, is condensed and/or precipitated with the biologically active agent, and/or physically interacts with the biologically active agent.

Item 34. The composition of item 32 or 33, wherein the additive comprises protamine.

Item 35. The composition of item 32, 33 or 34, wherein the additive comprises a metal ion.

Item 36. The composition of item 34, wherein the metal ion is $Zn^{2+}$ and/or $Ca^{2+}$.

Item 37. The composition of any of items 1 to 36, wherein the plurality of particles has an average particle size in the range of 5 nanometers to 10 microns.

Item 38. The composition of any of items 1 to 37, wherein the composition is lyophilized.

Item 39. The composition of any of items 1 to 38, wherein the composition is an oral formulation comprising an enteric coating.

Item 40. The composition of any of items 1 to 39, wherein the composition is an oral formulation in the form of a tablet or capsule.

Item 41. The composition for oral and/or mucosal administration of a biologically active agent of item 1, comprising: a plurality of particles, wherein each particle has an exterior surface, the exterior surface defining a particle interior, the exterior surface having at least one type of zwitterionic polymer disposed thereon and/or extending therefrom, wherein the zwitterionic polymer is conjugated to a lipid; and a biologically active agent disposed on the exterior surface and/or in the particle interior, wherein the biologically active agent is a protein, peptide, or dietary supplement.

Item 42. The composition for oral and/or mucosal administration of a biologically active agent of item 41, wherein the zwitterionic polymer is selected from the zwitterionic polymers detailed in any of items 3 to 8 and wherein the lipid is selected from the lipids detailed in any of items 10 to 15.

Item 43. The composition for oral and/or mucosal administration of a biologically active agent of item 41 or 42, comprising: a plurality of particles, wherein each particle has an exterior surface, the exterior surface defining a particle interior, the exterior surface having at least one type of zwitterionic polymer disposed thereon and/or extending therefrom, wherein the zwitterionic polymer is poly(N-methacryloyloxyethyl-N,N-dimethylammonium-α-N-methylcarboxybetaine (PCB), and wherein the PCB is conjugated to distearoylphosphatidylethanolamine (DSPE); and a biologically active agent disposed on the exterior surface and/or in the particle interior, wherein the biologically active agent is a protein, peptide, or dietary supplement.

Item 44. The composition of any of item 41, 42, or 43, wherein the biologically active agent comprises an antibody.

Item 45. The composition of any of items 41 to 44, wherein the biologically active agent comprises a nutritional supplement.

Item 46. The composition of any of items 41 to 45, wherein the biologically active agent comprises a nutritional supplement selected from the group consisting of: Coenzyme Q10, fish oil, krill oil, omega-3, 6, 9, and a fat-soluble vitamin.

Item 47. The composition of any of items 41 to 46, wherein the nutritional supplement comprises a fat-soluble vitamin selected from the group consisting of: vitamins A, D, E, and K.

Item 48. The composition of any of items 41 to 47, wherein the biologically active agent comprises an antidiabetic agent which is a protein or peptide.

Item 49. The composition of any of items 41 to 48, wherein the biologically active agent comprises an antidiabetic agent which is a protein or peptide selected from the group consisting of: insulin, human insulin, a protein or peptide human insulin analogue or derivative, a glucagon-like peptide (GLP-1), a protein or peptide GLP-1 analogue, a protein or peptide GLP-1 receptor agonist, dulaglutide, exenatide, semaglutide, liraglutide, and lixisenatide, a biologically acceptable salt or solvate of any thereof, an analogue or derivative of any thereof, and a combination of any two or more thereof.

Item 50. The composition of any of items 41 to 49, wherein the biologically active agent comprises insulin.

Item 51. The composition of any of items 41 to 50, further comprising an additive effective to aggregate and/or condense, and/or insolubilize the biologically active agent.

Item 52. The composition of item 51, wherein the additive interacts with the biologically active agent through electrostatic interaction, is condensed and/or precipitated with the biologically active agent, and/or physically interacts with the biologically active agent.

Item 53. The composition of item 51 or 52, wherein the additive comprises protamine.

Item 54. The composition of item 51, 52 or 53, wherein the additive comprises a metal ion.

Item 55. The composition of item 54, wherein the metal ion is $Zn^{2+}$ and/or $Ca^{2+}$.

Item 56. The composition of any of items 41 to 55, wherein the plurality of particles has an average particle size in the range of 5 nanometers to 10 microns.

Item 57. The composition of any of items 41 to 56, wherein the composition is lyophilized.

Item 58. The composition of any of items 41 to 57, wherein the composition is an oral formulation comprising an enteric coating.

Item 59. The composition of any of items 41 to 58, wherein the composition is an oral formulation in the form of a tablet or capsule.

Item 60. The composition of any of items 32 to 35 or 51 to 55, wherein the additive comprises a degradable polymer.

Item 61. The composition of any of items 32 to 35, 51 to 55, or 60, wherein the additive comprises polylactic acid (PLA), poly(lactic-co-glycolic acid) (PLGA), or both PLA and PLGA.

Item 62. The composition for oral and/or mucosal administration of a biologically active agent of any one of the preceding items, wherein the particles comprise hydrogel particles, the hydrogel particles comprising one or more zwitterionic polymers selected from the zwitterionic polymers of any of items 3 to 8, wherein the one or more zwitterionic polymers are crosslinked.

Item 63. The composition of item 62, wherein the one or more zwitterionic polymers are crosslinked via a non-zwitterionic crosslinker.

Item 64. The composition of item 63, wherein the non-zwitterionic crosslinker is selected from the group consisting of: allyl methacrylate, diallyl itaconate, monoallyl itaconate, dially maleate, diallyl fumarate, diallyl succinate, diallyl phthalate, triallyl cyanurate, triallyl isocyanurate, diethylene glycol bis-allyl carbonate, divinyl ether of diethylene glycol, triallyl phosphate, triallyl trimellitate, allyl ether, diallylimidazolidone, pentaerythritol triallyl ether (PETE), N,N-diallylmelamine, triallyl-1,3,5-triazine-2,4,6-(1H,3H,5H)trione (TATT), 2,4,6-Triallyloxy-1,3,5-triazine; vinyl compounds, e.g. divinyl benzene, N,N'-methylene bis acrylamide (MBAA), methylenebis(methacrylamide), ethylene glycol dimethacrylate, ethylene glycol diacrylate, neopentylglycol dimethacrylate, tetraethylene glycol dimethacrylate, polyethylene glycol dimethacrylate, polyethylene glycol diacrylate, hexamethylene bis maleimide, divinyl urea, bisphenol A bis methacrylate, divinyl adipate, glycerin trimethacrylate, trimethylolpropane triacrylate, trivinyl trimellitate, 1,5-pentadiene, 1,7-octadiene, 1,9-decadiene, 1,3-bis(4-methacryloxybutyl) tetramethyl disiloxane, divinyl ether, divinyl sulfone, N-vinyl-3(E)-ethylidene pyrrolidone (EVP), ethylidene bis(N-vinyl pyrrolidone) (EBVP), and two or more thereof.

Item 65. The composition of item 62 or 63, wherein the non-zwitterionic crosslinker comprises MBAA.

Item 66. The composition of any of items 61 to 65, wherein the non-zwitterionic crosslinker is degradable under physiological conditions.

Item 67. The composition of any of items 61 to 66, wherein the non-zwitterionic crosslinker degradable under physiological conditions comprises one or more of: an acrylate, methacrylate, acrylamide, or methacrylamide non-zwitterionic crosslinker.

Item 68. The composition of any of items 61 to 67, wherein the non-zwitterionic crosslinker degradable under physiological conditions comprises N,N'-bis(acryloyl)cystamine.

Item 69. A method of treating a subject in need thereof, comprising: administering a composition according to any of items 1-68 to the subject.

Item 70. The method of treating a subject according to item 70, wherein the composition is administered orally and/or to a mucous membrane of the subject.

Item 71. The method of item 69 or 70 wherein the subject has diabetes and the biologically active agent is an antidiabetic agent.

Item 72. A method of treatment substantially as described herein.

Item 73. A composition substantially as described herein.

Any patents or publications mentioned in this specification are incorporated herein by reference to the same extent as if each individual publication is specifically and individually indicated to be incorporated by reference.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. A composition for oral and/or mucosal administration of a biologically active agent, comprising:
   a plurality of particles, wherein each particle has an exterior surface, the exterior surface defining a particle interior, the exterior surface having at least one type of zwitterionic polymer disposed thereon and/or extending therefrom, wherein the zwitterionic polymer is a copolymer with a lipid-derived polymer, wherein the copolymer comprises a copolymer selected from the group consisting of: PCBMA-PODA, PCBOH-PODA, PSBMA-PODA, PCAR-PODA, PMPC-PODA;
   a biologically active agent disposed on the exterior surface and/or in the particle interior, wherein the biologically active agent comprises an antidiabetic agent which is a protein or peptide; and
   an additive effective to aggregate and/or condense, and/or insolubilize the biologically active agent;
   wherein the plurality of particles is lyophilized and wherein the lyophilized plurality of particles is in an oral formulation comprising an enteric coating.

2. The composition of claim 1, wherein the particles are micelles.

3. The composition of claim 1, wherein the particles are liposomes.

4. The composition of claim 1, wherein the particles are hydrogel particles.

5. The composition of claim 1, wherein the biologically active agent comprises an antidiabetic agent which is a protein or peptide selected from the group consisting of: insulin, human insulin, a protein or peptide human insulin analogue or derivative, a glucagon-like peptide (GLP-1), a protein or peptide GLP-1 analogue, a protein or peptide GLP-1 receptor agonist, dulaglutide, exenatide, semaglutide, liraglutide, and lixisenatide, a biologically acceptable salt or solvate of any thereof, an analogue or derivative of any thereof, and any two or more thereof.

6. The composition of claim 1, wherein the additive interacts with the biologically active agent through electrostatic interaction, is condensed and/or precipitated with the biologically active agent, and/or physically interacts with the biologically active agent.

7. The composition of claim 6, wherein the additive comprises protamine.

8. The composition of claim 6, wherein the additive comprises a metal ion.

9. The composition of claim 8, wherein the metal ion is $Zn^{2+}$ and/or $Ca^{2+}$.

10. The composition of claim 1, wherein the plurality of particles has an average particle size in the range of 5 nanometers to 10 microns.

11. The composition of claim 1, wherein the oral formulation in the form of a tablet or capsule.

12. The composition of claim 6, wherein the additive comprises a degradable polymer.

13. The composition of claim 6, wherein the additive comprises polylactic acid (PLA), poly(lactic-co-glycolic acid) (PLGA), or both PLA and PLGA.

14. The composition of claim 1, wherein the one or more zwitterionic polymers are crosslinked via a non-zwitterionic crosslinker, wherein the non-zwitterionic crosslinker is degradable under physiological conditions.

15. The composition of claim 14, wherein the non-zwitterionic crosslinker is selected from the group consisting of: allyl methacrylate, diallyl itaconate, monoallyl itaconate, dially maleate, diallyl fumarate, diallyl succinate, diallyl phthalate, triallyl cyanurate, triallyl isocyanurate, diethylene glycol bis-allyl carbonate, divinyl ether of diethylene glycol, triallyl phosphate, triallyl trimellitate, allyl ether, diallylimidazolidone, pentaerythritol triallyl ether (PETE), N,N-diallylmelamine, triallyl-1,3,5-triazine-2,4,6-(1H,3H,5H) trione (TATT), 2,4,6-Triallyloxy-1,3,5-triazine; vinyl compounds, e.g. divinyl benzene, N,N'-methylene bis acrylamide (MBAA), methylenebis(methacrylamide), ethylene glycol dimethacrylate, ethylene glycol diacrylate, neopentylglycol dimethacrylate, tetraethylene glycol dimethacrylate, polyethylene glycol dimethacrylate, polyethylene glycol diacrylate, hexamethylene bis maleimide, divinyl urea, bisphenol A bis methacrylate, divinyl adipate, glycerin trimethacrylate, trimethylolpropane triacrylate, trivinyl trimellitate, 1,5-pentadiene, 1,7-octadiene, 1,9-decadiene, 1,3-bis(4-methacryloxybutyl) tetramethyl disiloxane, divinyl ether, divinyl sulfone, N-vinyl-3(E)-ethylidene pyrrolidone (EVP), ethylidene bis(N-vinyl pyrrolidone) (EBVP), and two or more thereof.

16. The composition of claim 14, wherein the non-zwitterionic crosslinker degradable under physiological conditions comprises one or more of: an acrylate, methacrylate, acrylamide, or methacrylamide non-zwitterionic crosslinker.

17. The composition of claim 14, wherein the non-zwitterionic crosslinker degradable under physiological conditions comprises N,N'-bis(acryloyl)cystamine.

18. A method of treating a subject in need thereof, comprising:
administering a composition according to claim 1 to the subject.

19. The method of treating a subject according to claim 18, wherein the composition is administered orally and/or to a mucous membrane of the subject.

20. The method of claim 18 wherein the subject has diabetes and the biologically active agent is an antidiabetic agent.

* * * * *